May 21, 1963 L. R. BREESE 3,090,941

TOLL COLLECTING DEVICE

Filed Dec. 12, 1957 26 Sheets-Sheet 1

INVENTOR

LEMUEL R. BREESE

BY Brown Jackson Boettcher & Dienner

ATTORNEY

Single Fare Operation

INVENTOR.
Lemuel R. Breese,
BY Brown, Jackson, Boettcher & Dienner
Attys.

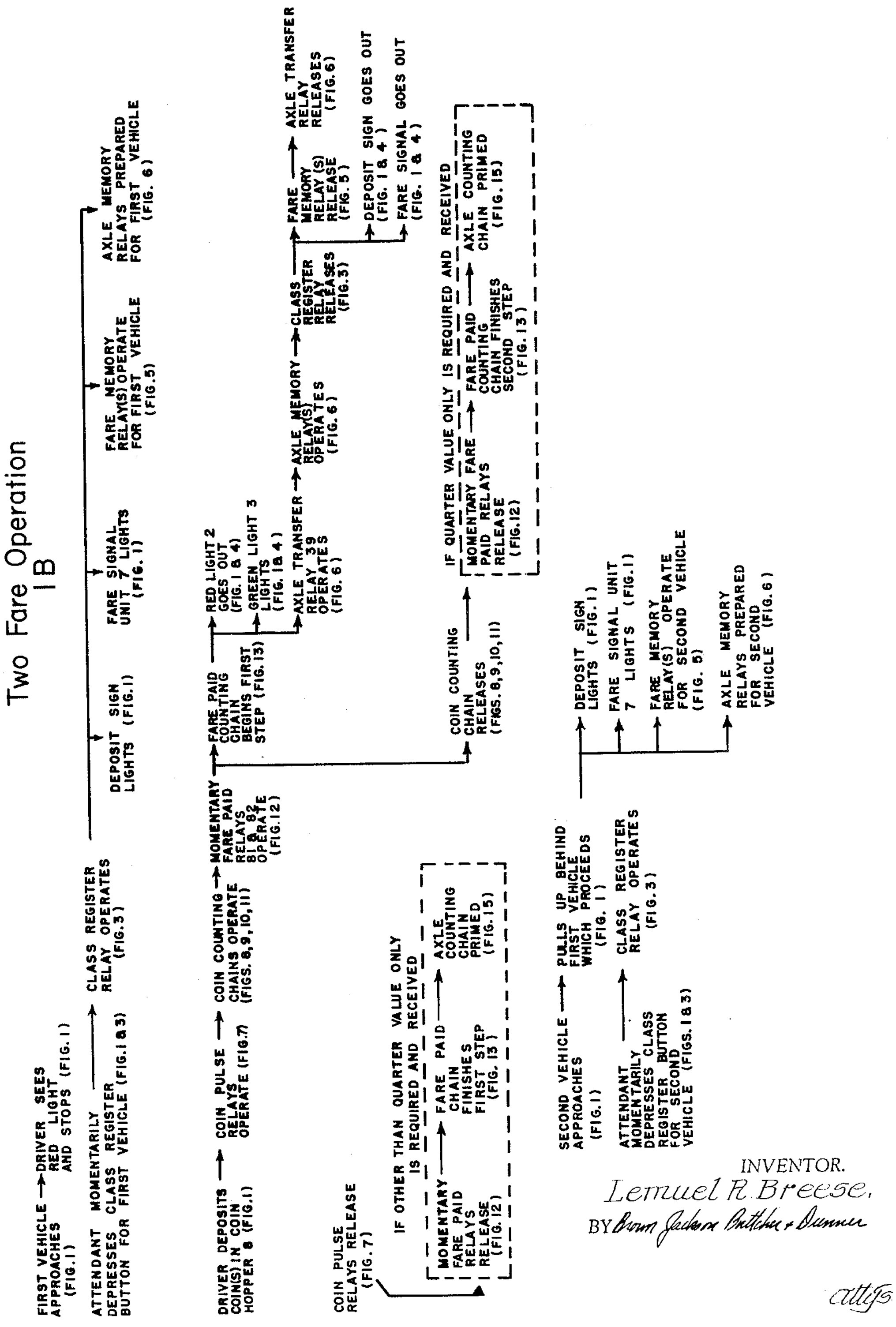
INVENTOR.
Lemuel R. Breese,
BY Brown, Jackson, Boettcher & Dienner
attys INVENTOR.
Lemuel R Breese,
BY Brown Jackson Boettcher & Dienner
Attys.

May 21, 1963 L. R. BREESE 3,090,941

TOLL COLLECTING DEVICE

Filed Dec. 12, 1957 26 Sheets-Sheet 5

Unattended Operation

INVENTOR.
Lemuel R. Breese,
BY Brown Jackson Boettcher & Dienner
attys.

INVENTOR.
Lemuel R. Breese,
BY Brown Jackson Boettcher & Dienner
attys.

May 21, 1963 L. R. BREESE 3,090,941

TOLL COLLECTING DEVICE

Filed Dec. 12, 1957 26 Sheets-Sheet 7

INVENTOR.
Lemuel R. Breese,
BY Brown, Jackson, Boettcher & Dienner
Attys

May 21, 1963 L. R. BREESE 3,090,941

TOLL COLLECTING DEVICE

Filed Dec. 12, 1957 26 Sheets-Sheet 8

Class Register, Buttons & Relays

INVENTOR.

Lemuel R. Breese,

BY Brown Jackson Boettcher & Dienner

Attys

May 21, 1963 L. R. BREESE 3,090,941

TOLL COLLECTING DEVICE

Filed Dec. 12, 1957 26 Sheets-Sheet 9

Fare Indicators & Deposit Sign Fig. 4

INVENTOR.
Lemuel R. Breese,
BY Brown Jackson Boettcher & Dienner
attys

Fare Memory Relays.

INVENTOR.
Lemuel R. Breese,
BY Brown Jackson Boettcher & Dienner
attys

Axle Memory Relays

INVENTOR.
Lemuel R Breese,
BY Brown Jackson Boettcher & Dienner
Attys

Coin Pulse Relays

INVENTOR.
Lemuel R. Breese,
BY Brown Jackson Boettcher & Dienner
Attys

INVENTOR.
Lemuel R. Breese,
BY Brown, Jackson, Boettcher & Dienner
Attys.

Penny Counting Chain

INVENTOR.
Lemuel R. Breese,
BY Brown, Jackson, Boettcher & Dienner
attys

Fig. 9 Nickel Counting Chain

INVENTOR.
Lemuel R. Breese,
BY Brown Jackson Boettcher & Dienner

Quarter Counting Chain

INVENTOR.
Lemuel R. Breese,
BY Brown Jackson Boettcher & Dienner
attys

TOLL COLLECTING DEVICE

Filed Dec. 12, 1957 26 Sheets-Sheet 17

Half Dollar Counting Chain

INVENTOR.
Lemuel R. Breese,
BY Brown, Jackson, Boettcher & Dienner
Attys

Momentary Fare Paid

INVENTOR.
Lemuel R. Breese,
BY Brown, Jackson, Boettcher & Dienner
Attys

May 21, 1963 L. R. BREESE 3,090,941

TOLL COLLECTING DEVICE

Filed Dec. 12, 1957 26 Sheets-Sheet 19

Fare Paid Counting Chain

INVENTOR.

Lemuel R. Breese,

BY Brown, Jackson, Boettcher & Dienner

Attys

May 21, 1963 L. R. BREESE 3,090,941

TOLL COLLECTING DEVICE

Filed Dec. 12, 1957 26 Sheets-Sheet 20

Treadle Relay

INVENTOR.
Lemuel R. Breese,
BY Brown Jackson Boettcher & Dienner
Attys

May 21, 1963 L. R. BREESE 3,090,941

TOLL COLLECTING DEVICE

Filed Dec. 12, 1957 26 Sheets-Sheet 21

Axle Counting Chain

INVENTOR.

Lemuel R. Breese,

BY Brown Jackson Boettcher & Dienner

Attys

May 21, 1963 L. R. BREESE 3,090,941

TOLL COLLECTING DEVICE

Filed Dec. 12, 1957 26 Sheets-Sheet 22

Axle Check

INVENTOR.
Lemuel R. Breese,
BY Brown, Jackson, Boettcher & Dienner
attys

May 21, 1963 L. R. BREESE 3,090,941

TOLL COLLECTING DEVICE

Filed Dec. 12, 1957 26 Sheets-Sheet 23

Unattended Operation

INVENTOR.
Lemuel R. Breese,
BY Brown, Jackson, Boettcher & Dienner
Attys

Charge & Non-Revenue (Free)

INVENTOR.
Lemuel R. Breese,
BY [illegible]
Attys

May 21, 1963 L. R. BREESE 3,090,941

TOLL COLLECTING DEVICE

Filed Dec. 12, 1957 26 Sheets-Sheet 25

Violation Circuits

INVENTOR.

Lemuel R. Breese,

BY Brown Jackson Boettcher & Dienner attys

May 21, 1963 L. R. BREESE 3,090,941

TOLL COLLECTING DEVICE

Filed Dec. 12, 1957 26 Sheets-Sheet 26

Remote Indicator Lights And Counters

INVENTOR.

Lemuel R. Breese,

BY Brown, Jackson, Boettcher & Dienner attys.

United States Patent Office 3,090,941 Patented May 21, 1963

3,090,941

TOLL COLLECTING DEVICE

Lemuel R. Breese, Galion, Ohio, assignor to North Electric Company, Galion, Ohio, a corporation of Ohio
Filed Dec. 12, 1957, Ser. No. 702,371
20 Claims. (Cl. 340—31)

Figure 1:
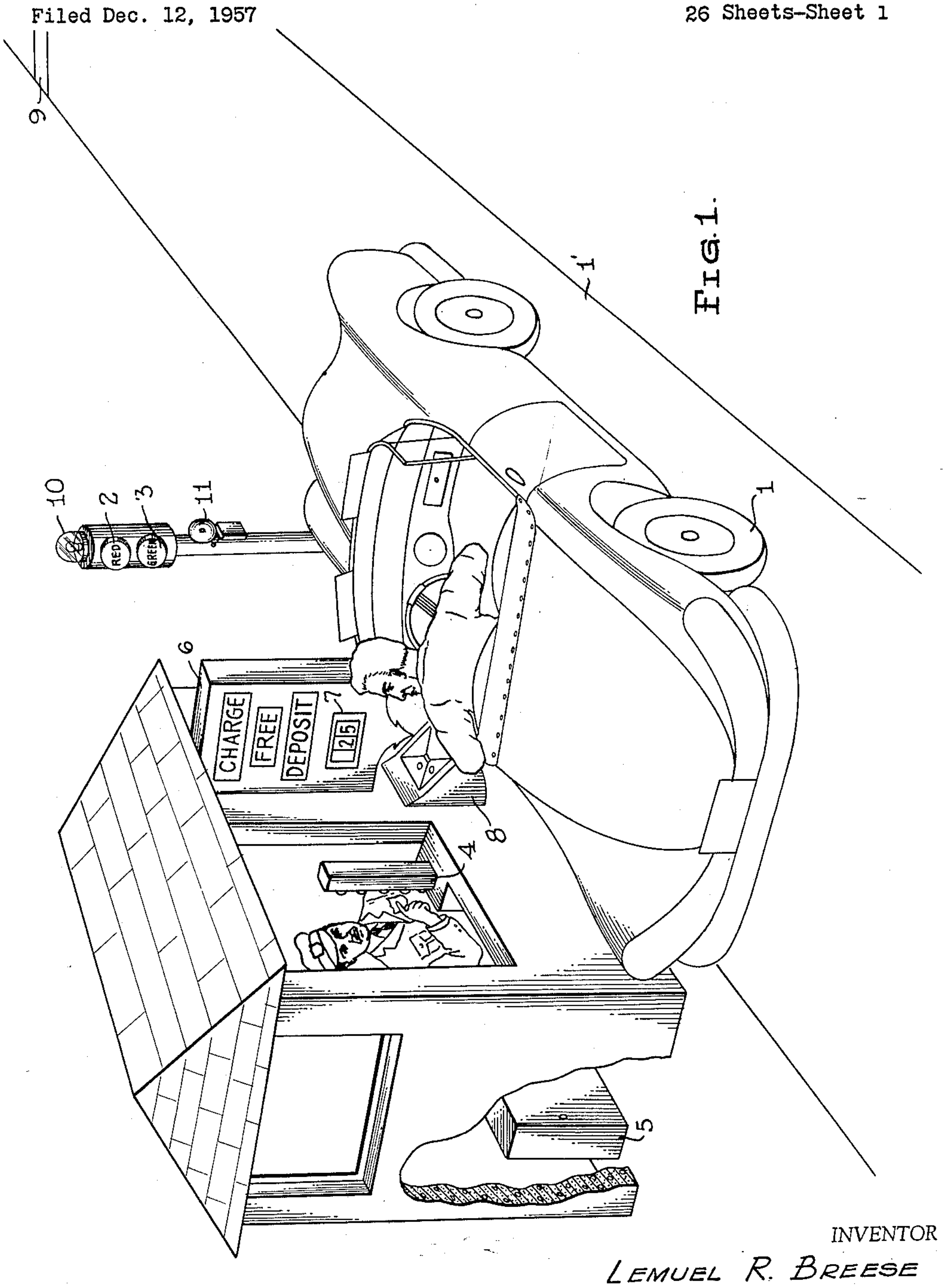
Figure 1A:
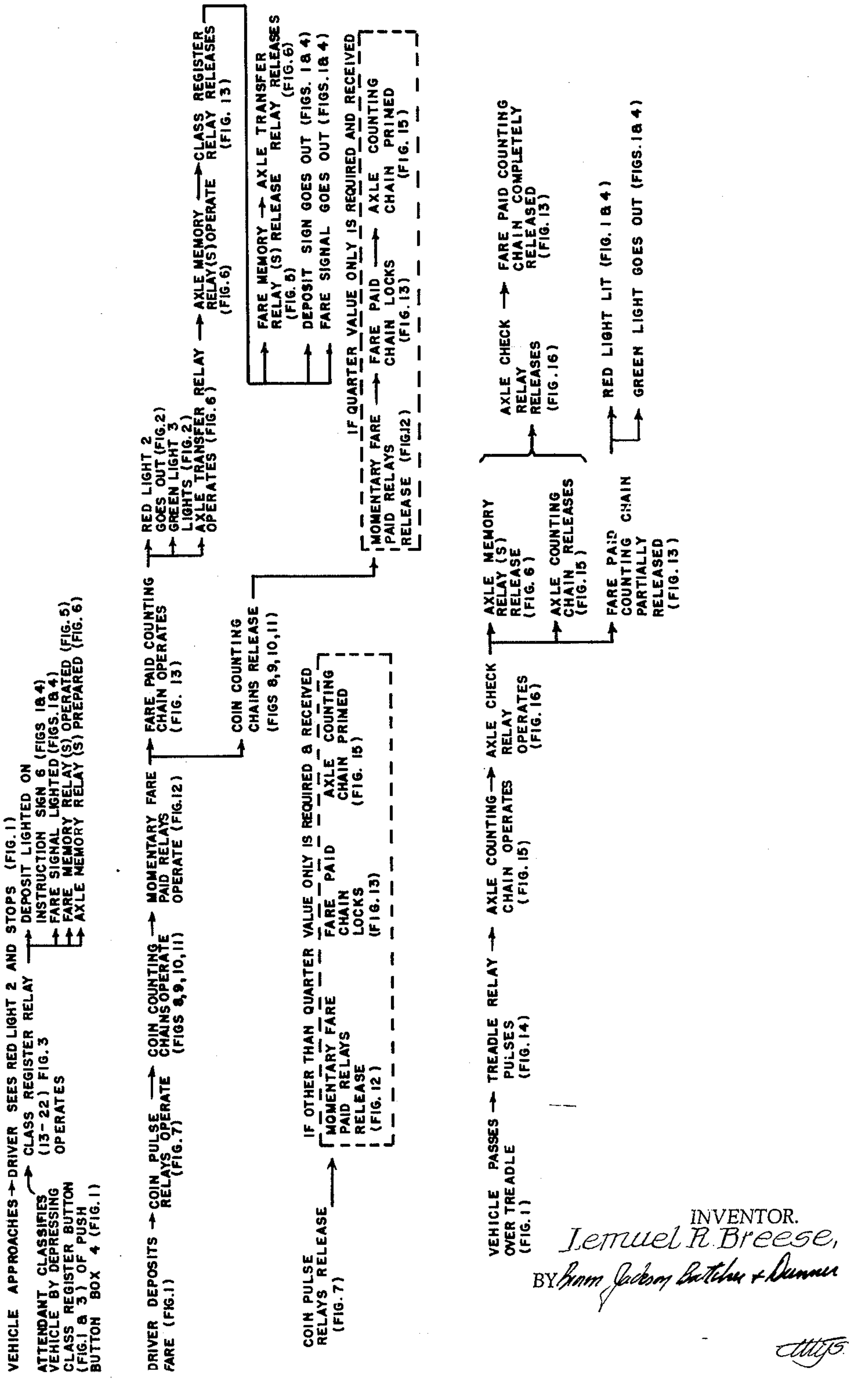
Figure 1C:
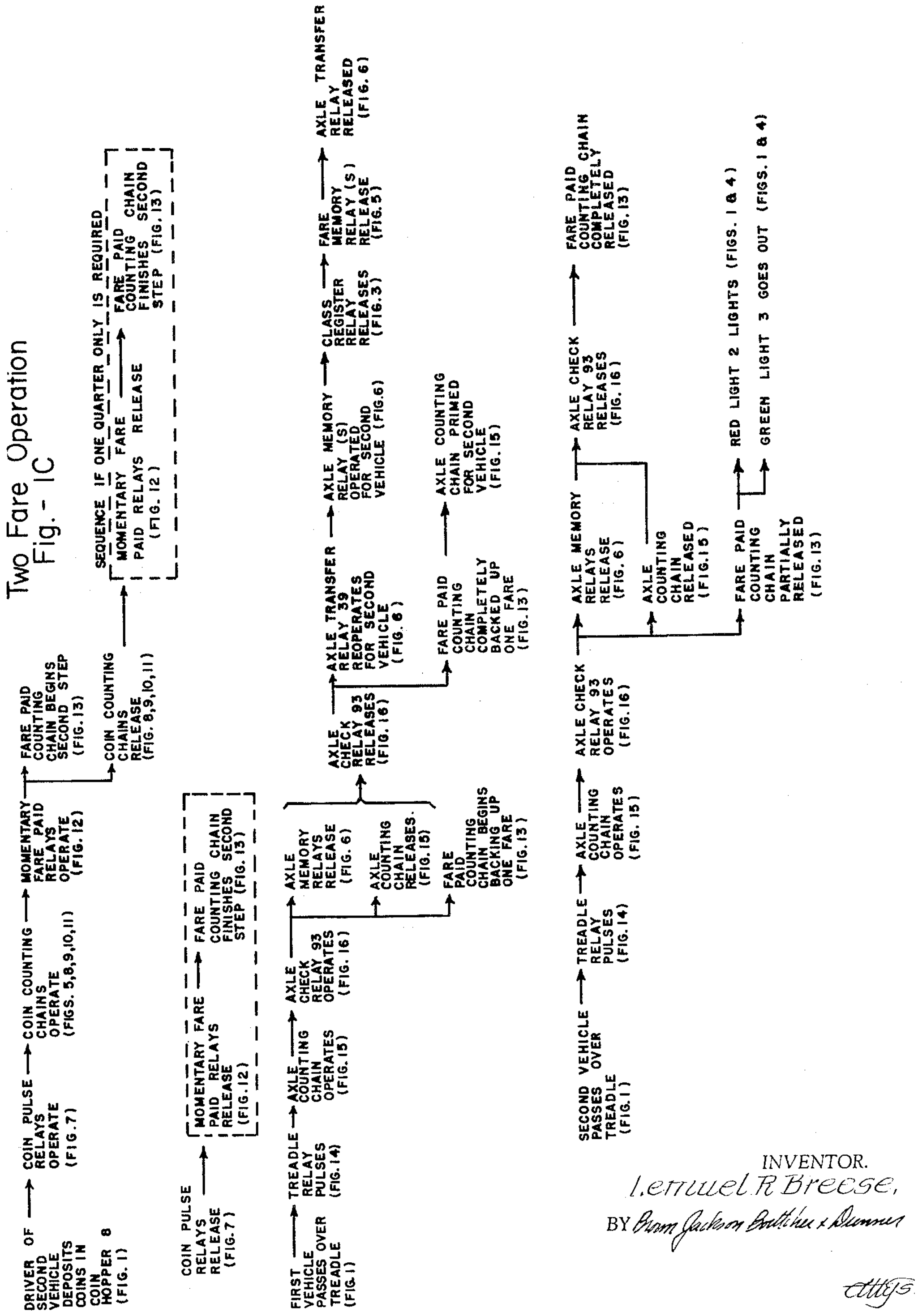
Figure 1D:
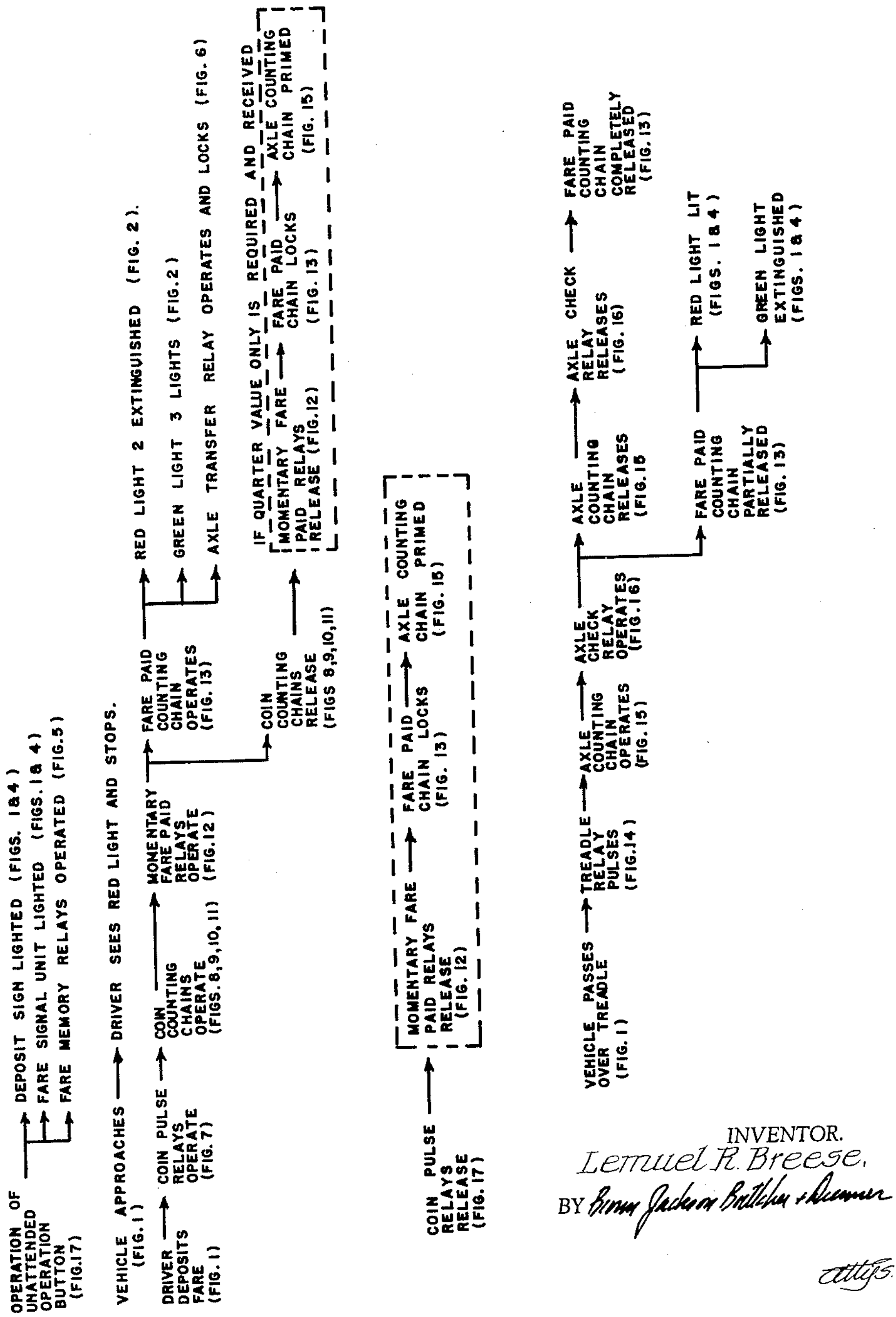

The present invention relates to toll equipment and particularly to novel supervisory and collecting means for use with toll roads, toll bridges, and the like.

With the increasing population and resultant ever increasing vehicular traffic in the transportation of passengers and freight between different areas of our country, the existing road systems and water routes have become inadequate, both from the standpoint of safety as well as travel time. More recently, a definite need has arisen for improved travel routes and roadways between major industrial areas of the same localities, and in many instances improved facilities for effecting the distribution of traffic between major points in a given metropolitan area. Such need has indicated the desirability and, in certain instances, the necessity of tunnels, bridges, and elevated highways to alleviate serious traffic congestion.

While the above indicated travel facilities are recognizably desirable, it is equally apparent to the interested parties that the cost of their construction is a great economic burden which has in the past, at least, seriously hampered their adoption and acceptance by the taxpayer. A satisfactory solution to the economic burden in this circumstance appears to lie in the provision of a suitable toll collection system or means whereby the added facility may be self-supporting and, in many instances, income producing. Such toll collecting systems are generally acceptable, since the burden of using the facility is placed directly on the user, rather than the general public.

By past practice, attendants normally have been employed to collect and regulate the tolls by collecting predetermined sums from the operator of the vehicle involved, either prior to or subsequent to the use of the toll facility by the operator. More recently, attended and unattended systems have been devised for collecting tolls. The present invention is directed to systems of both types, in that they provide automatic supervision of the toll collections, and particularly to systems which include means for providing satisfactory verification of toll monies paid by the users in either type of system.

The present invention may take on several forms and may be divided into two basic systems hereinafter referred to as an attended system and a non-attended system. In the attendant form of toll collecting device, according to this invention, a human attendant visually observes and determines the nature of the vehicle and the toll to be collected for the passage of such vehicle across the toll facility. The driver then deposits the required fee as indicated by suitable display or indicator means incorporated in the system, which in turn counts the deposited sum and, if the proper toll has been made, permits passage of the vehicle onto the toll facility.

The second embodiment of the invention, of the non-attended type, is particularly useful in installations and circumstances wherein a fixed toll rate is predetermined and assigned for each vehicle, regardless of its size, character, or type. Such a toll facility may be readily operated without an attendant, since no human evaluation of the equipment to be used on the toll facility is required. Manifestly, both of the above noted systems have like fundamental concepts and equipment for their successful practice.

More specifically, in both the attended and the non-attended embodiments of the inventions, a barrier or warning light, such as a red traffic light, is normally illuminated to indicate to the toll user as, for example, the driver of a vehicle approaching the toll facility, that the subsequent facility requires the deposit of a toll. In certain installations, a gate barrier is used in lieu of or in conjunction with the warning traffic light for such purposes. If an attendant is present, he visually determines the rate or toll for the particular vehicle in question and records the rate upon an associated register system which, in turn, properly conditions the toll taking facility for receipt of the indicated amount, while providing a visual indication of such amount to the driver or operator of the vehicle. The driver thereupon deposits the necessary coins or toll in a toll-taking machine which automatically counts the same. In the event that the proper toll amount has been deposited, the system automatically extinguishes the red or warning light barrier (or lifts the gate barrier), and illuminates a green or go-light (or raises the gate barrier) to permit the driver to proceed along the toll facility.

It is a particular feature of the present invention that a novel supervisory system is provided for effecting expeditious determination in the collection of proper toll fees in the granting of access to the toll facility in a quick, accurate, and efficient manner responsive to the collection of the toll amount. This feature occurs by the provision of a suitable treadle in the toll facility at a distance beyond the toll station for engagement by each vehicle entering the facility and operative in conjunction with the barrier means or other warning signals or audible alarm systems referred to above. More specifically, once the toll has been deposited in the collection device and the vehicle released for entry to the toll facility, the treadle system is actuated by the vehicle in its passage or approach thereto to initiate an automatic correlation system whereby the toll indicated and collected at the toll gate is automatically compared with the identification information relating to the vehicle being admitted to the toll facility as provided by the treadle system. If the collected toll agrees with or exceeds the registered toll according to indications effected by the treadle, or other checkpoint facility, then proper operation of the toll collection facility is indicated and unconditional release of the vehicle is permitted.

Such treadle system is particularly useful in the attended form of the present invention, in that it provides an automatic check against the accuracy and honesty of the attendant in not only determining and indicating the amount of toll, but also in his collection thereof. In a treadle system, as above briefly outlined, it is essential for unconditional release of the vehicle, that the toll indicated and collected agree with the character and nature of the vehicle permitted to enter the toll facility. This character of evaluation of the vehicle may be governed by various factors, such as the number of axles, weight, length of vehicle, or other determining characteristics. The treadle system is important in both systems as a counting device and check facility on the accuracy of the toll taker, be it automatic or human attended.

A particular feature of the present invention is the manner in which the system is operative to permit the collection of the required fare from a first vehicle, and the release of such vehicle to the toll facility; and thereafter the acceptance of the deposit of a second vehicle prior to the time that the first vehicle passes over the treadle device for verification purposes. It is apparent that such arrangement permits a more expeditious flow of traffic without a sacrifice of system reliability.

In view of the foregoing, it is a particular object of the present invention to provide a novel supervisory system having a toll collecting means for registering plural toll fees without losing count of each separate fee, and more particularly a novel system for effecting the expeditious determination of proper toll fees, and the supervised granting of access and use of a toll facility in accordance therewith.

A still further object and specific feature and advantage of this invention is a unique means for converting a token unit into a predetermined monetary value in accordance with pre-assigned conditions of the toll gate equipment.

Figure 1E:
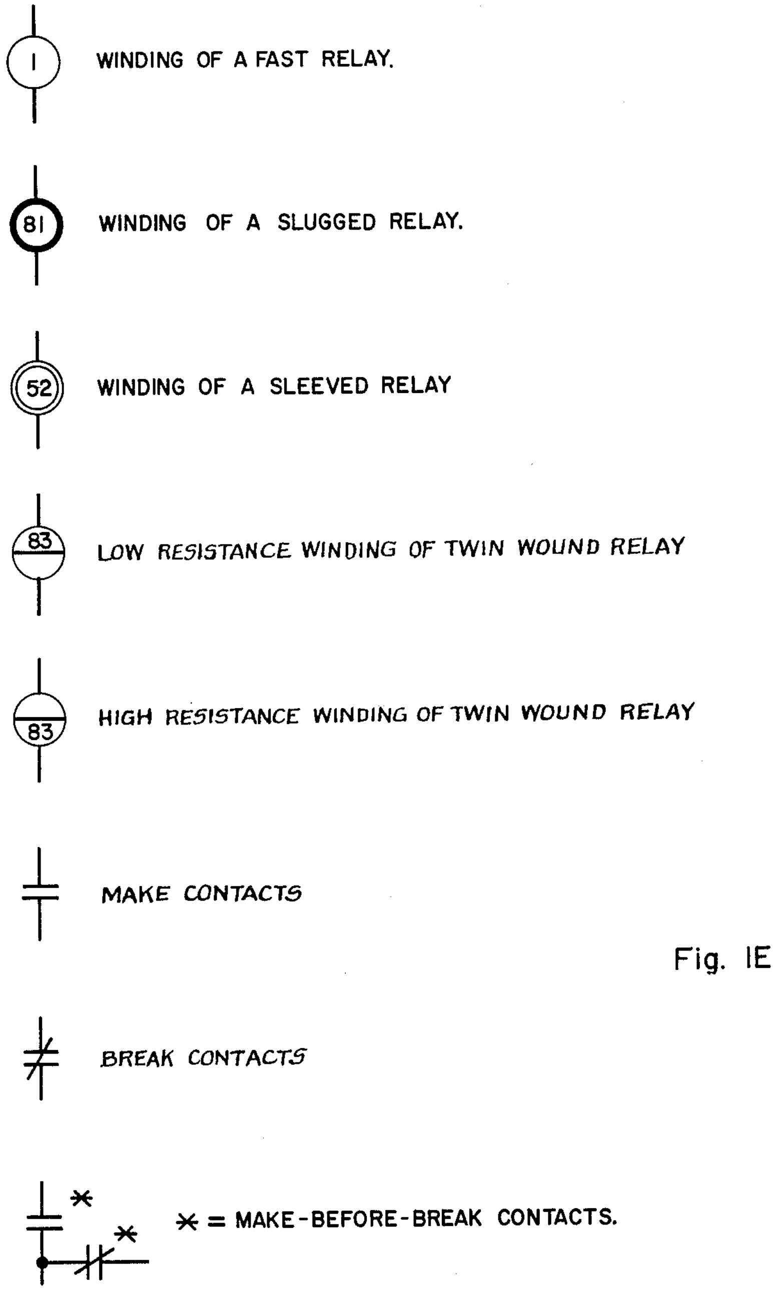

These and other advantages and features of the novel toll collecting system will become apparent with reference to the following specification, claims and drawings in which FIGURE 1 is a pictorial representation of a typical installation of the toll collecting equipment, FIGURES 1A–1D are flow sheets indicating the sequence of operation of the two different embodiments of the equipment set forth in the disclosures including a description of two conditions of operation, FIGURE 1E is a pictorial representation and identification of the different symbols which appear in the FIGURES 2–20, and FIGURES 2–20 set forth schematic circuit representations of the equipment of the novel toll collecting system of the invention, the illustration being arranged to permit assembly of the FIGURES 2–20 in numerical sequence with a common positive and a common negative bus extending through the successive figures.

It is noted that the illustration of the equipment set forth in FIGURES 2–20 is conventional in certain power equipment fields and is preferred by reason of its comparative simplicity, and the clear manner in which it sets forth the different components of a complicated system. The conventional fuse and spark protection equipment has been eliminated in the interest of simplifying the disclosure, the use of such equipment being well known to parties skilled in the art. Further the relay contacts are illustrated in the non-operated position even though such relay may be normally operated. The different types of relays are represented schematically in the manner shown in FIGURE 1E. Similarly the normal condition of the contacts associated with the relays are illustrated in accordance with the teaching of FIGURE 1E, and the contacts of a relay are identified by the relay identification number plus a letter. Thus the contacts of relay 60 are identified as 60A, 60B, 60C, etc.

GENERAL DESCRIPTION

The novel toll collecting system has particular advantages in its use with toll road facilities, and is so disclosed in the basic showing of the invention herein. With reference to FIGURE 1, the installation thereshown is of the attended type with facilities for rendering it of the unattended type wherein an employee located in a toll station disposed adjacent the entry to a toll road section 1' has visual means for ascertaining the nature of the vehicles, such as illustrated vehicle 1, approaching the entry point to the toll road facility. The toll station houses a push button register 4 which is disposed for convenient use by the attendant in the registration in the system of the class of vehicle which is approaching the toll entry gate, and additionally the operative components of the system which are housed in a cabinet 5 and which are operative to control an associated instruction display unit 6 and traffic indicator lights 2, 3 comprised of stop display media, such as red light for normally stopping the approaching vehicles, and a proceed display media, such as a green light, for permitting advancement and passage of the vehicles thereby.

The instruction sign 6 is located in the line of sight of each approaching vehicle to indicate to the driver the nature of the cooperation expected including the fee required for the class vehicle driven by such party, and instructions relative thereto.

A receiving means comprising a coin hopper 8 is conveniently located relative to the roadbed 1' to accept the coins which are deposited by the driver in accordance with the instructions on display medium 4, and conventional mechanical means (not shown) count the coins and automatically feed such count to control equipment 5. In a preferred embodiment, signal generating means in the control equipment are operative to generate signals representative of the number of each species received by the receiving means. Totalizer means in the control equipment connected to the signal means determine the number of each species in the toll payment as represented by such signals, and register the value thereof on a comparison means in the control equipment 5. If the comparison means determines that the amount thus counted is consistent with the amount shown on display medium 4, control equipment 5 effects the extinguishment of red light 2 and the illumination of green light 3, which are post-mounted in the conventional manner, for the purpose of indicating to the driver that the vehicle is entitled to proceed along the toll highway.

A treadle 9 located in the roadbed a predetermined distance beyond the toll station counts the axles passing thereover, and communicates such information to the control equipment 5. Memory equipment in control unit 5 compares the received information with that provided thereto by the attendant. In the event that the information thus provided is consistent with the registered information, the control equipment 5 effects extinguishment of green light 3 and illumination of red light 2 in preparation for use in the instruction of the next vehicle.

In the event that the nature of the vehicle indicated by treadle 9 does not agree with the fare required as a result of the registration effected by the attendant on register 4, the red traffic light 2 is maintained in the illuminated condition for a further period of time, and alarm lamp 10 and alarm bell 11 are energized to indicate to the parties, as well as supervisors of the system, that an improper fare has been received.

As more fully described hereinafter, the equipment is operative to permit the classification of a second vehicle by the attendant, and the receipt and registration of the deposited toll prior to the time that the first vehicle passes over treadle 9.

SPECIFIC DESCRIPTION OF COIN COUNTING AND AXLE COUNTING EQUIPMENT

In that novel equipment of the disclosure is adapted for use in attended and non-attended installations, respectively, and in each use may be operated in a number of different manners as different classes of vehicles are allowed to pass to the toll facility, a specific description initially of the coin receiving mechanism 8 and the counting equipment in control panel 5 which operates in response thereto, will simplify the description of the sequential operations set forth in FIGURES 1A–1D, respectively. That is, the money counting equipment and the axle counting equipment operate in the same manner in each of the different systems of operation, and therefore a thorough understanding of such equipment facilitates the latter consideration of the different specific operations.

Figure 15:
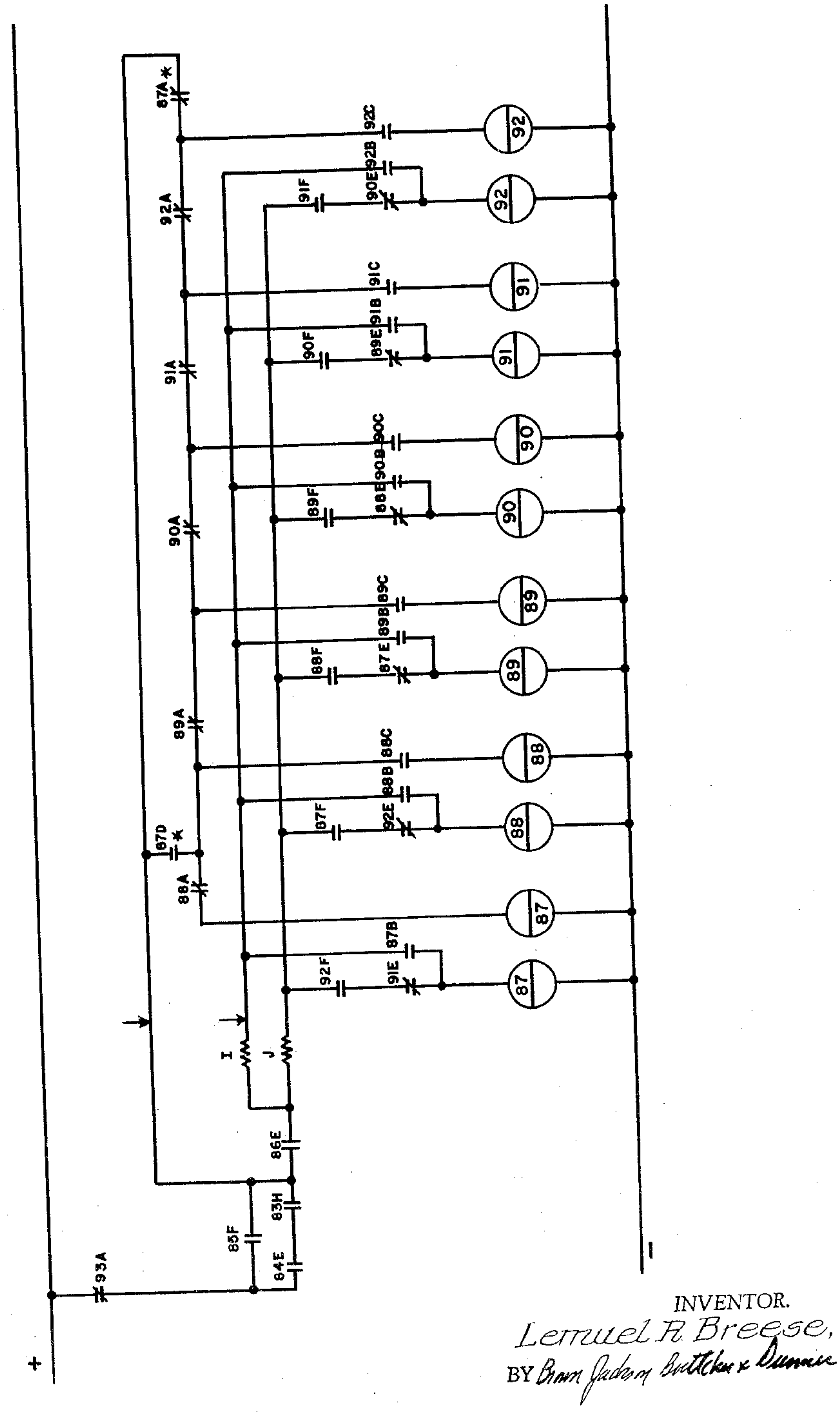

Such equipment basically includes the coin hopper 8 and a mechanical counter (not shown) for counting the money deposited, and a series of species counting chains for registering the count of its assigned species including a chopper chain (FIGURE 7) for converting tokens to monetary equivalents, a penny counting chain (FIGURE 8), a nickel counting chain (FIGURE 9), a quarter counting chain (FIGURE 10), a half dollar counting chain (FIGURE 11), and an axle counting chain (FIGURE 15).

Various coin sensing and registering mechanisms known in the art are suitable for use with the invention, such as that disclosed in Patent No. 2,805,746. That is, such reference teaches the sorting of received coins into different species, and the provision of an electrical pulse indicative of the species over associated circuits. Analogous arrangements are shown in other patents such as Nos. 2,594,422; 2,810,465; and 2,816,639; accordingly, this sorting and pulse-generating arrangement has been indicated schematically in FIGURE 7 of the drawings as a set of cams and associated contacts 40–46.

Figure 7:
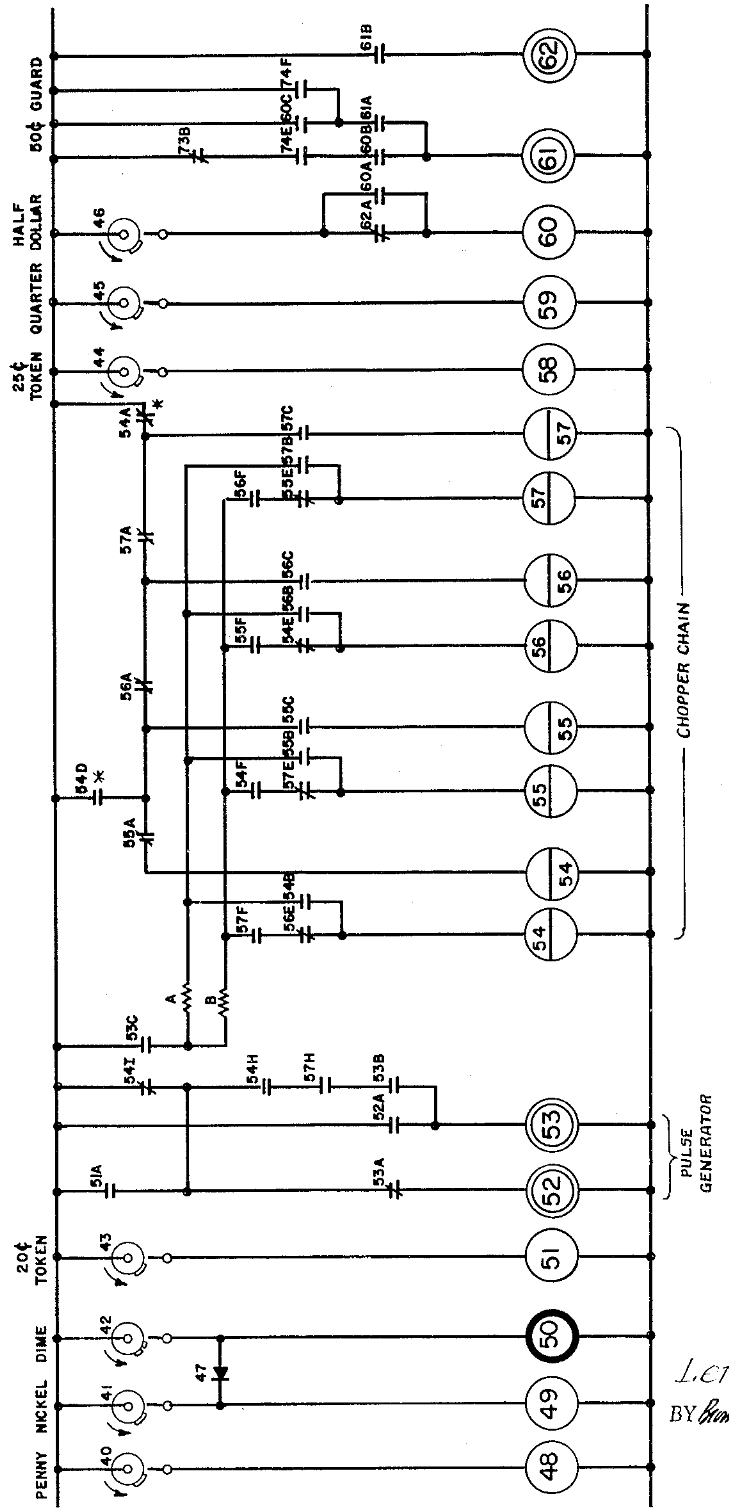

With reference to FIGURE 7, the coin pulse relays 48–62 which electrically translate and relay the mechanical count to the register equipment shown in FIGURES 8–11. As shown in FIGURE 7, a set of cams 40, 41, 42, 43, 44, 45 and 46 on the mechanical counter rotate counterclockwise once in response to each passage of a coin through the coin receiving mechanism in the toll building. As a cam rotates, a projecting portion thereon momentarily engages cooperating electrical contacts extending a pulse from the positive conductor to the associated relay and the negative bus (the positive and negative conductors being referred to hereinafter by + and — designations for brevity).

The circuitry shown in FIGURE 7 cooperates with coin receiving mechanism which will only allow one coin at a time to be registered although a miscellaneous assortment of various denominations of coins are thrown into the hopper, with the exception that half-dollars are routed into a separated counter and therefore may be registering simultaneously.

Actually all coins other than half dollars are routed through one channel and selectively move a bar according to the size of the coin to mechanically indicate the value of the coin. The coin then causes a shaft having a single lobe cam (which contacts 40, 41, 43 and 44 represent) and a two lobe cam (which contacts 42 represent) to rotate, the degree of displacement of the said bar selectively setting up circuits determining which of the relays 48, 49, 50, 51, 58 and 59 shall be operated by rotation of the cams and closure of the associated contacts. Half dollar coins are routed through a different channel closing contacts 46.

Briefly passage of a penny through the mechanical counter results in the closure of an obvious circuit by contacts 40 for penny count relay 48 which extends + through contacts 40 and the winding of penny count relay 48 to —. Passage of a nickel through the mechanical counter results in the closure of an obvious circuit for nickel count relay 49 by contacts 41, rectifier 47 isolating the pulse from the winding of dime count relay 50.

Passage of a dime through the mechanical counter results in the transmission of two successive pulses by the dual contact set 42 to nickel count relay 49, thus translating the dime into two nickels: the circuit extending from + through contacts 42, rectifier 47 and the winding of relay 49 to —. Simultaneously the contacts 42 complete a circuit from + over contacts 42 and the winding of slow to release dime count relay 50 to —. Relay 50 is partially energized by the first pulse to give a remote indication of a dime counted, but being slugged does not release during the opening of its circuit between the first and second pulses generated by the contacts 42.

A twenty-cent token results in the closure of contacts 43, and in turn closure of a circuit from + through contacts 43 and the winding of the twenty cent token count relay 51 to —. Relay 51 operates and initiates pulsing by pulse generating relays 52, 53 which drive a chopper chain comprised of four relays 54–57 to register a four nickel count on the nickel counting chain as will be described in more detail hereinafter. A twenty-five cent token results in the closure of contacts 44, extending a circuit from + through contacts 44 and the winding of twenty-five cent token count relay 58 to —, to operate the same. A quarter results in the closure of contacts 45, extending a circuit from + through contacts 45 and the winding of quarter count relay 59 to —, to operate same.

A half-dollar results in the closure of contacts 46, extending a circuit from + through contacts 46, contacts

62A and the winding of the half dollar count relay 60 to —, relay 60 locking through contacts 60A to the energizing source independent of relay 62A. The function of the 50¢ guard circuit comprising relays 61 and 62 will become clearer hereinafter.

As noted above, the deposit of the twenty cent token in the present embodiment is intended to effect a registration in the system which is equivalent to the receipt of four nickels. Thus, with the passage of a 20¢ token through the mechanical counter relay 51 operates momentarily, as heretofore described, and at its contacts 51A initiates pulsing of mutually self-interrupting sleeved pulse generating relays 52 and 53, which relays pulse repeatedly, and at contacts 53C advance the chopper chain comprising twin-wound relays 54–57 (which are of the concentrically wound type) in sequence. Briefly, relay 51 operates and at its contacts 51A completes a path from + through contacts 51A, 53A and the winding of relay 52 to —. Relay 52 operates and at its contacts 52A completes a path from + through contacts 52A and the winding of relay 53 to —. Relay 53 operates and at its contacts 53A opens the circuit for relay 52 which restores, and at its contacts 53C completes an additional holding circuit for relay 54 over the path from + through contacts 53C, resistor A, contacts 54B, and the upper winding of relay 54 to —.

It should be noted that the first relay 54 of the chopper chain is normally operated, and at its contacts 54F normally prepares a circuit to relay 55 so that with the first operation of relay 53 to close contacts 53C, relay 55 operates. That is, the circuit for initially operating relay 54 may be traced from + through closed break contacts 54A, 57A, 56A, 55A and the higher resistance winding of relay 54 to —. Relay 54 at its contacts 54D locks over the circuit from + through contacts 54D, 55A and the low resistance winding of relay 54 to —. Chopper chain relay 54 at its contacts 54B prepares a holding circuit for itself to its low resistance winding, and at its contacts 54F, chopper relay 54 prepares a circuit for the second chopper relay 55. Thus as relay 53 operates to close contact 53C for the first pulse an energizing circuit is completed for relay 55 over the path which extends from +, over contacts 53C, resistor B, 54F, 57E, and the winding of relay 55 to —. Relay 55 at its contacts 55B establishes a holding circuit to the pulsing circuit 53C for itself from + through contacts 53C, resistor A, contacts 55B and the upper winding of relay 55 to —, at its contacts 55C establishes another holding circuit for itself from + through contacts 54D, 55C and the lower winding of relay 55 to —; at its contacts 55F prepares a circuit for relay 56 which is held open by contacts 54E until relay 54 releases (to prevent relay 56 from operating on the same pulse which operates relay 55); and at its contacts 55A opens one holding circuit of relay 54, which remains locked to the pulsing contact 53C. The holding circuit of relay 55 to the pulsing contact 53C is effective on the next pulse to prevent the release of relay 55 until termination of the subsequent pulse.

The pulse for driving the chain is now terminated, as relay 52 being of the sleeved type, releases only after a predetermined interval following opening of contacts 53A, in turn opening contacts 52A and the holding circuit of relay 53. Relay 53 being of the sleeved type releases after a predetermined interval, and contacts 53A reclose to prepare the circuit through contacts 51A for pulse generating relay 52 which may or may not be open according to the length of the 20¢ token pulse.

As relay 53 releases, the remaining holding circuit of relay 54 is opened at contacts 53C and relay 54 releases. Thereupon a circuit is completed to reoperate relay 52 over the path from + through contacts 54I, 53A and the winding of relay 52 to —. (If the token pulse had been long enough, relay 51 would have remained operated and relay 52 would have reoperated through contacts 51A.)

Relay 52 at its contacts 52A reoperates relay 53 which closes contacts 53C to operate relay 56 over the path extending from + through contacts 53C, resistor B, 55F, 54E, and the winding of relay 56 to —. Chopper relay 56 at its contacts 56B, closes one holding circuit for itself to the pulsing contact 53C over the path from + through contacts 53C, resistor A, contacts 56B, and the winding of relay 56 to —; at its contacts 56C relay 56 closes another holding circuit for itself from + through contacts 54A, 57A, 56C and the lower winding of relay 56 to —; at its contacts 56F, relay 56 prepares a circuit for relay 57; and at its contacts 56A opens the holding circuit of relay 55 through its lower winding.

This pulse for driving the chain is terminated as relay 53 opens contact 53A to release relay 52 which in turn opens contacts 52A to release relay 53. As relay 53 releases to open contacts 53C, relay 55 is released, and at its contacts 55E a circuit is prepared for chopper relay 57.

Pulse generating relay 53 at contacts 54I and 53A reoperates relay 52 which at its contacts 52A reoperates relay 53. The reoperation of pulse operating relay 53 effects reclosure of contacts 53C to operate relay 57 over the path from +, contacts 53C, resistor B, 56F, 55E, and the winding of relay 57 to —. Relay 57 operates and at its contacts 57B closes a holding circuit for itself over its upper winding to pulsing contact 53C which is of particular significance on the next pulse; at its contacts 57C closes a holding circuit for itself over its lower winding over the path from + through contacts 54A, 57C and the lower winding of relay 57 to —; at its contacts 57F prepares a circuit for relay 54; and at its contacts 57A opens the lower winding holding circuit of relay 56.

This pulse for driving the chain is terminated as relay 53 releases relay 52 which in turn releases relay 53 in the manner heretofore described. Relay 53 restores and opens contacts 53C to release relay 56, which in turn opens contacts 56E to prepare a circuit for relay 54.

The release of relay 53 also reoperates relay 52 which reoperates relay 53 in the manner previously described. Relay 53 at its contacts 53C operates relay 54 over the path from +, contacts 53C, resistor B, 57F, 56E, and the upper winding of relay 54 to —. Relay 54 at its contacts 54B closes an upper winding holding circuit for itself to pulsing contact 53C; at its contacts 54D which close before contacts 54A open closes a lower winding holding circuit for itself from + through contacts 54D, 55A, and its lower winding to —; at its contacts 54F prepares an operating circuit for relay 55, and at its contacts 54A opens the lower winding holding circuit of relay 57.

This pulse for driving the chain is normally terminated as relay 53 releases relay 52 which in turn releases relay 53 (which does not reoperate relay 52 as contacts 54I are now open), in turn releasing relay 57 which returns the chain to normal (relay 54 operated) in preparation for the receipt of the next 20¢ token.

If the 20¢ token pulse is long enough to maintain contacts 51A operated after the chain has made its cycle, relays 52 and 53 would start pulsing, driving the chain. To obviate this possibility, a holding circuit is established for relay 53 on the last pulse whenever contacts 51A are closed as the chain advances to the last chopper relay 57: +, 51A, 54H, 57H, 53B, and the winding of relay 53 to —. When contacts 51A are subsequently opened, relay 53 releases, in turn releasing relay 57 and returning the chain to normal.

With the advancement of the chopper chain through one cycle responsive to the receipt of a signal indicating receipt of a twenty cent token by the mechanical counter four pulses are transmitted to the nickel counting chain (FIGURE 9) to thus translate the token into the equivalent of four nickels.

The sequence of operation of the pulse generating chopper chain relays might be summarized as follows with + designating operation and — designating release, and ± designating a pulse. Pulses to the nickel counting chain as will be further described hereinafter are indicated thus

| | |
|---|---|
| ±51 | |
| +52 | |
| +53 | |
| −52 | +55 |
| −53 | |
| | −54 |
| +52 | |
| +53 | |
| −52 | +56 |
| −53 | |
| +52 | −55 |
| +53 | |
| −52 | +57 |
| −53 | |
| +52 | −56 |
| +53 | |
| −52 | +54 |
| −53 | |
| | −57 |

As indicated above, during the interval between the operation of relay 55 and the release of relay 54, a pulse is delivered to the nickel counting chain (contacts 54J, 55J, FIGURE 9, as more fully described hereinafter). In like manner pulses are also delivered to the nickel counting chain during the succeeding three indicated intervals so that one twenty cent token pulse results in four pulses being delivered to the nickel counting chain (contacts 54J–57J, FIGURE 9).

It is noted that the chopper chain (FIGURE 7) is similar to other chains (i.e., penny counting chain, nickel counting chain, half dollar counting chain and axle counting chain) which constitute important components of the system, other of the chains having the same or a larger number of component relays. Basically, however, each relay in each chain has three circuits, i.e.: an operating circuit over its low resistance winding to the pulsing contact; a holding circuit over its low resistance winding to the pulsing contact; and a holding circuit over its high resistance winding independent of the pulsing contact. These relays can be considered as operating in a circle or closed chain from left to right with the last relay being next to the first relay in completing the circle. A start circuit extends to the first relay over series break contacts of all the relays. With the first relay normally operated, the second relay in the chain is prepared for operation by the first pulse. In general it can be said that when one of these chain relays operates it:

(1) Opens the high resistance winding locking circuit of the preceding relay.

(2) Locks over its high resistance winding, independent of the pulsing contact but subject to the next relay to operate in the sequence, thus holding the relay at the end of the pulse which operated it.

(3) Closes a circuit over its low resistance operating winding to the pulse contact so that the next pulse can hold the relay when the next relay operates, opening its high resistance winding operating circuit.

(4) Closes a circuit to prepare for the next pulse to operate the next relay.

(5) Opens contacts in the low resistance operating path of the succeeding relay second in line from it so that the next pulse does not operate this relay.

OPERATION OF SPECIES COUNTING CHAIN

Figure 7A:
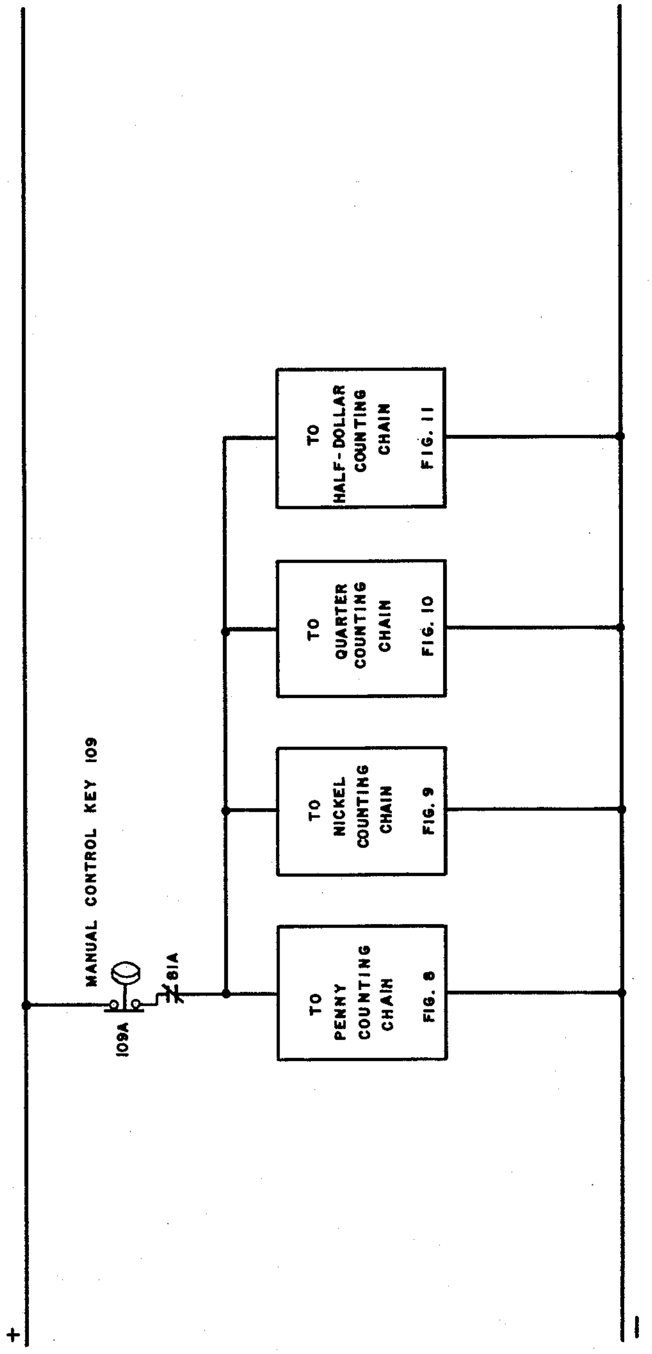

The pulses which are generated by the coin pulse relays (FIGURE 7) in response to the receipt of the information from the mechanical counter are fed to the corresponding ones of the species counting chains for the purpose of determining the total amount deposited in the coin hopper by the prospective user of the toll facility. As shown in FIGURE 7A the species counting chains include a penny, a nickel, a dime, a quarter and a half dollar counting chain, which are connected between the positive and negative bus bars by a circuit including contacts 109A of a manual control key 109, and a set of break contacts 81A on a monetary fare paid relay 81 (FIGURE 12). The species counting chains are connected in parallel with each other as specifically illustrated in FIGURE 7A, and such connection is indicated by the conventional multiple sign in FIGURES 8, 9, 10, and 11. The operation of each of the respective species counting chains in response to receipt of the pulses from the corresponding coin pulse relays is now set forth.

PENNY COUNTING CHAIN

Figure 8:
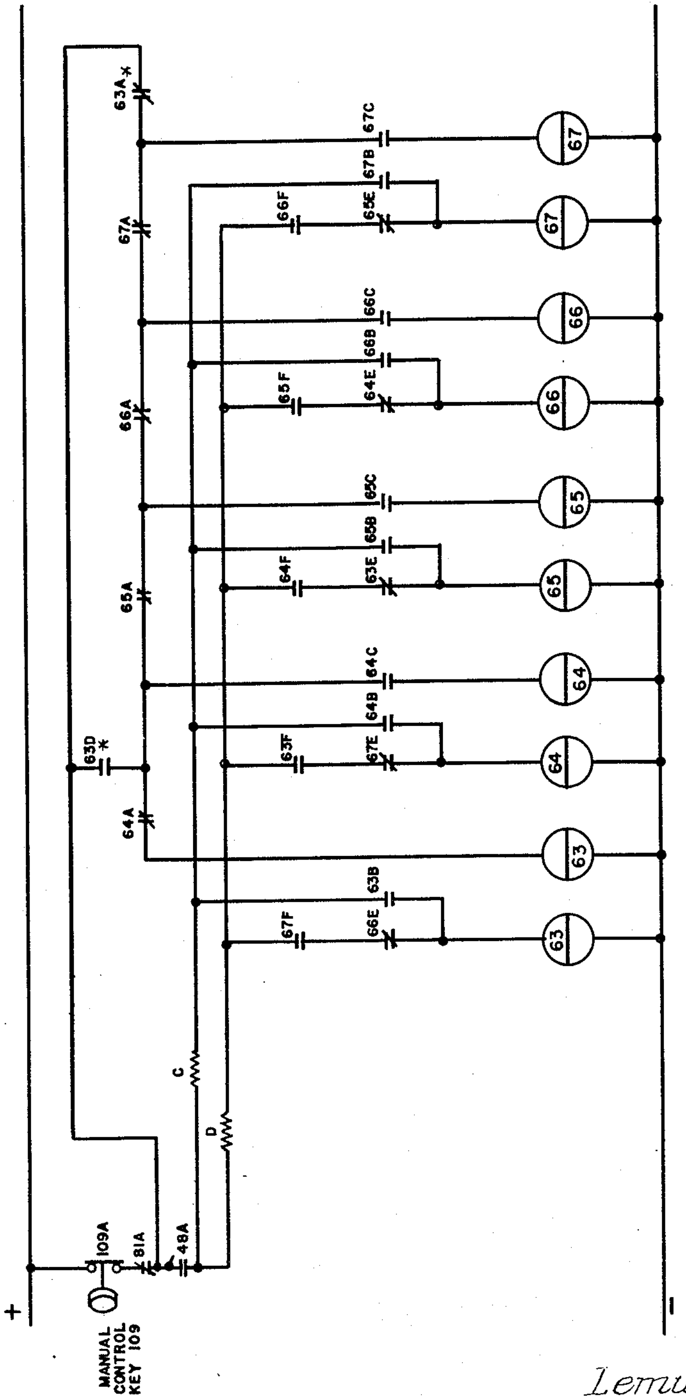

The penny counting chain (FIGURE 8) comprises five chain relays 63–67 and associated contacts connected in the general manner of the chopper counting chain (FIGURE 7) described hereinbefore, the penny counting chain being connected to the supply source in the manner described in FIGURE 7A, and additionally over pulsing contacts **48*a* of the penny count relay 48 whereby with each operation of the penny count relay 48 responsive to the passage of a penny through the mechanical counter contacts 48*a*** are operated to pulse the penny counting chain (FIGURE 8).

More specifically, relay 63 of the penny counting chain is normally operated over the path extending from + through contacts 109A, 81A, 63A, 67A, 66A, 65A, 64A and the high resistance winding of relay 63 to —. Relay 63 at its contact 63D establishes a high resistance winding path from + through contacts 109A, 81A, 63D, 64A, and the high resistance winding of relay 63 to —. Relay 63 at its contacts 63B also closes a low resistance winding path to the pulsing contact; at its contacts 63F prepares a circuit for relay 64; and at its contacts 63E holds the circuits of relay 65 open so that the next pulse does not operate relay 65.

As the pennies pass through the mechanical counter, penny count relay 48 (FIGURE 7) pulses a corresponding number of times and at its contacts 48 advances the chain a corresponding number of steps. Briefly with the first closure of contacts 48A, relay 64 operates over the circuit from + through contacts 109A, 81A, 48A, resistor D, contacts 63F, 67E, and the winding of relay 64 to —.

The advancement of the chain which can count ten pennies by recycling is as follows:

| | | | |
|---|---|---|---|
| 1st penny | +48<br>—48 | +64<br>—63 | |
| 2nd penny | +48<br>—48 | +65<br>—64 | |
| 3rd penny | +48<br>—48 | +66<br>—65 | |
| 4th penny | +48<br>—48 | +67<br>—66 | |
| 5th penny | +48<br>—48 | +63<br>—67 | Pulse to nickel counting chain. |
| 6th penny | +48<br>—48 | +64<br>—63 | |
| 7th penny | +48<br>—48 | +65<br>—64 | |
| 8th penny | +48<br>—48 | +66<br>—65 | |
| 9th penny | +48<br>—48 | +67<br>—66 | |
| 10th penny | +48<br>—48 | +63<br>—67 | Pulse to nickel counting chain. |

As indicated above, during the fifth penny count and specifically during the interval between the operation of relay 63 and the release of relay 67, a pulse is provided to advance the nickel counting chain one step (contacts 63H, 67H, FIGURE 9, as more fully described hereinafter). Manifestly, if eight pennies are deposited, the penny chain will go through one complete cycle to register a nickel on the nickel counting chain and advances three steps to register a three penny count. If the pennies are deposited, two pulses are transmitted to the nickel counting chain as above.

NICKEL COUNTING CHAIN

Figure 9:
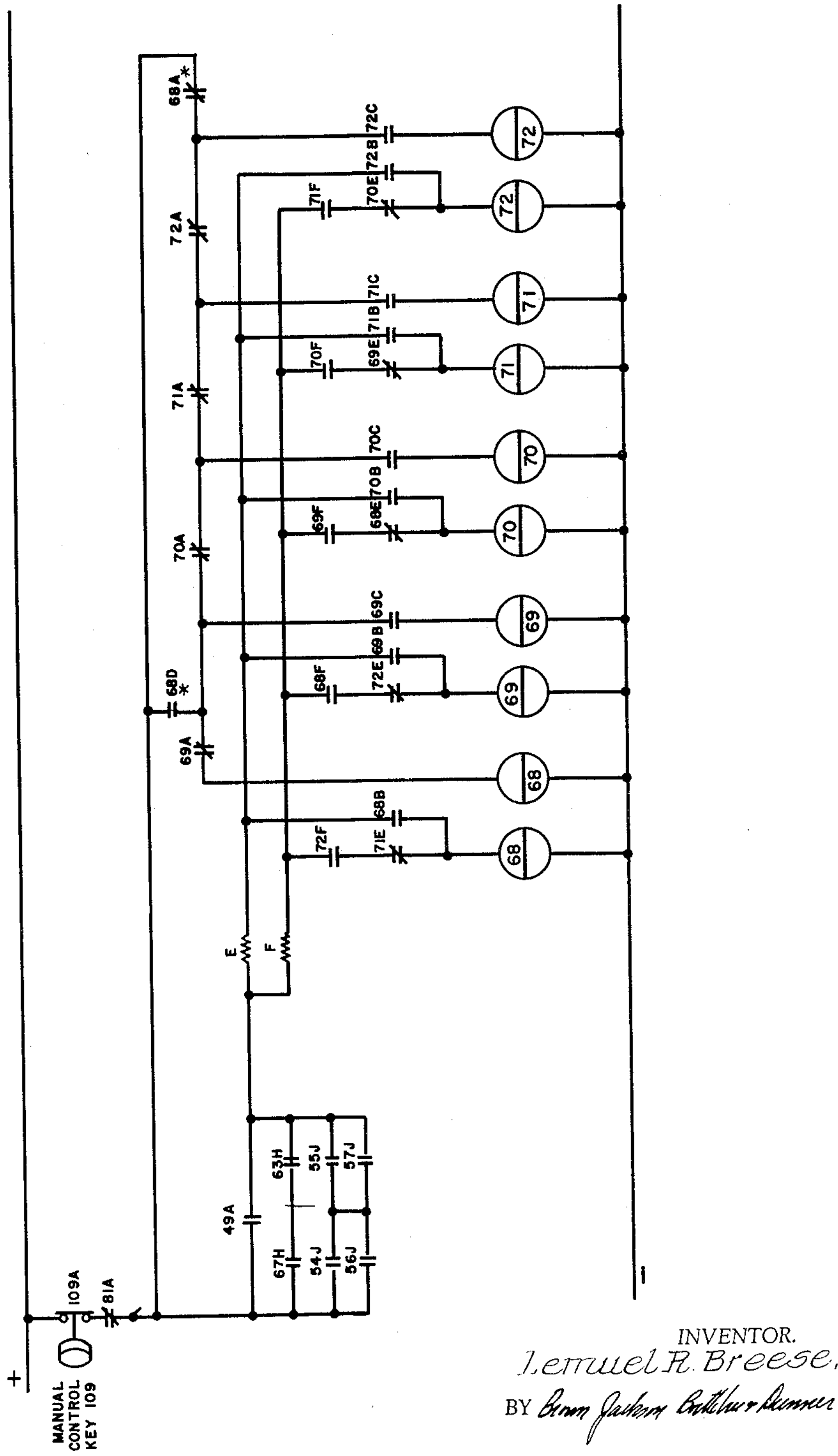

The nickel counting chain of FIG. 9 comprises nickel chain relays 68–72, and is connected to the source or multiple with the other species, as shown in FIG. 7A. The first chain relay 68 is normally operated over the path from + through contacts 109A, 81A, 68A, 72A, 71A, 70A, 69A, and the high resistance winding of relay 68 to —. Relay 68 at its contacts 68D which close before contacts 68A open locks over the path from + through contacts 109A, 81A, 68D, 69A and the high resistance winding to —; at its contacts 68B closes a low resistance winding path to the pulsing contact; at its contacts 68F prepares a circuit for relay 69; and at its contacts 68E holds the circuit of relay 70 open.

With the passage of the nickels through the mechanical counter, relay 49 (FIG. 7) at its contacts 49A pulses the nickel counting chain to advance same in the count thereof. Also, whenever contacts 67H and 63H are simultaneously operated as the fifth penny of a group is counted, a circuit is closed in parallel with contacts 49A as is obvious from the drawing, which results in registering the five pennies as a nickel. Also a twenty cent token is registered as five nickels whenever contacts 54J and 55J are simultaneously operated, whenever contacts 55J and 56J are simultaneously operated, whenever contacts 56J and 57J are simultaneously operated, and whenever contacts 54J and 57J are simultaneously operated.

QUARTER COUNTING CHAIN

The quarter counting chain (FIG. 10) is in principle a different type of counting chain than those already described, and functions in a different manner to count the quarters deposited. The chain basically comprises two relays 73, 74 connected in multiple with the other species counting chain in the manner shown in FIG. 7A. Quarter count relay 59 (FIG. 7) operates with the passage of each quarter through the mechanical counter and at its contacts 59A operates relay 73 over the path extending from + through contacts 109A, 81A, 74B, 59A, 74C, and the winding of relay 73 to —.

Relay 73 and at its contacts 73A locks in series with relay 74 over the path extending from +, contacts 109A, 81A, winding of slugged relay 74, contacts 73A, and the winding of relay 73 to —. At this time relay 74 is shunted over the following path: winding of relay 74, contacts 74B, 59A, 74C, 73A back to the other side of the winding of relay 74. As contacts 59A open at the end of the pulse, the shunt is removed from the winding of relay 74 which then operates in series with relay 73, holding relay 73 operated.

As a second quarter passes through the mechanical counter, contacts 59A close to operate relay 74 over a circuit from + through contacts 109A, 81A winding of relay 74, contacts 74A, 59A, and 74D to — (open contacts 74B preventing relay 74 from being shunted). Relay 73 is shunted over the path which extends from the winding of relay 73 over contacts 73A, 74A, 59A, 74D to the other side of the winding of relay 73, and relay 73 therefore releases.

As contacts 59A open at the end of this pulse, the holding circuit of relay 74 is opened, and open contacts 74C prevent 74 from holding in series with 73 at this time. Accordingly, relay 74 releases, returning the quarter count circuit to normal.

As will become more apparent hereinafter, a series circuit comprising contacts 58A and make contacts 15N of the class relay 15, (FIG. 3) assigned to quarter value operation is connected in parallel with contacts 59A in the quarter counting chain. Thus if a quarter token is received from the driver of a vehicle which the attendant classifies as requiring a quarter fare, the quarter chain will respond thereto in registering a quarter. However if a quarter token is received in lieu of a quarter from the driver of a vehicle which the attendant classifies as requiring other than a quarter, the quarter chain will not respond thereto. This provision is made to enable the system to respond to quarter tokens selectively as required when quarter tokens are sold at cut rate in quantity for a particular type of vehicle. It will also be seen that when relays 72 and 68 are simultaneously in the operated position incident to the registration of the fifth nickel on the nickel counting chain, a series circuit comprising contacts 72H and 68H is in parallel with contacts 59A so that five nickels are registered on the quarter counting chain as a quarter thus transferring the count from the nickel chain to the quarter chain.

The sequence of operation of the quarter chain is summarized as follows:

| | | | |
|---|---|---|---|
| 1st quarter | +59 | | |
| | −59 | +73 | |
| | | +74 | |
| 2nd quarter | +59 | | |
| | −59 | −73 | Pulse to half-dollar counting chain. |
| | | −74 | |

Thus with relay 74 in the operated position and relay 73 in the released position, a pulse is sent by contacts 74G, 73C to the half-dollar chain to transfer the two quarter registration on the quarter chain to a half-dollar registration on the half-dollar chain.

HALF-DOLLAR COUNTING CHAIN

The half-dollar chain of (FIG. 11) is connected across the supply source in the manner of the drawing in FIG. 7A, and basically comprises six relays connected in the manner of the chopper chain (FIG. 7). The first half-dollar chain relay 75 is normally operated over the path from + through contacts 109A, 81A, 75A, 80A, 79A, 78A, 77A, 76A, and the winding of relay 75 to negative. Relay 75 establishes two holding paths for itself and closes other circuits which are obvious from what has preceded.

As half dollars are received, contacts 60D pulse, advancing the chain as follows.

| | | |
|---|---|---|
| 1st half-dollar | +60D | +76 |
| | −60D | −75 |
| 2nd half-dollar | +60D | +77 |
| | −60D | −76 |
| 3rd half-dollar | +60D | +78 |
| | −60D | −77 |
| 4th half-dollar | +60D | +79 |
| | −60D | −78 |
| 5th half-dollar | +60D | +80 |
| | −60D | −79 |
| 6th half-dollar | +60D | +75 |
| | −60D | −80 |

It should be noted that a series circuit comprising break contacts 73C of relay 73 and make contacts 74G of relay 74 is in parallel with contacts 60D so that during the interval that relay 74 is operated and 73 released upon registration of the second quarter on the quarter counting chain, a pulse is transmitted to the half-dollar counting chain to transfer the two quarter count to a half-dollar count. Since this two quarter transfer is taking place simultaneously with independent registration of a half-dollar, as when the circuit through contact 73C and 74G is completed at the same time that contacts 60D are closed, the system is arranged to prevent loss of either of the half-dollar counts.

Referring back to the fifty cent guard circuitry of FIG. 7, whenever both counts are attempted, a circuit is completed to operate sleeved relay 61 as follows: +, contacts 73B, 74E, 60B, and the winding of relay 61 to −; relay 61 locking over its own contacts 61A through contacts 60C and 74E in parallel to + until both relays 60 and 74 release. Relay 61 at its contacts 61B operates sleeved relay 62 over an obvious circuit.

When both of relays 60 and 74 have released, the circuit of relay 61 is opened and relay 61 releases after an interval as determined by its sleeved characteristic. When relay 61 is released, it opens its contacts 61B, opening the circuit of relay 62 which releases after an interval as determined by its sleeved characteristic.

Figure 11:
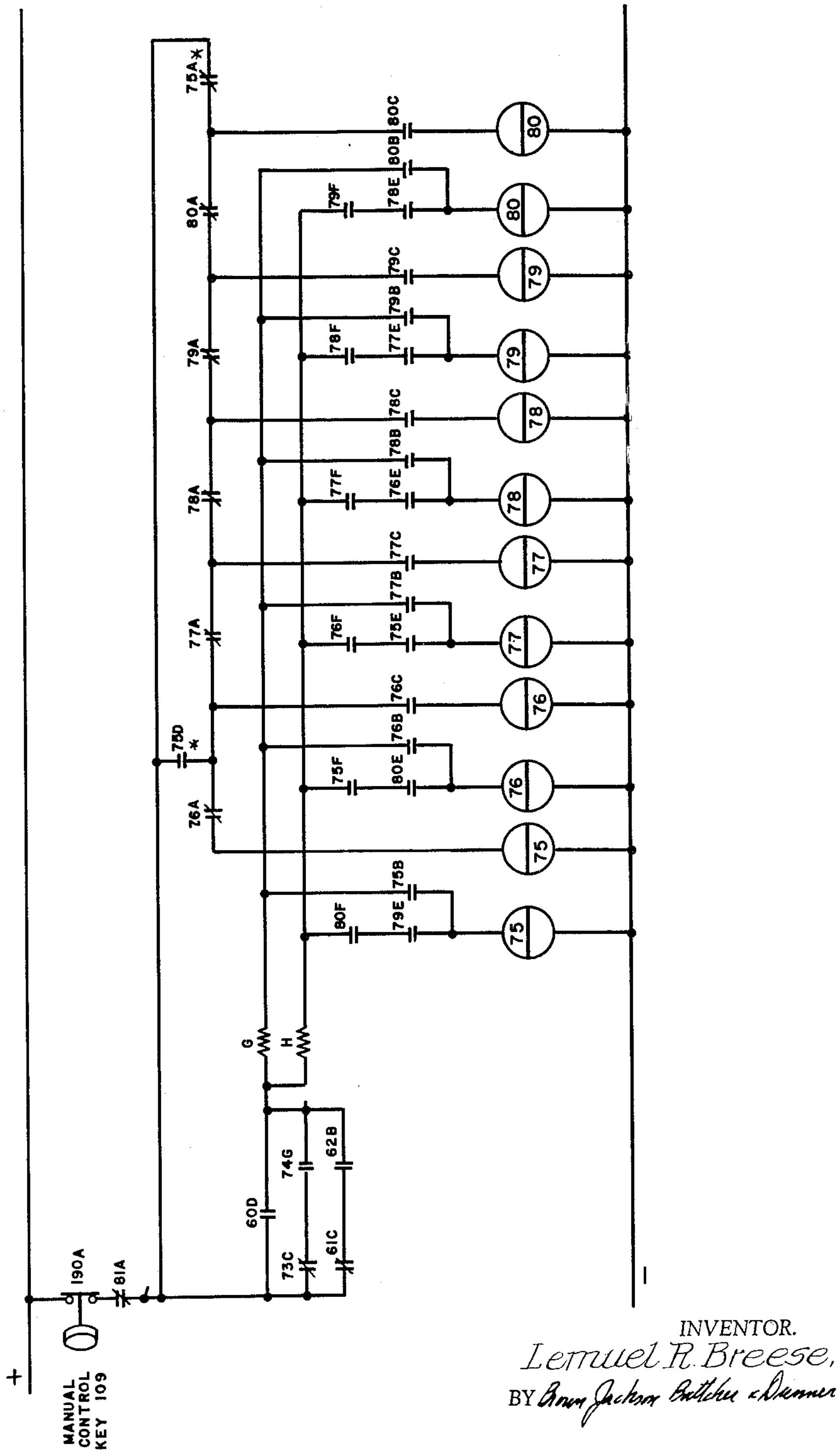
Figure 12:
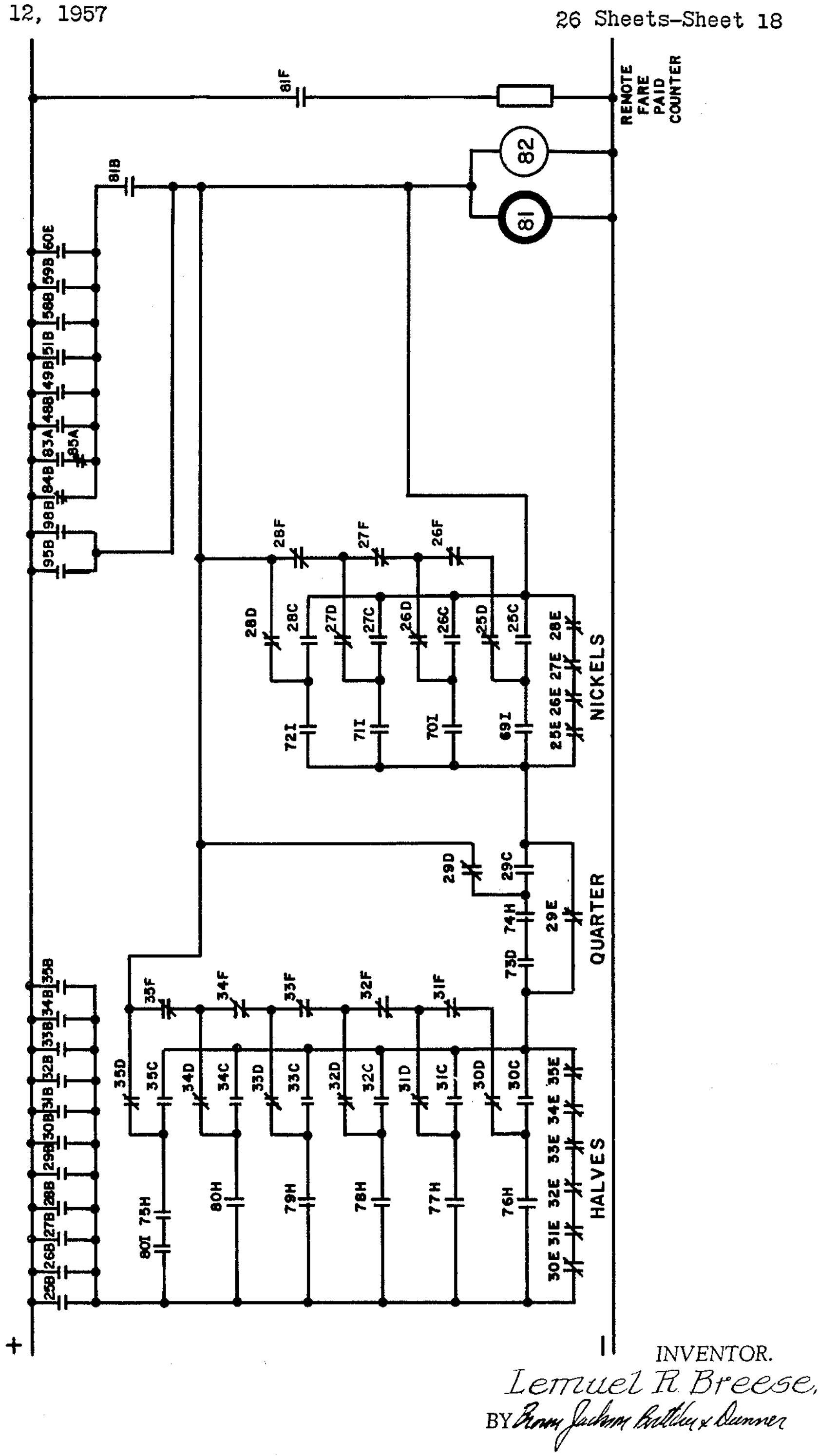

Referring now to the upper left corner of FIG. 11, during the interval between the release of relay 61 and that of 62, a circuit is completed in parallel with contacts 60D through contacts 61C and 62B to deliver an extra pulse to the half-dollar chain to compensate for the pulse which was lost.

Referring back to FIG. 7, break contacts 62A of relay 62 are connected in series with the winding of relay 60 so that if a subsequent half-dollar operates contacts 46 with relay 62 still operated, relay 60 cannot reoperate and a half-dollar lost by holding relay 61 which in turn would hold 62. Instead, relay 62 releases and then through contacts 62A, relay 60 operates to register the half-dollar after the synthetic pulse has ended. If relay 60 is in the operated position when relay 62 operates, it will be held through contacts 60A as long as contacts 46 extends + potential thereto. In this manner relay 61 is maintained operated, holding relay 62 until the end of the regular half-dollar pulse.

TREADLE

Verification means including treadle 9, axle counting chain (FIG. 15) and axle check means (FIG. 16) are provided for the purpose of checking the characteristics of the vehicle (the number of axles) as registered on the axle memory equipment (FIG. 6) by the attendant, with the number of axles on the vehicle as counted by the verification means. That is, an axle count is made to enable the equipment in box 5 to determine whether the number of axles on the vehicle which passes over the treadle corresponds to the class of vehicle for which a fare was paid and registered by the species chains described above. If the correct number of axles is detected, the green light is extinguished and the red light is lighted (also a fare paid count is reduced), without any alarm. If an incorrect number of axles detected, alarm light 10 is lighted and alarm bell 11 is rung.

Briefly the detector means for the verification means, including the treadle 9 and axle counting chain 15, are operative whenever an axle passes over the treadle 9 (FIG. 1), the treadle closing the "Treadle Switch Makes Contacts," (FIG. 14) to operate a treadle relay 86 over a path extending from + through the "Treadle Switch Make Contacts," contacts 86C and the winding of relay 86 to −. The treadle relay 86 in turn advances the axle counting chain 15 in the count of the axles of the vehicle passing thereover.

Figure 14:
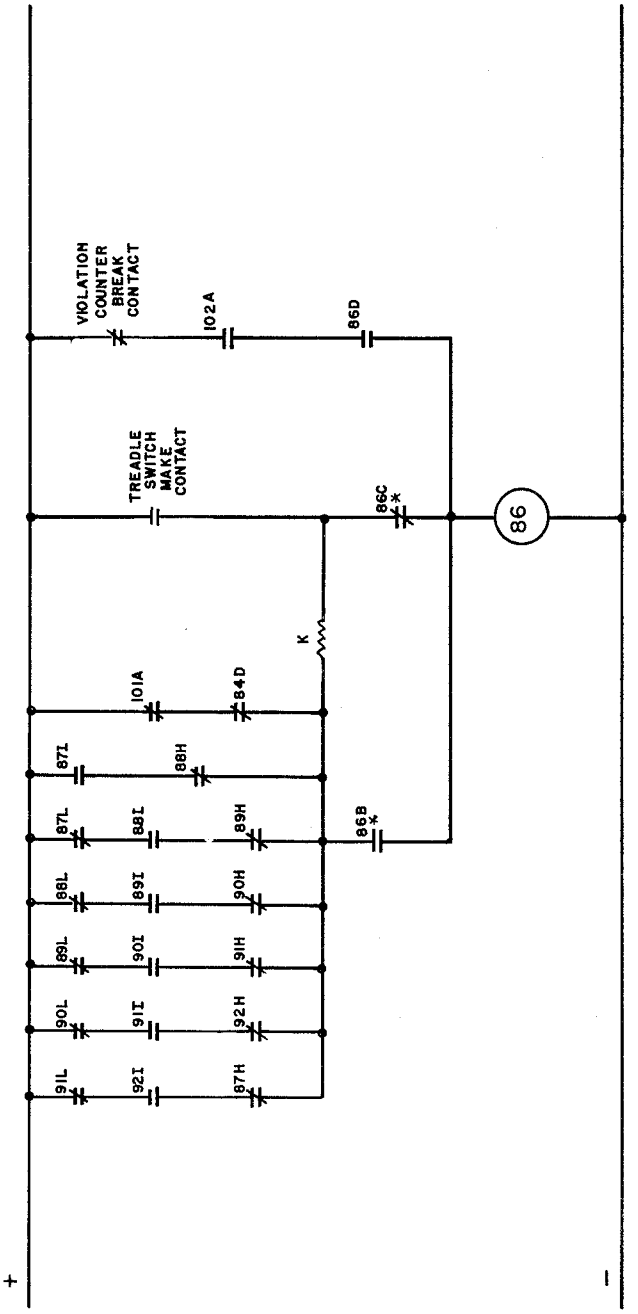

More specifically, treadle relay 86 at its contacts 86B completes a holding circuit for itself over the path from + through the treadle switch make contacts, resistor K, contacts 86B which close before contacts 86C open, and the winding of relay 86 to −; and at its contacts 86E (FIG. 15) pulses the axle counting chain. When the treadle switch contacts open, relay 86 releases. On very short treadle pulses, the circuitry in the upper left of FIG. 14 is operative as will be more fully described hereinafter.

AXLE COUNTING

Referring now to FIG. 15, the axle counting chain comprises relays 87–92. As soon as a fare paid has been registered (as more fully described hereinafter), the first axle counting chain relay 87 operates from + over contacts 93A, 84E, 83H, 87A, 92A, 91A, 90A, 89A, 88A and the high resistance winding of relay 87 to negative operates relay 87. Relay 87 at its contacts 87D which close before contacts 87A open, establishes a locking path from + through contacts 93A, 84E, 83H, 87D, 88A, and the high resistance winding of relay 87 to —. Relay 87 at its contacts 87B prepares the following holding circuit: +, contacts 93A, 84E, 83H, 86E, resistor I, contacts 87B, and the low resistance winding of relay 87 to —. Relay 87 also at its contacts 87F prepares a circuit for the first pulse of the treadle switch contacts to operate relay 88; and at its contacts 87E opens the operating path of relay 89 so that the first treadle pulse does not operate relay 89.

As axles pass over the treadle, relay 86 pulses, driving the chain to count the axles as follows:

| | | |
|---|---|---|
| 1st axle | +86<br>−86 | +88<br>−87 |
| 2nd axle | +86<br>−86 | +89<br>−88 |
| 3rd axle | +86<br>−86 | +90<br>−89 |
| 4th axle | +86<br>−86 | +91<br>−90 |
| 5th axle | +86<br>−86 | +92<br>−91 |
| 6th axle | +86<br>−86 | +87<br>−92 |

The different manners in which the system utilizes the memorized deposits by the different chains and the information provided by the treadle apparatus is now set forth in detail.

SINGLE FARE OPERATION

In the most basic operation identified as a single fare operation (FIG. 1A) the system is operative to receive the toll for one vehicle; to provide access to the toll facility responsive thereto and to check the toll received against the toll required for a vehicle of such class.

Figure 2:
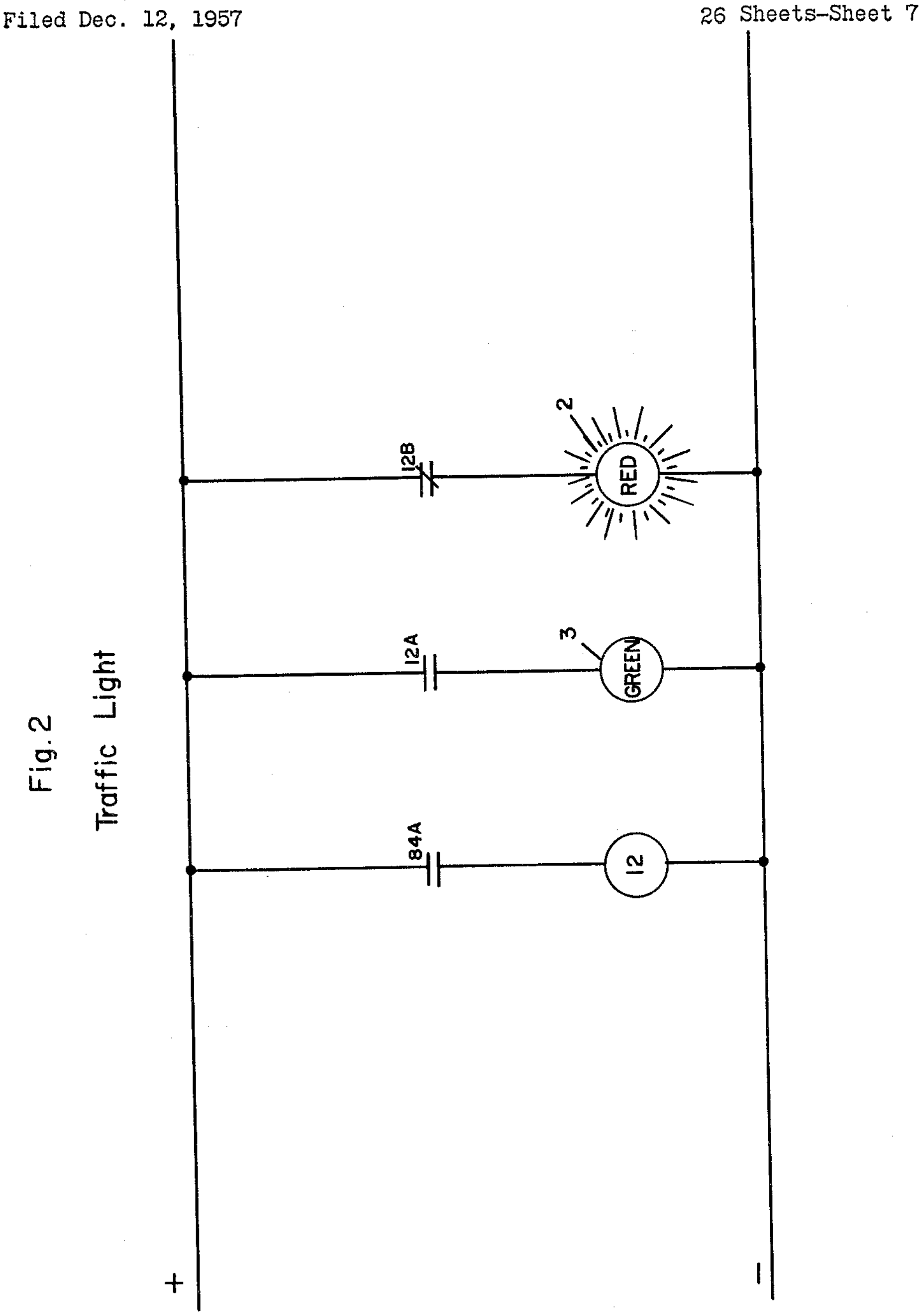

Assuming now that a "class 1" vehicle which may be a motorcycle, for example, approaches the toll station for the purpose of obtaining access to the toll facility. The red light 2 on the traffic light adjacent the point of entry instructs the driver to stop for the purpose of depositing the required toll. Referring to FIG. 2, the circuit by which this red light is lighted may be traced from + through normally closed break contacts 12B of traffic light relay 12 and the red light to —. It should be observed that the circuit of the green light passes from + to — through normally open contacts 12A of the same relay 12. Also, the circuit for operating the traffic light relay 12 passes through normally open contacts 84A of relay 84 for contact in a manner more fully set forth hereinafter.

The attendant examines the approaching vehicle and momentarily depresses the class 1 button (FIG. 3), lighting the correct fare indication of $.10 on the fare signal unit and also lighting the "DEPOSIT" sign, thus indicating to the driver the amount of the toll required. The driver deposits coin(s) amounting to $.10, and the system after checking the amount received against the amount indicated on the display sign turns the traffic light green. The motorcycle proceeds along the toll road and as it passes over the treadle, the system turns the traffic light red, and returns the toll collecting equipment to normal. The details of operation of the system in effecting such toll collection are now set forth.

When the attendant depresses the class 1 button on the register 4, such information is fed into a class register (FIG. 3) to condition the system for a vehicle of such class.

The class register basically comprises a set of class relays 13–22, each of which is assigned to represent in the system, a predetermined class of vehicle. Each class button controls the operation of the corresponding class relay from the master + and bars over a circuit including the contacts 23A of a correction button, contacts 24A of an unattended button, and contacts 36A–39A of the axle memory relays.

Thus with the operation of the class 1 button, an operating circuit is completed for the associated class relay 13, the circuit extending from + through contacts 102C, closed break contacts 24A of the non-operated locking type unattended operation button 24, closed break contacts 23A of the non-operated correction button 23, contacts 38A, 37A, 36A (and also contacts 39A in parallel therewith), non-operated contacts 22B, 21B, 20B, 19B, 18B, 17B, 16B, 15B, 14B, 13B, closed break contacts in series of class buttons for classes 10–2, make contacts of operated class 1 button, and the winding of relay 13 to —. Relay 13 locks over its contacts 13A, which close before contacts 13B open, 14B, etc., as previously traced to +, independent of the class 1 button. The other sets of class buttons and relays are similarly operative.

It should be observed that each class *button* is effective at its make contacts to route + to an associated relay and at its break contacts to disconnect any lower numbered class buttons and associated class relays. Also when any class *relay* operates, it disconnects + from all lower numbered relays and also disconnects + from the class buttons. Thus only one registration can be made at any time, the higher class of the two being favored.

In response to the operation of the class button by the attendant, the corresponding class relay controls the fare indicator and deposit sign equipment (FIG. 4) to illuminate the values preassigned to such class vehicle.

The fare indicator and deposit sign circuit basically comprise a set of sign control units "dollars 0–9, dimes 0–9, cents 0–9," for energizing the various digital values of the "dollar," "dimes" and "cents" component of the toll to be displayed on display device 6. Such units are basically controlled in their energization from the master + and — power busses by the contacts 13C–22E on the class register relays 13–22 (FIG. 3) in the attendant embodiment, each class register relay, such as 13, having its contacts such as 13C–13E connected to control the sign control units associated with the toll preassigned to the class represented thereby. A further set of contact, such as 13K, control illumination of the deposit sign on display device 6. In the present example, as class one relay 13 operates it is effective at its contacts 13K to light the "DEPOSIT" sign over the path extending from + through contacts 13K and the "DEPOSIT" sign to —. As can be seen, a cross-connecting arrangement is provided between contacts 13C–13E of the class register relay 131 and the signal control units which register ten cents on the display device 6. That is, to register $.10, contacts 13E are cross connected to the "0" value unit of the signal control unit so that a circuit is completed from + through contacts 13E, cross-connect, "0" unit to —, thus lighting a zero in the units space on the display device 6. Similarly contacts 13D are cross-connected to the "1" value unit of the signal control unit so that a circuit is completed from + through contacts 13D, cross-connect, "1" unit to —, thus lighting a "1" in the tens space on the display device 6. As no value of dollars is required, contacts 13C will not be cross-connected. Actually this cross-connect, as well as certain other cross-connections described hereinafter, is accomplished by a "programming" plug which is inserted into a jack to provide convenience in adjustment of the toll required for the different classes. In an unattended operation, a control button 24 (FIG. 17) is operated and the contacts 24E–24G thereon energize the signal control counts which display the fixed toll which is to be required from vehicles of all classes, such operation being described in more detail hereinafter.

Figure 5:
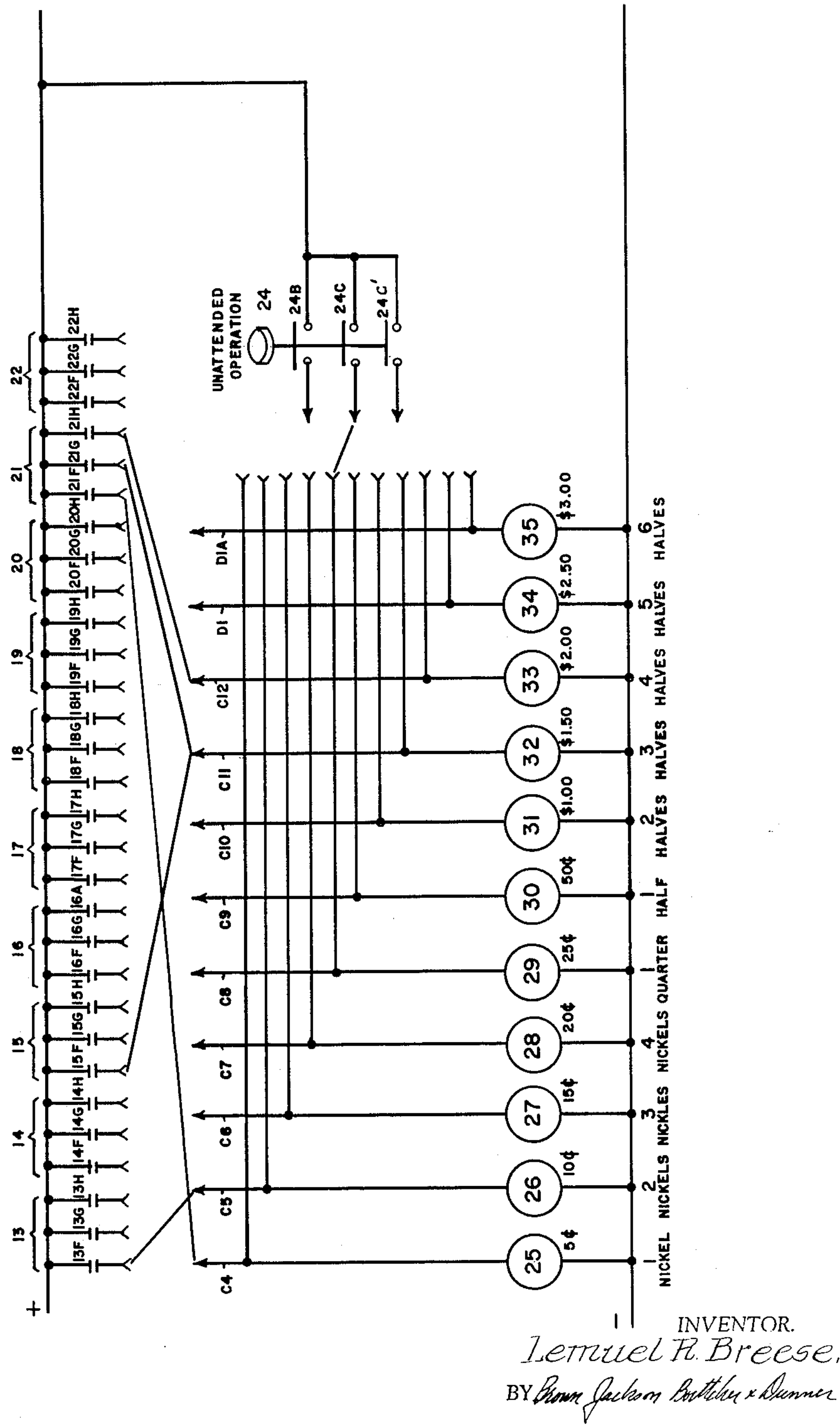

The system, in addition to displaying the toll required to the driver must also mark in its own equipment the amount requested. Such marking is effected in the fare memory relay circuit (FIG. 5). Briefly, the fare memory circuit comprises a set of memory relays 25–35, each of which represents as operated a predetermined monetary value, and which when operated in different combinations, represent the total of their individual assigned values. The memory relays 25–35 are operatively controlled by the class relays, the contacts of the class relays being connected in circuit to the memory relays which correspond to the toll assigned to such class. Thus in the present example class one relay 13 has its contacts 13F connected to control operation of relay 26 (10¢). Specifically relay 13 operates fare memory relay 26 over the path from + through contacts 13F, cross-connect, conductor C5, winding of relay 26 to —. The memory relay 26 as operated in turn operates a set of associated marking contacts 26B, 26C, 26D, 26E, and 26F (FIG. 12) in the comparison means comprising momentary fare paid circuit (FIG. 12) for the purpose of comparing the sum deposited with the sum required as more fully described hereinafter.

In a similar manner the operation of the class one button also effects marking in the system of the number of axles on the vehicle of the class represented thereby. Such marking is effected in the axle memory relay circuit (FIG. 6) which basically comprises a set of three axle memory register relays 36–38, each of which is preassigned to represent a predetermined number of axles, as operated, and an axle transfer relay 39 which prepares the axle memory relays 46–38 for use in the verification test only after the proper fare has been paid.

The axle memory relays 36–38 are prepared for operation by the class relays, the class one relay 13 in the present example having its characteristic memory *13i*, *13j* connected to prepare axle memory relay 36 (which represents two axle vehicles—class one) for subsequent operation as more fully described hereinafter. The axle memory relays 36–38 are assigned the following classifications herein:

Two axles—Relay 36 operated
Three axles—Relay 37 operated
Four axles—Relay 38 operated
Five axles—Relays 36 and 38 operated
Six axles—Relays 37 and 38 operated In the present embodiment, the following arbitrary values were assigned to the various class register relays (many other assignments being possible).

| Class Register Relay | No. of Axles | Fare Required |
|---|---|---|
| 13 | 2 | $ .10 |
| 14 | 2 | .20 |
| 15 | 2 | .25 |
| 16 | 2 | .60 |
| 17 | 3 | .35 |
| 18 | 3 | .50 |
| 19 | 3 | .85 |
| 20 | 4 | 1.00 |
| 21 | 5 | 2.30 |
| 22 | 6 | 3.00 |

The fare memory relays were assigned values as follows.

| Fare memory relay: | Fare represented |
|---|---|
| 25 | $ .05 |
| 26 | .10 |
| 27 | .15 |
| 28 | .20 |
| 29 | .25 |
| 30 | .50 |
| 31 | 1.00 |
| 32 | 1.50 |
| 33 | 2.00 |
| 34 | 2.50 |
| 35 | 3.00 |

The contacts of class register relays are cross-connected to pull one, two, or three of the fare memory relays 25–35 to represent the required fare according to the general pattern in which one of the three fare memory relays operated represents one, two, three, or four nickels; another relay operated represents a quarter, and the remaining relay operated represents from one to six half-dollars.

The following chart illustrates the amount represented by the fare memory relays in the different conditions of operation.

CHART A

| Amount to be Represented | Half-Dollar(s) Relay Operated | Quarter Relay Operated | Nickel(s) Relay Operated |
|---|---|---|---|
| .05 | ---------- | ---------- | 25 |
| .10 | ---------- | ---------- | 26 |
| .15 | ---------- | ---------- | 27 |
| .20 | ---------- | ---------- | 28 |
| .25 | ---------- | 29 | ---------- |
| .30 | ---------- | 29 | 25 |
| .35 | ---------- | 29 | 26 |
| .40 | ---------- | 29 | 27 |
| .45 | ---------- | 29 | 28 |
| .50 | 30 | ---------- | ---------- |
| .55 | 30 | ---------- | 25 |
| .60 | 30 | ---------- | 26 |
| .65 | 30 | ---------- | 27 |
| .70 | 30 | ---------- | 28 |
| .75 | 30 | 29 | ---------- |
| .80 | 30 | 29 | 25 |
| .85 | 30 | 29 | 26 |
| .90 | 30 | 29 | 27 |
| .95 | 30 | 29 | 28 |
| 1.00 | 31 | ---------- | ---------- |
| 1.05 | 31 | ---------- | 25 |
| 1.10 | 31 | ---------- | 26 |
| 1.15 | 31 | ---------- | 27 |
| 1.20 | 31 | ---------- | 28 |
| 1.25 | 31 | 29 | ---------- |
| 1.30 | 31 | 29 | 25 |
| 1.35 | 31 | 29 | 26 |
| 1.40 | 31 | 29 | 27 |
| 1.45 | 31 | 29 | 28 |
| 1.50 | 32 | ---------- | ---------- |
| 1.55 | 32 | ---------- | 25 |
| 1.60 | 32 | ---------- | 26 |
| 1.65 | 32 | ---------- | 27 |
| 1.70 | 32 | ---------- | 28 |
| 1.75 | 32 | 29 | ---------- |
| 1.80 | 32 | 29 | 25 |
| 1.85 | 32 | 29 | 26 |
| 1.90 | 32 | 29 | 27 |
| 1.95 | 32 | 29 | 28 |
| 2.00 | 33 | ---------- | ---------- |
| 2.05 | 33 | ---------- | 25 |
| 2.10 | 33 | ---------- | 26 |
| 2.15 | 33 | ---------- | 27 |
| 2.20 | 33 | ---------- | 28 |
| 2.25 | 33 | 29 | ---------- |
| 2.30 | 33 | 29 | 25 |
| 2.35 | 33 | 29 | 26 |
| 2.40 | 33 | 29 | 27 |
| 2.45 | 33 | 29 | 28 |
| 2.50 | 34 | ---------- | ---------- |
| 2.55 | 34 | ---------- | 25 |
| 2.60 | 34 | ---------- | 26 |
| 2.65 | 34 | ---------- | 27 |
| 2.70 | 34 | ---------- | 28 |
| 2.75 | 34 | 29 | ---------- |
| 2.80 | 34 | 29 | 25 |
| 2.85 | 34 | 29 | 26 |
| 2.90 | 34 | 29 | 27 |
| 2.95 | 34 | 29 | 28 |
| 3.00 | 35 | ---------- | ---------- |

The money deposited is counted and the amount registered for comparison purposes with the amount required as marked on the fare memory relays (FIG. 5). More specifically, as the driver of the motorcycle now deposits a dime in the coin hopper 8, the pair of contacts 42 (FIG. 7) operate relay 49 twice and relay 50 once. The operation of relay 50 provides a remote indication that a dime was received over circuitry not shown. Relay 49 operates and at its contacts 49A (FIG. 9) sends two pulses to the nickel chain, driving this chain in the manner heretofore described until it comes to rest with relay 70 operated, thus translating the dime into two nickels.

Such amount is transferred to the momentary fare paid circuit (FIG. 12) which basically comprises a pair of momentary fare paid relays 81 and 82 which as operated indicate to the system that the required fare or more has been deposited. The energizing circuits for such relays are controlled by a comparison means comprising a plurality of network circuits, each of which is connected to represent a predetermined one of the species and each of which essentially comprises a first set of marking contacts on the fare memory relays 25–35 for marking the number of each species required in a toll payment and a second set of marking contacts on relays 68–76 of the nickel, quarter and half-dollar counting chains marking the number of each species received in the toll payment. The pattern of connection of the first and second sets of marking contacts is described more fully hereinafter; such pattern in each operation establishing a circuit from the + bus to the fare paid relay 81, 82 only if the values amount received corresponds to the amount deposited.

In the present example, the fare memory relay 26 has operated to indicate to the system that a ten cent fare was required, and such relay at contact 26B–F marks such requirement in the fare paid comparison circuit. As the received money is counted, the counting chain relays 63–76 mark the amount received in the momentary fare paid circuit by operating the associated ones of the marking contacts 69I–72I, 73D, 74D, 76H–80H, etc. (in the present example, nickel counting chain relay 70 operated to mark ten cents received). As a result, at this time a circuit is completed to operate momentary fare paid relays 81 and 82: +, contacts 26B, 30E, 31E, 32E, 33E, 34E, 35E, 29E, 70I, 26C, and the winding of relays 81 and 82 in parallel to —. Thus the momentary fare paid circuit compares the received amount of money with the amount requested to insure that as much as or more than the amount of classified fare is received.

If, by accident, less than the required amount was deposited (as for example, $.05 in the present example) contacts 69I would be closed but contacts 26F would be open (since the memory relay 26 was operated to indicate ten cents is required) and relays 81 and 82 will not operate.

In the event that more than the required amount is deposited, as for example fifteen cents in the present example, as relay 70 of the nickel counting chain operates in its progress toward the third step, the above described circuit through contacts 70I is completed and operates relays 81 and 82. A similar operation occurs with the deposit of twenty cents. If a quarter had been received, + through contacts 26B, 30E, 31E, 32E, 33E, 34E, 35E, 73D, 74H, 29D and the winding of relays 81 and 82 to — would operate relays 81, 82. If a half-dollar had been received + through contacts 26B, 76H, 30D, 31F, 32F, 33F, 34F, 35F, and the winding of relays 81 and 82 would operate relays 81, 82.

Figure 3:
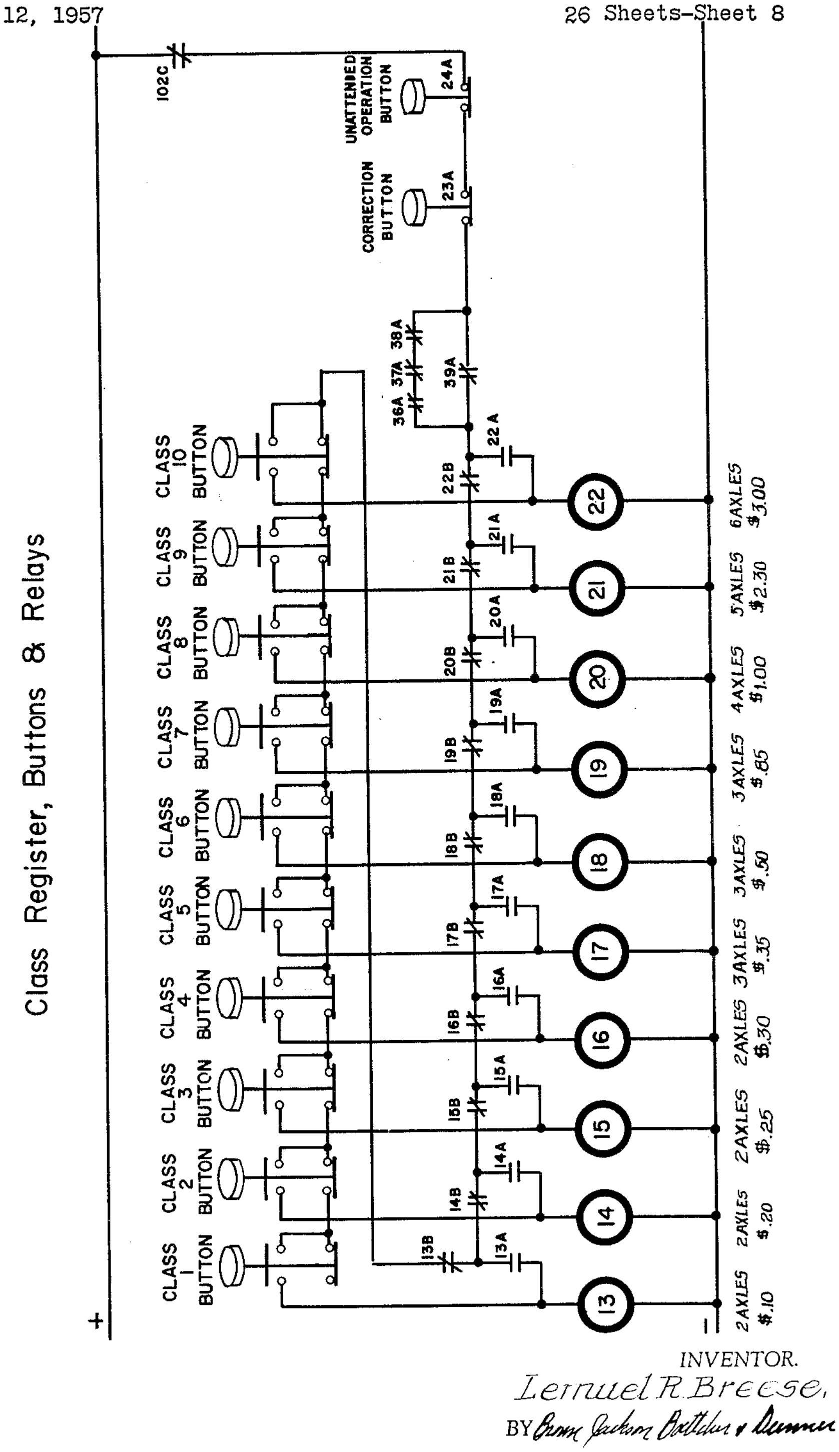

As a general summary, it will be apparent that each class register relay of FIG. 3 operates one, two, or three fare memory relays (FIG. 5) to represent a given amount of money as shown in Chart A, and certain of the fare memory relays represent a various number of halves; another set represents a quarter; and the rest represent various numbers of nickels, whereby the amount of money to be deposited is represented by the closest five cent value.

Contacts of the operated fare memory relays in FIG. 12 in turn provide means for checking against the coin counting chains to determine whether as much or more than the required amount has been received. No matter what denominations of coins and tokens are received, they are ultimately registered on the coin counting chains as nickels, quarters and halves. No classification of calls demands less than five pennies which register as a nickel. If a number of pennies are received other than a multiple of five the extraneous pennies are not considered by the circuit of FIG. 12, although they are counted on the penny counting chain. If as much or more than the required amount has been received, relays 81 and 82 operate as marking means of this fact, their marking being further described hereinafter.

As noted above, whenever the fare memory relays are operated, the amount required is expressed in terms of half-dollars, quarters, and nickels in the network of FIG. 12 according to a pattern now specified in more detail. Specifically, all of the rate relays representing multiples of half-dollar values have normally closed break contacts in series (i.e. contacts 30E, 31E, 32E, 33E, 34E, and 35E) shunting the half-dollar value comparison network. Thus if no half dollar values are required, the half comparison network is shunted and accordingly by-passed. The rate relay representing a quarter value has normally closed break contacts 29E shunting the quarter value comparison network so that if a quarter value is not required, the quarter value comparison network is shunted and accordingly by-passed. The rate relays representing multiples of nickel values have normally closed break contacts in series (i.e. contacts 25E, 26E, 27E, 28E) shunting the nickel value comparison network. Thus if no nickel values are required, the nickel value comparison network is shunted and accordingly by-passed.

These three by-passing arrangements are connected in series with each other and in series with the windings of relays 81 and 82 to —. Accordingly, the other side of this series arrangement cannot be connected directly to +, or relays 81 and 82 would be normally operated. Therefore this circuit is connected to + through normally open make contacts in parallel of all fare memory relays (i.e. contacts 25B–35B).

When any fare memory relay(s) are operated, + is extended through make contacts thereof to the half dollar value comparison network. If no half-dollar values are required this + is extended through normally closed contacts 30E–35E to the quarter value comparison network. However, if one or more half dollar values are required, one or more of the contacts 30E 35E will be open, and this + if it gets through to the quarter value comparison network, must pass through the half dollar value comparison network. Thus if one half dollar value is required, contacts 30C of fare memory relay 30 will be closed and contacts 30D thereof opened. If thereafter, contacts 76H of the half-dollar counting chain are closed, indicating receipt of a half-dollar value (in any denominations), + through make contacts of the group 25B–35B, through contacts 76H and 30C is extended to the quarter comparison circuit.

If no quarter values or nickel values are required, this + reaches windings of relays 81 and 82 operating them. However, if a quarter value and/or nickel values are required also, tests are made in these comparison circuits also, with the exception that if two or more half dollar values are received, circuits are completed to the windings of relays 81 and 82 independent of the quarter value and nickel value networks, inasmuch as another half-dollar value would more than equal the highest value (i.e. 45¢) which could be required in the quarter value and nickel value networks.

Thus if contacts 30C are closed and 30D opened indicating to the system that a half-dollar value is required, and if contacts 29E or contacts of the group 25E–28E are opened, indicating that from 5¢ to 45¢ additional is required; if two half dollar pieces are now deposited relay 77 of the half-dollar chain operates and at its contacts 77H closes the following circuit for relays 81 and 82, independent of the quarter value and nickel value comparison networks: +, contacts of the group 25B–35B, contacts 77H, 31D, 32F, 33F, 34F, 35F, and the windings of relays 81 and 82 to —.

If three half-dollar pieces are received this circuit is passed through contacts 78H and 32D; if four half-dollars, through contacts 79H and 33D; if five half-dollars, through 80H and 34D; and if six half-dollars, through 80I, 75H, and 35D.

Assuming now the condition wherein + has been extended through normally closed break contacts 30E–35E to the quarter value comparison network, and that contacts 29E and 29D are open and contacts 29C closed, indicating to the system that a quarter value is required. As quarter counting chain contacts 73D and 74H close responsive to registration of a quarter on the quarter chain, + is extended through contacts 73D, 74H, and 29C to the nickel value comparison network, and if no nickel values are required, this + reaches the windings of relays 81 and 82 through normally closed break contacts 25E–28E. If, however, a half-dollar piece had been received instead of a quarter, as contacts 76H close upon registration of a half-dollar on the half-dollar chain, + is extended through contacts 76H, 30D, 31F, 32F, 34F, 35F to the windings of relays 81 and 82 independent of the quarter value and nickel value comparison networks. Obviously receipt of a greater number of half-dollar pieces would be similarly effective.

Assume now that + has been extended through normally closed break contacts 30E–35E and 29E to the nickel comparison value network and that contacts 26E, 25D, and 26F are operated indicating that a ten cent deposit is required. If only five cents is received, and contacts 69I close as a result of registration of five cents on the nickel chain, + is extended through contacts 69I and 25D but is blocked by open contacts 26F. If ten cents is received this + is extended over contacts 70I, 26C to the windings of relays 81 and 82. Also if fifteen cents were received, this + is extended over the circuit described for receipt of ten cents when the nickel chain passed the ten cent mark in its progress toward $.15. A similar circuit is completed for relays 81 and 82 if twenty cents is received. If a half-dollar piece were received, + is extended over contacts 76H, 30D, 31F, 32F, 33F, 34F, 35F to the windings of relays 81 and 82. The system is similarly operative if 2, 3, 4, 5, or 6 half-dollars are received.

Assume now that $1.00 is required, but that only fifty cents is received. In such event, contacts 31B and 31C would be closed and contacts 31E and 31F would be open to indicate such requirement, 76H would close as the fifty cents is registered on the half-dollar chain and + would be extended through contacts 31B, 76H, 30D but would be blocked by open contacts 31F. If $1.50 were required and only $.50 or $1.00 were received open contacts 32F would block +. If $2.00 were required and only $.50 or $1.00, or $.50 were received, open contacts 33F would block +. An obviously similar condition obtains for greater amounts.

In a similar manner, if $.10 is required and only five cents received, open contacts 26F would block +. If $.15 were required and only $.05 or $.10 were received, contacts 27F would block +. If $.20 were required and only $.05, $.10, or $.15 were received, open contacts 28F would block +.

If $.80 is required (i.e. a $.50 value plus a $.25 value plus a $.05 value) and a half-dollar coin is deposited and registered first, two nickel coins are deposited and registered next, and finally a quarter coin is deposited and registered, the circuit for operating relays 81 and 82 is traced from + through contacts 25B, 29B, and 30B in parallel, through contacts 76H, 30C, 73D, 74H, 29C, 70I, 26D, 27F, 28F, and the windings of relays 81 and 82 to —.

Thus it is apparent that the network of the momentary fare paid circuit (FIG. 12) will complete an operating circuit for the momentary fare paid relays 81, 82 only if the amount indicated as required (or more) is actually deposited by the driver.

Returning now to the specific system operation of the example wherein ten cents was required and ten cents or more was deposited, it will be apparent that relays 81 and 82 operate, and relay 81 at its contacts 81B provides a holding circuit for relays 81 and 82 to + through any operated coin pulse relay contacts of the group 48B, 49B, 51B, 58B, and 60E, if one of the coin pulse contacts is still closed when relays 81 and 82 operate. Additionally relays 81 and 82 have holding circuits through contacts 84B, 83A, and 85A of the fare paid counting chain relays as more fully described hereinafter. Relay 81 at its contacts 81A releases any operated counting chain relays and specifically nickel counting chain relay 70, which releases and at its contacts 70I opens the original operating circuit of relays 81 and 82. However, relays 81 and 82 are locked to contacts of the coin pulse relays and contacts of the fare paid relays until the coin pulse relays have all released and until a fare paid has been registered.

Figure 13:
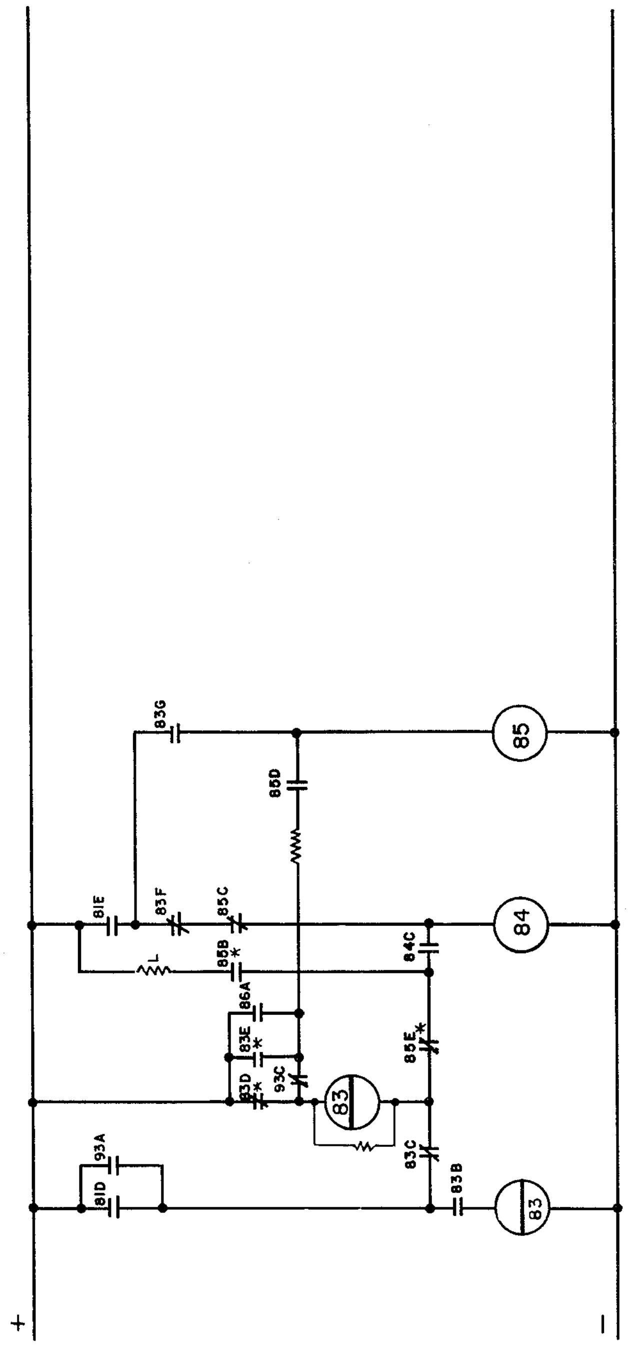

In that the amount of money deposited agrees with the amount required, momentary fare paid relays 81 and 82 effect registration of such fact in the fare paid counting chain (FIG. 13). Such circuit is operative to count the number of fares paid (one or more) for vehicles which have not passed over the treadle. That is, as each fare is paid the counting chain advances one count, and as a vehicle passes over the treadle, one count is removed. Such manner of operation permits the equipment to accept at least two fares before the first vehicle passes over the treadle and thereby provides a more expeditious flow of traffic through the toll collection point. Such manner of operation is described more fully in the portion of the disclosure directed to two fare operation.

As momentary fare paid relay 81 operates in the present example, it is effective at its contacts 81E to operate fare paid chain relay 84 over the path extending from + through contacts 81E, 83F, 85C and the winding of relay 84 to —. Relay 84 operates to extend a circuit over contacts 84C, 85E, the upper winding of relay 83 and contacts 83D to +, the upper winding of relay 83 being shunted over the following path until relay 81 releases: +, contacts 81E, 83F, 85C, 84C, 85E, upper winding of relay 83, contacts 83D to +. The resistor across the winding of relay 83 aids the operating circuit for relay 84. Relay 84 operates and at its contacts 84A completes an energizing circuit for the traffic light relay 12 (FIG. 2), which operates and at its contacts 12B, extinguishes the red traffic light, and at its contacts 12A lights the green traffic light. Relay 84 also opens the holding circuit for relays 81 and 82 at contacts 84B, and at its contacts 84B also operates axle transfer relay 39 (FIG. 6) over the path extending from +, through contacts 93B, 36C, 37C, 38C, 84B, and the winding of relay 39 to —.

Relay 39 operates and locks over contacts 39E to the operated contact(s) 25A–35A (in this case contacts 26A of relay 26), and at its contacts 39 operates axle memory relay 36 over the path extending from + through contacts 131, conductor C1, contacts 39B and the winding of relay 36 to —. It is recalled that contacts 131 were closed as the class one button was originally pushed by the attendant to indicate to the system that the fare was being charged for a two axle vehicle, and axle memory relay 36 in now operating represents the fact that the money received was for a two axle vehicle. Relay 36 operates and locks over the path extending from +, over contacts 93B, 36B, and the winding of relay 36 to — to maintain such fact in the memory equipment.

The release of the counting equipment may now be effected, and as contacts 39A and 36A (FIG. 3) open, relay 13 releases, and at its contacts 13F (See FIG. 5) releases relay 26. Relay 26 releases and at its contacts 26A releases relay 39 (FIG. 6) assuming that all coin pulse relays have released, slow release relay 81 releases and at contacts 81E removes the shunt from the upper winding of relay 83. Relay 83 then operates in series with relay 84 over the path extending from + through contacts 83D, upper winding of relay 83, contacts 85E, 84C, and through the winding of relay 84 to —.

Relay 83 at its contacts 83E which close before contacts 83D open inserts contacts 93C in this series circuit, and at its contacts 83B prepares a holding circuit for relay 83 over its lower winding. Relay 83 at its contacts 83C isolates the coil of relay 84 from the prepared circuit of the lower winding of relay 83, at its contacts 83F, opens the original energizing circuit of relay 84; and at its contacts 83G prepares a circuit for relay 85.

At this time the equipment has received the required fare and has given the green light to the driver indicating that the vehicle may proceed along the toll road. As the vehicle passes over the treadle 9, each set of wheels (each axle) effect the registration of one count which is transmitted by the treadle to the axle counting chain (FIG. 15). Such circuit basically comprises a chain of six relays 87—92 which is similar to the half-dollar chain (FIG. 11) and is controlled in its energization from the main + and — busses by the fare paid chain (relays 85—86) and the treadle pulsing relay 86 (FIG. 14).

More specifically, relays 83 and 84 (FIG. 13) operate, the following circuit is completed to operate the priming relay 87 (FIG. 15) of the axle counting chain: +, contacts 93A, 84E, 83H, 87A, 92A, 91A, 90A, 89A, 88A and the high resistance winding of relay 87 to —. Relay 87 locks and prepares circuits as previously described including a circuit prepared at contacts 87F for the first treadle pulse to operate relay 88.

As the vehicle passes over the treadle (a motorcycle in the present example), treadle switch make contacts pulse twice (see FIG. 14). The control circuit for treadle switch relay 86 (FIG. 14) basically comprises an operating circuit controlled by treadle switch make contacts, and is aided in its operation by a special network of locking contacts on the axle counting chain (87–92) to insure advancement of the axle chain even on the shortest treadle pulses. More specifically, as treadle relay 86 operates over the path from + through treadle switch contacts, contacts 86C and the winding of relay 86 to —. Responsive to receipt of the first pulse, it is effective at its contacts 86B (which close before contacts 86C open) to lock over resistor K and the treadle switch make contacts to +. It should be observed that contacts 84D were opened as a result of relay 84 being operated due to a fare paid having been registered. Relay 86 also locks over contacts 86B, 88H and 87I to +. The locking circuit through the treadle switch contacts insure that relay 86 will not release until the treadle contacts open. The locking circuit through contacts 88H and 87I insure that treadle relay 86 will remain operated until its contacts 86E have stepped the axle counting chain (FIG. 15). If the treadle pulses are extremely short, the treadle relay 86 is released by the axle counting chain. That is, relay 86 at its contacts 86E operates relay 88 over the path from + through contacts 93A, 84E and 83H which are closed because an acceptable fare has been registered, contacts 86E, resistor I, contacts 87F, 92E, and the winding of relay 88 to —. Relay 88 at its contacts 88A opens the high resistance holding of relay 87 which remains operated over its low resistance winding until the end of the pulse, at its contacts 88B closes a holding circuit over its low resistance winding to the pulse of significance on the next treadle pulse; at its contacts 88C closes a holding circuit over its high resistance winding independent of the treadle pulse; at its contacts 88F prepares a circuit for relay 89; at its contacts 88E holds open the circuit of relay 90 so that relay 90 does not open on the next treadle pulse; at its contacts 88H (FIG. 14) opens its holding circuit of relay 86 which releases (the treadle pulse usually being gone at this time), and at its contacts 88I prepares a holding circuit for relay 86, effective on the next treadle pulse. The release of relay 86 releases relay 87 at contacts 86E. Relay 87 prepares at its contacts 87L (FIG. 14), a new locking circuit for treadle relay 86.

On the second treadle pulse, treadle relay 86 operates and locks over the treadle switch contacts to + and also over contacts 89H, 88I, and 87L to +. Relay 86 operates relay 89 over the path from + through contacts 93A, 84E, 83H, 86E, 88F, 87E, and the winding of relay 89 to —. Relay 89 locks and closes circuits as will be understood from the preceding description. Relay 89 at its contact 89H (FIG. 14) releases relay 86, assuming that the treadle switch contacts have opened earlier. Relay 86 in releasing opens its contacts 86E to release relay 88.

Figure 16:
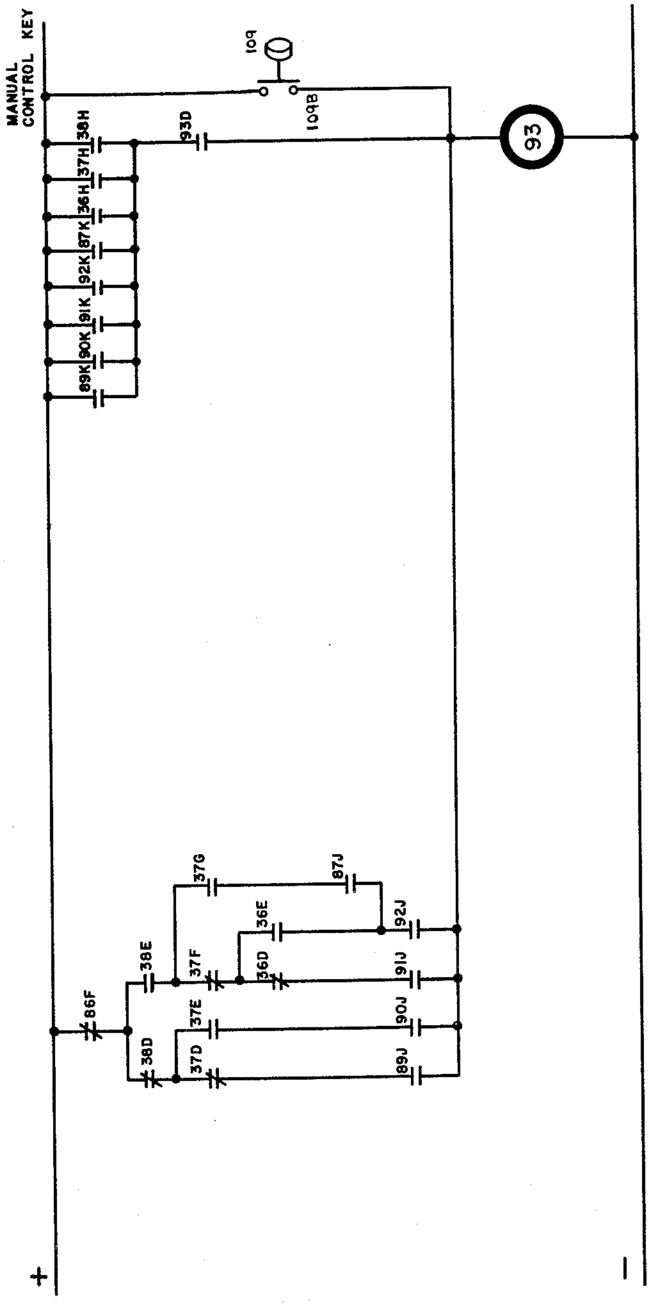
Figure 17:
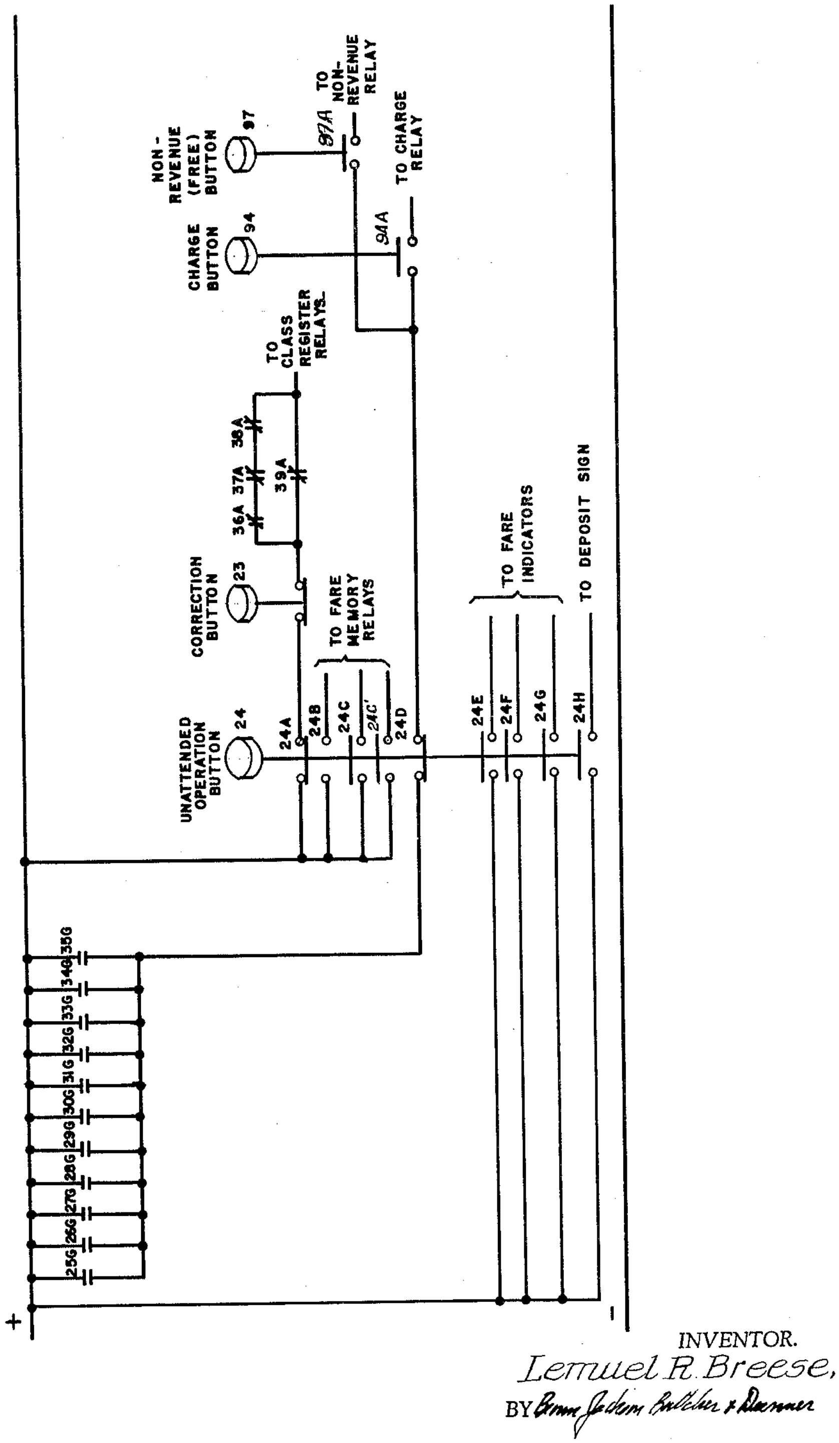

At this time, the equipment checks the number of axles registered on the axle memory relays 36–38 (FIG. 6) with the number of axles detected by the treadle and registered in the axle counting chain relays 87–92 (FIG. 15) such comparison being effected by axle check circuit (FIG. 16). As there shown an axle check relay 93 is controlled in its operation from the main + and — circuit by a coincidence circuit including the contacts of axle memory relays 36–38 and the contacts of axle counting relays 87–92.

In the present example axle memory relay 36 is operated to indicate a two axle vehicle and the third axle counting relay 89 is operated to indicate that two axles are counted. Thus, the release of relay 86, axle check relay 93 is operated over the path extending from + through contacts 86F, 38D, 37D, 89J, and the winding of relay 93 to —. Relay 93 locks to + independent of the axle comparison network over the K contacts of any operated axle counting chain relays 89, 90, 91, 92, 87 and/or the H contacts of any operated axle check relays 36, 37, 38. In the assumed example, the pertinent contacts are 89K and 36H. In the operation of the axle counting chain of FIG. 15 and the axle check circuit of FIG. 16, it will be recalled that contacts 84E and 83H closed as a result of the registration of an acceptable fare paid to thereby operate relay 87 which in turn primed the axle counting chain.

Prior to the first operation of relay 86, the fare paid chain opened contacts 84D; a locking circuit for relay 86 was prepared through closed contacts 87I and 88H; the treadle relay operated the chain relay 88 which at contacts 88H released the treadle relay 86, which in turn released chain relay 87 to prepare at contacts 87L another holding circuit for treadle relay 86. Thus prior to the second operation of relay 86, a locking circuit is prepared for relay 86 through closed contacts 87L, 88I, and 89H.

Similarly prior to the third operation of relay 86, a locking circuit is prepared for relay 86 through contacts 88L, 89I and 90H; prior to the fourth operation of relay 86, through contacts 88L, 89I, and 90H; prior to the fourth operation of relay 86, through contacts 89L, 90I, and 91H; prior to the fifth operation of relay 86, through contacts 90L, 91I and 92H; and prior to the sixth operation of relay 86, through contacts 91L, 92I and 87H.

With short treadle pulses, the sequence would be as follows.

| 1st treadle pulse: | 4th treadle pulse: |
|---|---|
| +54 | +54 |
| +88 | +91 |
| —54 | —54 |
| —87 | —90 |
| 2nd treadle pulse: | 5th treadle pulse: |
| +54 | +54 |
| +89 | +92 |
| —54 | —54 |
| —88 | —91 |
| 3rd treadle pulse: | 6th treadle pulse: |
| +54 | +54 |
| +90 | +87 |
| —54 | —54 |
| —89 | —92 |

Returning to the given example, axle check relay 93 (FIG. 16) at its contacts 93A (FIG. 15) releases relay 89; at its contacts 93B (FIG. 6) releases relay 36; at its contacts 93C (FIG. 13) releases 84; and at its contacts 93A (FIG. 13) holds relay 83 over the path from + through contacts 93A, 83B, and the lower winding of relay 83 to −.

The release of relay 84 effects the release of relay 12 (FIG. 2) which changes the traffic lights from green to red in preparation for the next vehicle. The release of relays 89 and 36 effects the opening of contacts 89K and 36H (FIG. 16), releasing relay 93. The release of relay 93 opens contacts 93A (FIG. 13) releasing relay 83, returning the fare paid counting chain to normal. The system is now conditioned to receive a subsequent registration and toll.

*Two Fare Operation*

As noted previously the equipment is operative to permit the receipt of a toll from a second vehicle before the previous vehicle has been "checked out" by the treadle. Such operation is described as a two fare operation and is now set forth hereat.

Assuming that a class 9 vehicle approaches and, seeing a red light stops at the toll station. The attendant momentarily depresses the class 9 button, which lights the fare signal unit 7 with the required fare $2.30 and also lights the sign "DEPOSIT" on the instruction sign 6. The driver deposits the required value of coin(s), registering a fare paid and extinguishing the fare signal unit 7 and the sign "DEPOSIT." The driver then proceeds, and before the class 9 vehicle passes over the treadle, a class 3 vehicle approaches. The attendant momentarily depresses the class 3 button, lighting the fare signal unit 7 with the required fare $.25 and also lighting the sign "DEPOSIT." The driver of the class 3 vehicle deposits the required value of coin(s), registering a second fare paid and extinguishing the fare signal unit 7 and the sign "DEPOSIT"; and proceeds. The class 9 vehicle passes over the treadle, removing one fare paid, the traffic light remaining green because a fare paid remains. As the class 3 vehicle now passes over the treadle, the remaining fare paid is removed from the chain which thereupon extinguishes the green light and lights the red light.

The two fare operation of the system will be specifically considered in an example in which the first vehicle is a class 9 vehicle, comprising a truck and trailer, for example, the combination having five axles and requiring $2.30 in fare; and a second vehicle which is a class 3 vehicle comprising a standard passenger car having two axles and requiring $.25 in fare. The circuit paths are somewhat similar to those earlier described in the matter of a single fare operation, and to such extent are more briefly described herein.

As the attendant momentarily depresses the non-locking class 9 button, relay 21 (FIG. 3) operates over the path which extends from + through contacts 102C, 24A, 23A, 39A in parallel with 38A, 37A, and 36A, through break contacts 22B–13B, break contacts of class 10 button, make contacts of class 9 button and the winding of relay 21 to −.

Relay 21 at its contacts 21K lights the DEPOSIT sign (FIGS. 1 and 4); at its contacts 21C lights the digit "2" indicator in the dollars space on the display device 6 (see FIGS. 1 and 4) over the path from + through contacts 21C which are cross-connected to the digit "2" indicator, to −; at its contacts 21D lights the digit "3" indicator in the dimes space; at its contacts 21E lights the digit "0" indicator in the cents space; at its contacts 21F (FIG. 5) operates fare memory relay 25 (which represents 1 nickel) over the path from + through contacts 21F, cross-connect to conductor C7, through the winding of relay 25, to −; at its contacts 21G operates fare memory relay 29 which represents 1 quarter); at its contacts 21H operates relay 33 (which represents 4 half dollars); and at its contacts 21I (FIG. 6) prepares a circuit for axle memory relay 36; and at its contacts 21J prepares a circuit for axle memory relay 38.

It is now assumed that the driver of the class 9 vehicle deposits the following coins, totaling $2.30, in the coin hopper 8:

| | |
|---|---|
| 5 pennies | $ .05 |
| 5 nickels | .25 |
| 3 dimes | .30 |
| 1 20¢ token | .20 |
| 2 quarters | .50 |
| 2 half-dollars | 1.00 |
| | $2.30 |

It is also assumed, for illustration purposes that the coins pass through the mechanical coin counting machine, (only the contacts of which are shown in FIG. 7) in the following sequence:

| | |
|---|---|
| Firstly—the 20¢ token | $ .20 |
| Secondly—three dimes | .30 |
| Thirdly—a half dollar | .50 |
| Fourthly—a quarter | .25 |
| Fifthly—five pennies | .05 |
| Sixthly—a quarter and a half simultaneously | .75 |
| Seventhly—five nickels | .25 |
| Total | $2.30 |

The passage of the 20¢ token causes cam means to rotate, closing contacts 43 which operate relay 51 (see FIG. 7). Relay 51 operates relay 52. Relay 52 operates relays 53 and 55. Relay 55 operates relay 69 to register one nickel on the nickel counting chain (FIG. 9). Relay 53 releases slow release sleeved relay 52. Relay 52 releases slow release sleeved relay 53, which releases relay 54. Relay 54 operates relay 52 and releases relay 68. Relay 52 operates relay 53 and relay 53 releases relay 52, and also operates relay 56 which operates relay 70 (FIG. 9) to register two nickels on the nickel counting chain.

Relay 52 releases relay 53 which operates relay 52 and releases relay 55 which releases relay 69. Relay 52 operates relay 53. Relay 53 releases relay 52 and operates relay 57 which operates relay 71 to register three nickels on the nickel counting chain.

Relay 52 releases relay 53. Relay 53 operates relay 52 and releases relay 56 which releases relay 70. Relay 52 operates relay 53. Relay 53 releases relay 52 and operates relay 54 which operates relay 72 to register four nickels on the nickel counting chain. If the 20¢ token pulse has disappeared relay 51 releases relay 52 which releases relay 53. However, if the 20¢ token pulse persists, relay 51 remains operated and relay 54 holds relay 53. When the token pulse disappears relays 51, 53, 57 and 71 are released in turn.

Figure 10:
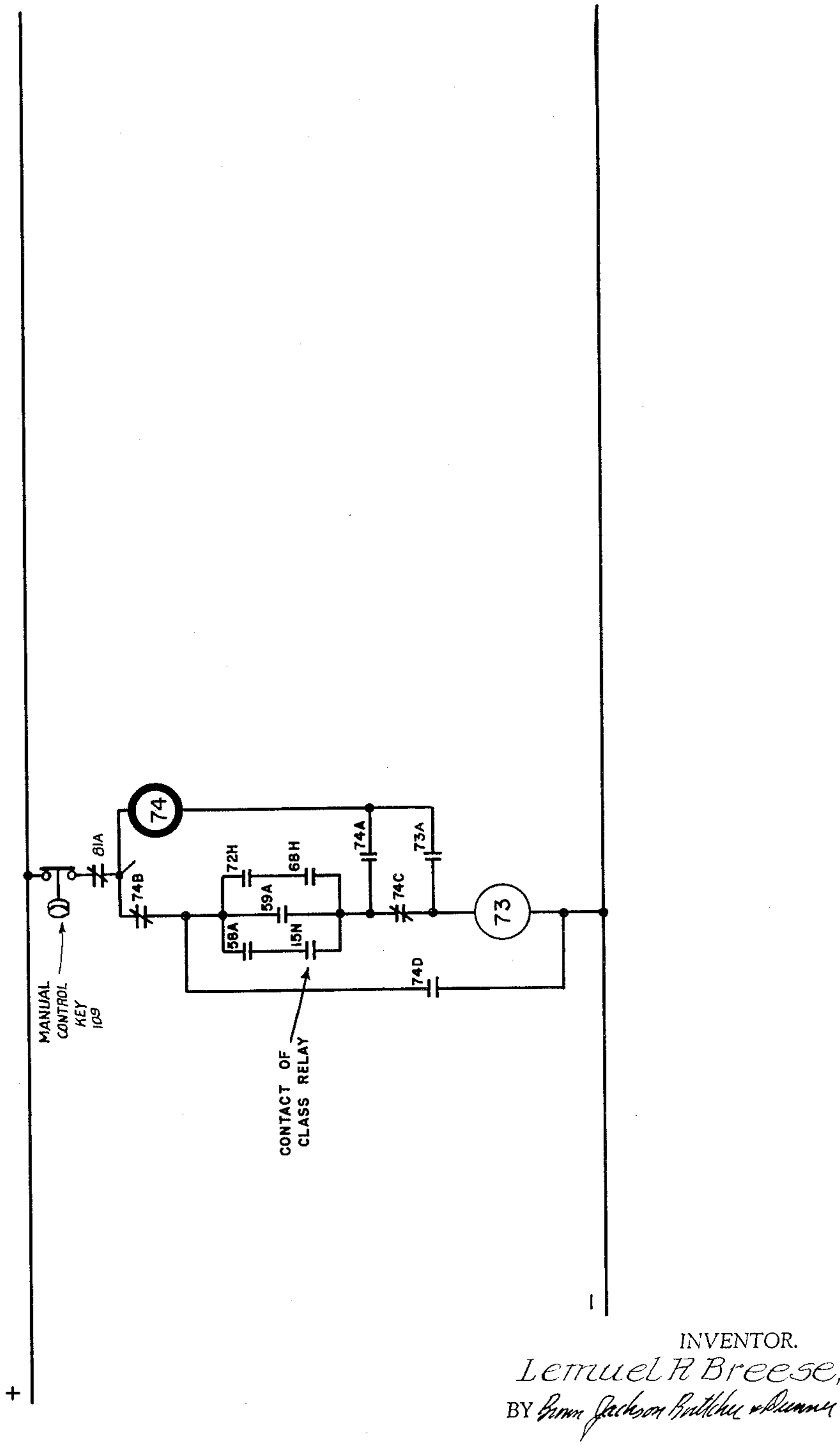

The passage of the first dime causes cam means to rotate closing contacts 42, giving two pulses to relay 49, which operate and release relay 49 twice. Relay 49 upon its first operation operates nickel counting chain relay 68. With relays 68 and 72 operated, quarter counting chain relay 73 operates (FIG. 10). Upon the release of relay 49, relay 72 releases, operating relay 74 to register one quarter on the quarter counting chain. Relay 49 upon its next operation operates relay 69 to register one nickel on the nickel counting chain. Upon the release of relay 49, relay 68 releases.

The passage of the second dime causes cam means to rotate, causing contacts 42 to pulse relay 49 twice. Relay 49 upon its first operation operates nickel counting chain relay 70 to register two nickels. Upon the release of relay 49, relay 69 releases. Relay 49 upon its next operation operates relay 71 to register three nickels on the nickel counting chain. Upon the release of relay 49, relay 70 releases.

The passage of the third dime causes cam means to rotate controlling contacts 42 to pulse relay 49 twice. Relay 49 upon its first operation operates nickel counting chain relay 72 to register three nickels. Upon the release of relay 49 relay 71 releases. Relay 49 upon its next operation operates relay 68. With relays 68 and 72 operated, quarter counting chain relay 73 releases. With relay 74 operated and 73 released, half-dollar counting chain relay 76 (FIG. 11) operates to register a half dollar on the half-dollar counting chain. Upon the release of relay 49, relays 72, 74, and 75 are released in turn. It should be observed that the only thing registered on the counting chains of FIGS. 8, 9, 10, and 11 is the one-half dollar on the chain of FIG. 11.

It was assumed that a half-dollar coin passes through the coin counter next (actually this could be simultaneous with other coins). When the half-dollar coin passes through, the cam means rotate, operating contacts 46 which operate relay 60, which locks through its contacts 60A to the contacts 46. Relay 60 operates relay 77 (FIG. 11) to register two half dollars on the half dollar chain. When contacts 46 open, relay 60 releases, in turn releasing relay 76. It was assumed that a quarter coin passes through the coin counter next. Cam means rotate in turn closing contacts 45, thereby in turn operating relay 59 which operates relay 73 (FIG. 10). When contacts 45 open, relay 59 releases, in turn operating relay 74. With relays 73 and 74 operated, a quarter is registered on the quarter counting chain.

It was assumed that five penny coins pass through the coin counter next. The passage of the first penny causes cam means to rotate, closing contacts 40, operating relay 48 which operates relay 64 (FIG. 8) registering one penny on the penny counting chain. When cam 40 contacts open relay 48 releases in turn releasing relay 63. The passage of the second penny reoperates relay 48 which operates relay 65 to register two pennies. The release of relay 48 releases relay 64. The passage of the third penny reoperates relay 48 which operates relay 66 to register three pennies. The release of relay 48 releases relay 65. The passage of the fourth penny reoperates relay 48 which operates relay 67 to register four pennies. The release of relay 48 releases relay 66. The passage of the fifth penny reoperates relay 48 which operates relay 63, to register five pennies. With relays 67 and 63 both operated a circuit is completed to operate relay 69 (FIG. 9) to register one nickel on the nickel counting chain. The release of relay 48 releases relay 67 which releases relay 68. Thus the penny counting chain is returned to normal but one nickel is registered on the nickel counting chain.

At this time two half-dollars have been registered on the half-dollar chain, one quarter has been registered on the quarter chain, and one nickel has been registered on the nickel chain.

It was assumed that a quarter coin and a half-dollar coin next pass simultaneously. With passage of the quarter coin, relay 59 (FIG. 7) operates, in turn releasing relay 73 (FIG. 10); the release of relay 59 following termination of the quarter pulse, in turn releasing relay 74. In the interval between the release of relays 73 and 74, a circuit in the upper left corner of FIG. 11 for transferring the two quarters to a half-dollar count is closed.

With passage of the half dollar coin, relay 60 (FIG. 7) operates in turn operating relay 78 (FIG. 11); the release of relay 60 upon cessation of the half-dollar pulse, releasing relay 77. During the operated period of relay 60, a circuit in the upper left corner of FIG. 11 is closed to drive the half-dollar counting chain. As contacts 73C and 74C and also contacts 60D are closed simultaneously, only one additional half-dollar value will be registered on the half-dollar chain thereby, although two additional half-dollars in value were intended. Accordingly, advancement of the half-dollar chain to record another half-dollar value must be effected. With reference to FIG. 7, relay 61 is operated through contacts 73B, 74E, and 60B. Relay 61 locks through contacts 61A in parallel with contacts 60C and 74F. Relay 61 operates relay 62 and a relay 60 releases, relay 77 releases as above described. When both relays 60 and 74 release, the holding circuit of relay 61 is opened and relay 61 releases after an interval as determined by its sleeved characteristic. Relay 61 in releasing closes the circuit in the upper left corner of FIG. 11 through contacts 61C and 62B to advance the half-dollar chain, operating relay 79 to register four half-dollars. Relay 61 also opens the circuit of sleeved relay 62 which releases after an interval. Relay 62 releases relay 78. Thus at this time four half-dollars in value are registered on the half-dollar chain and one nickel on the nickel chain.

It has been assumed that five nickels are next passed through the counter. With passage of the first nickel, relay 49 (FIG. 7) operates, in turn operating relay 70 (FIG. 9) to register two nickels; the release of relay 49 in turn releasing relay 69. With passage of the second nickel, relay 49 operates, in turn operating relay 71 to register three nickels; the release of relay 49 releasing relay 70. With passage of the third nickel, relay 49 operates, in turn operating relay 72 to register four nickels; the release of relay 49 releasing relay 71. With passage of the fourth nickel, relay 49 operates, in turn operating relay 68 which operates relay 73 (FIG. 10); the release of relay 49 releasing relay 72 which operates relay 74 (FIG. 10). With relays 73 and 74 both operated one quarter is registered on the quarter counting chain. With relay 68 operated and relay 72 released, the nickel counting chain is returned to normal. With passage of the fifth nickel, relay 49 operates, in turn operating relay 69 to register one nickel on the nickel counting chain.

At this time the counting chains of FIGS. 8–11 will be found in the condition in which four half-dollars are registered on the half dollar chain of FIG. 11, one quarter on the quarter chain of FIG. 10, and one nickel on the nickel chain of FIG. 9. That is, relays 79 (FIG. 11), relays 73 and 74 (FIG. 10), and relay 69 (FIG. 9) wil be found operated to indicate receipt of $2.30 for the class 9 vehicle.

It is recalled that relays 33, 29, and 25 (FIG. 5), were essentially operated to indicate the requirement for a deposit of $2.30. As a result thereof, contacts 33B and 33C (FIG. 12) were closed, and contacts 33D, 33E, and 3F were opened; contacts 29B and 29C were closed and contacts 29D and 29E were opened; and contacts 25B and 25C were closed and contacts 25D and 25E were opened. Such contact representation indicates a sum of at least four half dollars, one quarter, and one nickel.

With relays 79, 73, 74, and 69 operated as a result of the coins deposited, contacts 79H, 73D, 74H, and 69I (FIG. 12) will be operated and, the value received equals the value expected and momentary fare paid relays 81 and 82 operate to indicate that an acceptable fare has been received, such path extending from + over contacts 25B, 29B, and 33B in parallel, contacts 79H, 33C, 73D, 74H, 29C, 69I, 25C and the windings in parallel of relays 81 and 82 in parallel to −. Relay 81 is a slugged relay but relay 82 is neither sleeved nor slugged. Contacts of relay 81 are used for control purposes and contacts of relay 82 (not shown) for remote indication purposes. Relay 81 locks itself and relay 82 over its own make contacts 81B to + through contacts 48B, 49B, 51B, 58B, 59B, 60B of any coin pulse relays 48, 49, 51, 58, 59, 60 which are operated until the last coin pulse relay is released; and also over contacts 84B of the fair paid counting chain until relay 84 operates to indicate that a fare paid has been registered.

When relay 81 operates, it releases any operated relays of the coin chains shown in FIG. 8, 9, 10, 11. It should be recalled that contacts 81A shown in the upper left corner of FIGS. 8, 9, 10 and 11 are actually one set of contacts. In the present example opening of contacts 81A releases relay 63 of the penny chain FIG. 8, relays 68 and 69 of the nickel chain (FIG. 9) relays 73, and 74 of the quarter chain (FIG. 10), and relay 79 of the half dollar chain.

The fare paid counting chain of FIG. 13 is arranged to be driven forward by momentary fare paid relay 81 and backward by axle check relay 93. As a result of the operation of relay 81 therefore, relay 84 is operated over the path extending from + over contacts 81E, 83F, 85C and the winding of relay 84 to —. Relay 84 operates and at its contacts 84C prepares a circuit to lock in series with the upper winding of relay 83 which is shunted; at its contacts 84A operates light relay 12 (FIG. 2), and at its contacts 84B operates axle transfer relay 39 (FIG. 6) over the path from + through contacts 93B, 36C, 37C, 38C, 84B, and the winding of relay 39 to —. Relay 12 operates and at its contacts 12B extinguishes the red light 2 and at its contacts 12A lights the green light 3.

Relay 39 operates and at its contacts 39E locks to + over contacts 25A, 29A and 33A of the operated fare memory relays; at its contacts 39B (FIG. 6) operates axle memory relay 36 over the path from + through contacts 21I of the class 9 relay 21, cross-connect to conductor C1, contacts 39B, and the winding of relay 36 to —; and at its contacts 39D operates axle memory relay 38 over the path from + through contacts 21J of the class 9 relay 21, cross-connect to conductor C3, contacts 39D, and the winding of relay 38 to —; and at its contacts 39A (FIG. 3) prepares for the release of relay 21.

Relays 36 and 38 operate to indicate that a toll has been paid for a vehicle having five axles and that such type vehicle must pass over the treadle to clear the equipment. That is, relays 36 and 38 at contacts 36C and 38C open the original operating circuit of relay 39 in preparation of the release of relay 39, and at contacts 36B and 38B lock in parallel through contacts 93B to +. Relays 36 and 38 at their contacts 36A and 38A (FIG. 3) open the remaining holding circuit of relay 21, releasing this relay.

Figure 4:
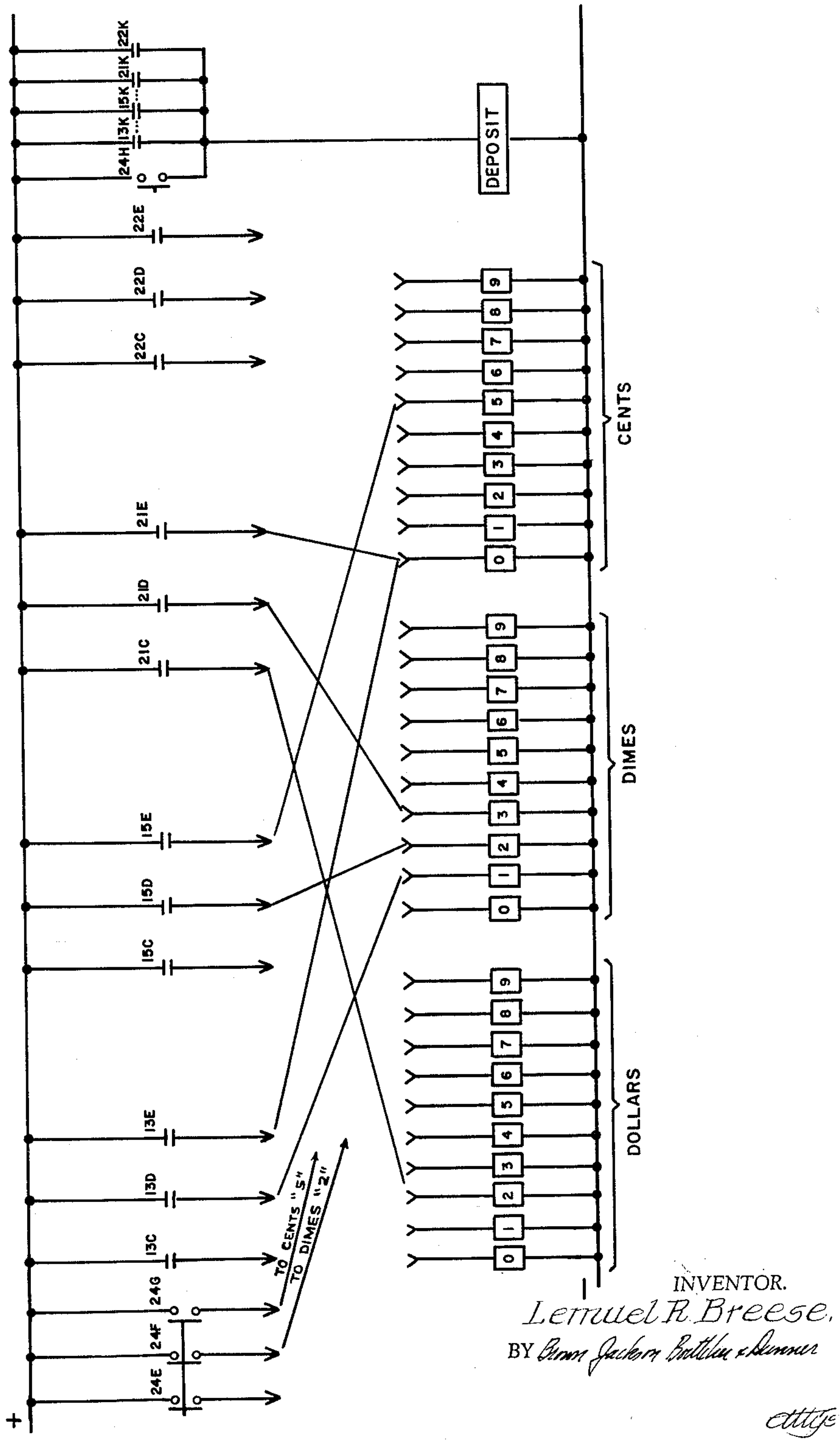
Figure 6:
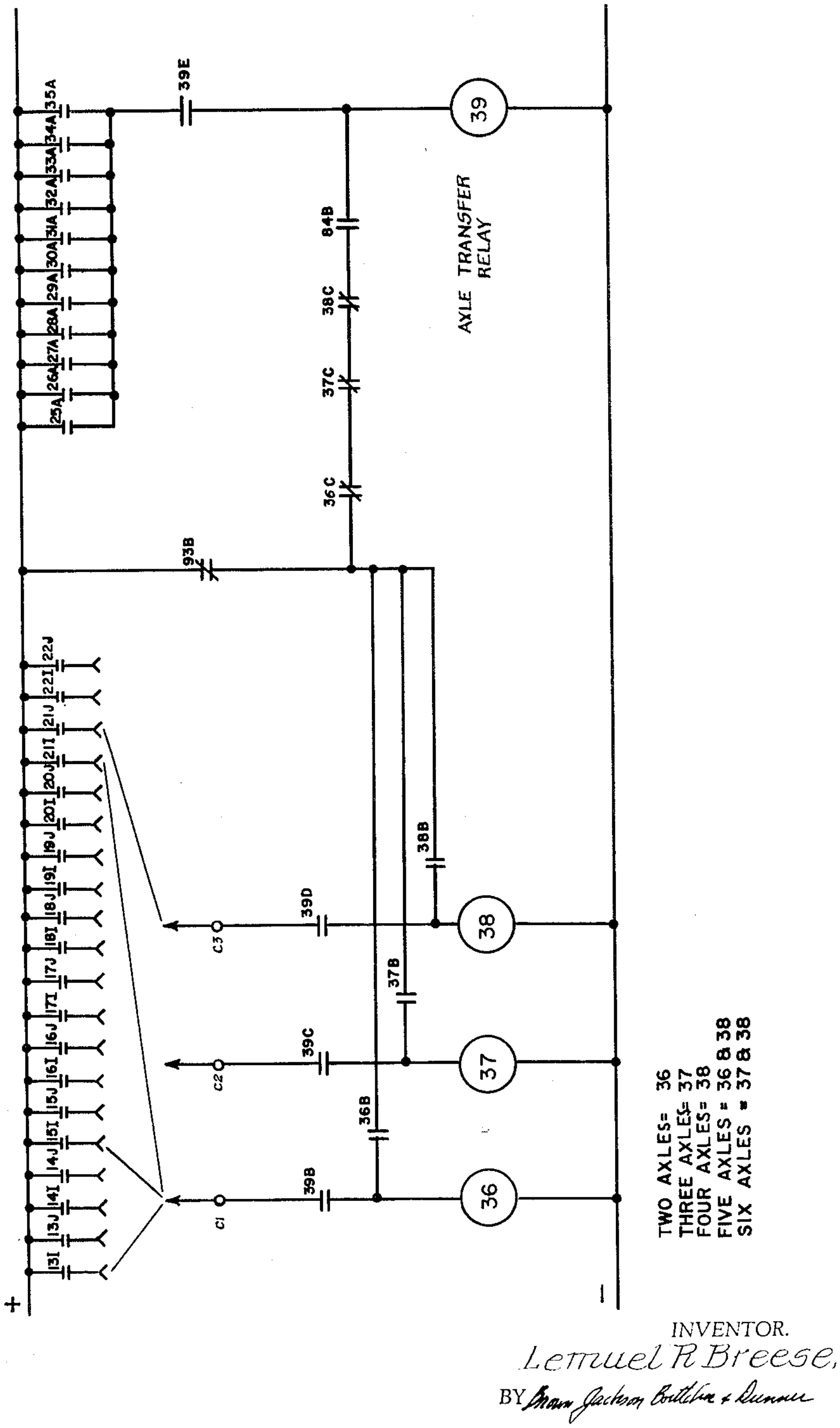

Relay 21 in releasing, releases relays 25, 29, and 33 (FIG. 5), and extinguishes the DEPOSIT sign and fare signalling indicators for $2.30 (FIG. 4). Relays 25, 29, and 33 in releasing open their contacts 25A, 29A, and 33A, releasing relay 39 (FIG. 6). Although contacts 36A and 38A (FIG. 3) are open due to the axle memory relays 36 and 38 being operated, the closing of contacts 39A upon the release of relay 39 extends + so that the depression of a class button thereafter can result in the operation of a class relay.

It should be recalled that relays 81 and 82 locked to + through contacts of the coin pulse relays and of the fare paid chain. With relay 49 released at the conclusion of passage of the last nickel, and with contacts 84B open as a result of a fare paid registered, the holding circuits of relays 81 and 82 are opened. Relay 82 releases immediately and 81 releases after an interval as determined by its slugged characteristic.

The release of relay 81 opens contacts 81E (FIG. 13) to remove the + shunt from the upper winding of relay 83, and relay 83 operates in series with relay 84 over the path from + through contacts 83D, the upper winding of relay 83, contacts 85E, 84C and the winding of relay 84 to —. Relay 83 at its contacts 83E which close before contacts 83D open, routes the series path through normally closed break contacts 93C of axle check relay 93, at its contacts 83C, isolates the circuits of its two windings, at its contacts 83B, prepares a circuit for its lower winding, at its contacts 83F, further opens the original operating circuit of relay 84, and at its contacts 83G, prepares an operating circuit for relay 85.

Referring to FIG. 15, with contacts 84E and 83H both closed, a circuit is completed operate from + through contacts 93A, 84E, 83H, 87A, 92A, 91A, 90A, 89A, 88A, and the winding of relay 87 to — operating relay 87 to prime the axle counting chain. Relay 87 locks and closes certain circuits in the manner previously described and at its contacts 87F prepares relay 88 for operation responsive to receipt of the first treadle pulse.

*Second Vehicle*

It has been assumed that while the first vehicle was being processed, a second vehicle such as a regular two axle passenger car, pulls up behind the first vehicle and stops.

As soon as the coins for the first vehicle have been registered and the light 10 turned green, the first vehicle may proceed. The attendant may now register the class of the second vehicle, and in the present example, momentarily depresses the class 3 button (FIGS. 1 and 3) to operate class relay 15 over the path from + through contacts 102C, 24A, 23A, 39A (note that contacts 36A and 38A are open because of the first vehicle), closed contacts 22B–13B, closed break contacts of class 10 button to class 4 button, make contacts of the class 3 button and the winding of relay 15 to —.

Relay 15 operates and at its contacts 15A which close before contacts 15B open, locks to + through contacts 16B, etc.; at its contacts 15B remove + feed to the class buttons and locking + from the lower numbered class relays; at its contacts 15F operates relay 29 over a path extending from +, over contacts 15F, cross-connect to conductor C8, and the winding of relay 29 to —; at its contacts 15I prepares a different circuit for relay 36; at its contacts 15K lights the DEPOSIT sign (FIG. 4); and its contacts 15D lights the digit "2" indicator in the dimes position (FIG. 4); and at its contacts 15E lights the digit "5" indicator in the cents position (FIG. 4). Relay 29 operates to close its contacts 29C and to open its contacts 29D and 29E (FIG. 12) to indicate that at least the value of $.25 is required.

It is assumed that the driver of the second vehicle deposits a quarter coin, in response to the $.25 indication. Quarter cam means rotates operating contacts 45 (FIG. 7), operating relay 59 which operates quarter chain relay 73 (FIG. 10). When the quarter cam contacts open, relay 59 releases, operating relay 74 (FIG. 10).

Referring now to FIG. 12, a circuit is completed to operate relays 81 and 82 over the path from + through contacts 29B, 30E, 31E, 32E, 33E, 34E, 35E, 73D, 74D, 29C, 25E, 26E, 27E and 28E, through the winding of relays 81 and 82 in parallel to —. Relay 81 locks itself and relay 82 over the path from + through contacts 83A, 85A, contacts 81B, and the winding of relays 81 and 82 to —. Relay 81 at its contacts 81A releases relays 73 and 74; at its contacts 81E operates relay 85 over the path from + through contacts 81E, 83G, and the winding of relay 85 to —; at its contacts 81D provides a holding circuit for relay 83 by means of its lower winding over the path from + through contacts 81D, 83D, and the lower winding of relay 83 to —. The holding circuit for relay 83 over its lower winding is for the purpose of holding relay 83 as the upper winding becomes shunted when relay 85 operates.

Relay 85 operates, and at its contacts 85B, which close before contacts 85E open, provides a holding circuit for relay 84 over the path which extends from + over resistor L, contacts 85B, 84C and the winding of relay 84 to —; and at its contacts 85D provides a holding circuit for itself over the path from + through contacts 83E, resistor S, contacts 85D, and the winding of relay 85 to —. Relay 85 also opens its contacts 85A in the holding circuit of relays 81 and 82. With relays 73 and 74 released and relay 85 operated the circuits of relays 81 and 82 (FIG. 12) are opened at contacts 73D and 74H and 85A. Relay 81 releases after an interval as determined by its slugged characteristic. Relay 81 at its contacts 81E opens the holding circuit of relay 69 over its upper winding; and at its contacts 81D opens the holding circuit of relay 83 over its lower winding. Accordingly relay 83 releases.

Relay 83 operates and at its contacts 83D, which close upon release before contacts 83E open transfers the circuit of 85 through contacts 93C over the path which extends from + over contacts 83D, 93C, resistor S, contacts 85D, and the winding of relay 85 to —. At this time relays 84 and 85 (FIG. 13) are operated to mark two fares paid.

If other than a quarter coin had been required and required and received, relays 81 and 82 would have been locked through one or more of the contacts 84B–60E in the upper right hand corner of FIG. 12. Accordingly with the release of the last coin pulse relay to release, and with relay 85 operated and with relays 73 and 74 released, relays 81 and 82 would have been released, and relay 83 would have released thereafter.

*Class 9 Vehicle Passes Over Treadle Switch*

Referring to FIG. 15, it should be recalled that relay 87 was operated over contacts 84E and 83H as a result of the first fare paid being registered on the fare paid chain (FIG. 13). When the second fare paid was registered relay 85 operated and subsequently relay 83 released. Accordingly contacts 85F closed before contacts 83H opened, holding relay 87.

As the class 9 vehicle passes over the treadle switch, the treadle switch contacts (FIG. 14) open and close. As this is a five axle truck, it will be assumed that the pulsing of these treadle switch contacts is at a relatively slow rate. As these contacts close and open five times responsive to five sets of wheel passing thereover, relay 86 (FIG. 14) is pulsed five times and at its contacts 86E (FIG. 15) repeats the five pulses in the manner previously described to the axle counting chain.

As the pulses are slow, the locking circuits in the upper left of FIG. 14 do not function to hold relay 86 operated when the treadle switch contacts open. Accordingly each time that contacts 86E close, + through contacts 93A, 85F and 86E is extended to the axle counting chain and as a result of the five pulses, the chain takes five step to place relay 92 in the operated condition. Relay 86 releases at the conclusion of the last pulse, and at its contacts 86E releases axle chain relay 91; at its contacts 86F (FIG. 16) completes the following circuit to operate axle check relay 93: +, contacts 86F, 38E, 37F, 36E, 92J, and the winding of relay 93 to —.

Relay 93 operates and at its contacts 93D (FIG. 16) locks to + through contacts 92K, 36H and 38H; at its contacts 93B (FIG. 6) releases relays 36 and 38; at its contacts 93A (FIG. 15) releases relay 92; and at its contacts 93C (FIG. 13) releases relay 85. Relay 85 at contacts 85E, which close before contacts 85B open, maintains relay 84 in the operated position over the path extending from + through contacts 93A, 83C, 85E, 84C, and the winding of relay 84 to —. It should be appreciated that the upper-winding of relay 83 is shunted at this time over the path from + through contacts 93H, 83C, upper winding of relay 83, and contacts D to +; and that the circuit of the lower winding of relay 83 is open at contacts 83B.

The release of relays 36, 38 and 92 results in the opening of contacts 36H, 38H, and 92K in the upper right corner of FIG. 16, opening the circuit of relay 93 which releases after an interval as determined by its sleeved characteristic. When contacts 93A (FIG. 13) of relay 93 open, the shunt on the upper winding of relay 83 is removed and relay 83 operates in series with relay 84 over the path extending from + through contacts 83D, 85E, 84C, and the winding of relay 84 to —. Relay 83 at its contacts 83H completes the priming circuit of the axle chain to operate relay 87 (FIG. 15) over the path from + through contacts 93A, 84E, 83H, 87A, 92A, 91A, 90A, 89A, 88A and the winding of relay 87 to —.

With relays 36 38, and 93 released as a result of the first vehicle passing over the treadle with the correct number of axles counted, and with contacts 84B operated as a result of a fare paid yet registered on the fare paid chain, a circuit is completed to reoperate axle transfer relay 39 (FIG. 6) over the path from + through contacts 93B, 36C, 37C, 38C, 84B and the winding of relay 39 to —. Relay 39 (FIG. 6) locks to + through contacts 39E and 29A; and at its contacts 39B operates relay 36 over the path from + through contacts 15I, cross-connect to conductor C1, contacts 39B, and the winding of relay 36 to —.

Relay 36 operates and closes its contacts 36H (FIG. 16) to prepare a holding circuit for relay 93 when it next operates; and at its contacts 36A (FIG. 3) releases relay 15 (contacts 39A are open at this time). The release of relay 15 is logical at this time in that the operated axle memory relays operated for the first vehicle have been released, and the axle memory relay 36 has been operated and locked to mark the second vehicle axle expectation.

When relay 15 releases, the orginal energizing circuit of relay 29 which is not locked otherwise, is opened and relay 29 is released, its fare expectation function having been accomplished when relays 81 and 82 operated upon receipt of the second fare (FIG. 12). Relay 29 restores and at its contacts 29A, releases axle transfer relay 39 (FIG. 6).

At this time the equipment is in the same position in which it was found under the above caption "Single Fare Operation" prior to passage of the class 1 vehicle over the treadle.

*Class 3 Vehicle Passes Over Treadle*

It is assumed that the class 3 vehicle passes over the treadle with sufficient speed to result in fast treadle pulses. The sequence of operation is then the same as that described above when the class 1 vehicle passed over the treadle.

Briefly as a result of the first short treadle pulse relay 86 operates, in turn operating relay 88 which releases relay 86 (see FIG. 14), in turn releasing relay 87. As a result of the second short treadle pulse, relay 86 operates relay 89 which releases relay 86 which releases relay 88. The release of relay 86 operates relay 93 which releases relays 36, 89, and 84. The release of relays 36 and 89 results in the release of relay 93 which releases relay 83. The release of relay 84 releases the light relay 12 which extinguishes the green light 3 and lights the red light 2, returning the system to normal in preparation for the approach of the next vehicle.

*Unattended Operation*

SINGLE FARE

In multiple lane installations, i.e., an arrangement in which a number of different lines may be directed into the toll facility, it is advantageous at certain times of the day, as for example during hours when the traffic is relatively light, to convert certain lanes from attended operation to unattended operation. In certain types of installations, as for example toll bridge arrangement, it is frequently advantageous to convert certain attended lanes to unattended lanes for one class of vehicle such as passenger cars during the rush hours, and to use the attended lanes for other classes of vehicles, such as trucks etc.

Accordingly, the illustrated system includes an Unattended Operation Button 24 (FIG. 17) which is the locking type for use in converting the lane to unattended operation.

Briefly, with the operation of such button, the signal is transmitted to the fare memory relays (FIG. 5) to register thereon the uniform fare which is to be required from each vehicle which passes therethrough and simultaneously sends signals to the fare indicator control devices (FIG. 4) for the display device 6 to control same to indicate such rate to the approaching vehicles. The pushbutton box of the attendent is also disabled. The equipment now operates in the manner similar to that described heretofore.

More specifically, as button 24 is operated, it is effective at its contacts 24A to open the circuit from + through contacts 24A, 23A and contacts 39A in parallel with 36A, 37A, and 38A to the class register relays of FIG. 3 (see also FIG. 3), thus preventing the operation of any class register relay by depression of any class button 1–10; at its contacts 24B and 24C extends ground as required to the fare memory relays through a cross-connect (see also FIG. 5); at its contacts 24D (FIG. 17) opens a point in the circuit which extends from + through parallel contacts 25G–35G of the fare memory relays through contacts 24D to contacts 94A, 97A of the charge button 94 and non-revenue button 97, and thence to the charge relay 95 (see FIG. 18) and non-revenue relay 98 (see FIG. 18) respectively, so that operation of the charge button 94 or non-revenue button 97 is without effect (the operation of buttons 94, 97 being discussed more fully hereinafter); at its contacts 24E, 24F, and 24G extends + as required to light the fare indicators of FIG. 4, and at its contacts 24H extends + to light the DEPOSIT sign (FIG. 4). Thus the class buttons and the charge and non-revenue buttons are rendered ineffective as far as their designed functions in the system are concerned, and the proper fare indicators and the DEPOSIT sign are energized.

In the specific example shown in the drawings, when the unattended operation button is depressed, + through the contacts 24C thereof, cross-connect to conductor C8, and the winding of relay 29 to –, operates fare memory relay 29 to require deposit of $.25. It will be recalled that any value up to and including $3.00 may be required by operation of one, two, or three fare memory relays as shown on chart A. It will be appreciated then that contacts 24B, 24C, and 24D, can be selectively cross-connected to operate combinations of these relays to require any value shown in Chart A in similar fashion to the illustrated cross-connections from contacts 21F, 21G, and 21H of class relay 21. Thus as far as the fare memory relays are concerned, the operation of the Unattended Operation Button 24 operates a combination of fare memory relays to require deposit of a certain value in the manner of operation of the class button and class relay.

In the cross-connect shown in the present example, the unattended operation button 24 at its contacts 24C operates relay 29 (FIG. 5) as long as it is in locked position; at its contacts 24F (FIG. 4) lights the dimes digit "2" indicator; at its contacts 24G (FIG. 14) lights the cents digit "5" indicator; and at its contacts 24H (FIG. 14) lights the DEPOSIT sign. Relay 29 operates and closes its contacts 29B and 29C (FIG. 12) and opens its contacts 29D and 29E, thus requiring receipt of $.25 for operation of momentary fare paid relays 81 and 82.

The driver of an approaching vehicle now observes a red light, a DEPOSIT sign and arrow, and a fare indication of $.25. Accordingly, the driver deposits coins to the value of $.25, resulting in the operation in sequence of the coin pulse relays (FIG. 7), the coin counting chain(s) (FIGS. 8, 9, 10), and the momentary fare paid relays (FIG. 12), as will be understood from the previous description. As a result of operation of the momentary fare paid relays 81 and 82 of FIGURE 12, the fare paid counting chain relay 84 (FIG. 13) operates and the quarter counting chain (FIG. 10) is released.

Relay 84 of the fare paid counting chain operates relay 12 (FIG. 2) to deenergize the red light and to energize the green light. The axle counting chain relay 39 operates through contacts 84B and locks through contacts 39E and contacts 29A as long as the unattended operation button is locked operated. With the release of the quarter counting chain, contacts 73D and 74H (FIG. 12) open and contacts 84B of the fare paid chain are opened to release the momentary fare paid relays 81 and 82. The opening of contacts 81E (FIG. 13) allows relay 83 to operate in series with relay 84, and with contacts 84E and 83H closed (FIG. 15), relay 87 operates to prime the axle counting chain.

As the two axle vehicle passes over the treadle (FIG. 1) the treadle relay pulses (FIG. 14), in turn advancing the axle counting chain to relay 89 thereby registering two axles. As a result of such check, the axle check relay 93 (FIG. 16) now operates over the path from + through contacts 86F, 38D, 37D, 89J, and the winding of relay 93 to –. It should be observed that even with axle memory relays 36, 37, and 38 all non-operated, this network allows relay 93 to operate. Thus, in effect, this network (with relays 36, 37, and 38 all down) is set up to require two axles. It should be recalled and observed that with relay 36 operated during attended operation, the same path for operating relay 93 was in effect, independent of the operation of relay 36 which has other functions to perform.

Relay 93 locks through contacts 89K to +, and at its contacts 93A (FIG. 15) releases axle counting chain relay 89; and at its contacts 93C (FIG. 13) releases relay 84 of the fare paid chain which releases relay 12 (FIG. 2) changing the lights from green to red. Relay 84 restores and at its contacts 84E further prevent relay 87 from reoperating when relay 89 releases. Axle counting chain relay 89 releases and at contacts 89J opens the original operating circuit of relay 93 and at contacts 89K opens the locking circuit of relay 93. Relay 93 releases and at contacts 93A (FIG. 13) releases 83, restoring the equipment to normal.

*Unattended Operation*

TWO FARES

In an unattended operation, the DEPOSIT sign and $.25 fare indicators are permanently lighted through contacts of the Unattended Operation Button as long as this button is locked operated, and fare memory relay 29 is held operated thereby.

After the driver deposited the value of $.25, the equipment came to rest with relays 83 and 84 (FIGURE 13), and relay 87 (FIG. 15) operated. If the driver of another vehicle deposits the value of $.25 before the first vehicle crosses the treadle, the coin pulse relays operate again, in turn operating the counting chain(s), and when contacts 73D and 74H (FIG. 12) of the quarter chain (FIG. 10) close, relays 81 and 82 reoperate immediately because relay 29 is held operated by the Unattended Operation Button, and its contacts 29B and 29C are closed and its contacts 29D and 29E are open.

Relay 81, at its contacts 81E (FIG. 13), operates relay 85; and at its contacts 81A releases the quarter counting chain. Relays 73 and 74 restore and at contacts 73D and 74H (FIG. 12) release relays 81 and 82. Relay 81 restores and at its contacts 81D releases relay 83.

When the first vehicle passes over the treadle, the treadle relay 86 pulses, in turn advancing the axle counting chain to the point where relay 89 (FIG. 15) is operated. Thereupon the slow release axle check relay 93 operates, and at its contacts 93A restores relay 89; at its contacts 93C restores relay 85 (FIG. 13), and at contacts 93A hold relay 84. With relays 85 and 83 both released, contacts 85F and 83H are open, and the circuit for priming and pulsing the axle chain is held open.

As a result of the opening of contacts 89J and 89K of relay 89 of the axle counting chain, relay 93 releases. If desired, break contacts of relay 93 can be inserted at points indicated by arrows in the axle counting chain of FIG. 15 whereby the operation of relay 93 opens any holding circuits of the axle counting chain relays but the operated axle counting chain relay holds to the pulse which operated it until 93 backs up the fare paid chain to open contacts 84 on a single fare paid or contacts 85 on two fares paid.

The release of axle check relay 93 (FIG. 16) results in the opening of contacts 93A, removing the shunt from the upper winding of relay 83 which operates in series with relay 84. With relays 83 and 84 operated and relay 89 released, a circuit is completed to operate relay 87 to prime the axle counting chain (FIG. 15) in preparation for the second vehicle to pass over the treadle.

As the second vehicle passes over the treadle, the treadle relay 86 pulses and the axle counting chain is again driven to the point where relay 89 (FIG. 15) is operated, whereupon the axle check relay 93 (FIG. 16) reoperates. Relay 93 at its contacts 93A releases relay 89; at its contacts 93C releases relay 84; and at its contacts 93A holds relay 83. It should be observed that with relay 84 (FIG. 13) released, contacts 84A (FIG. 2) are opened, releasing relay 12 which, at its contacts 12A extinguishes the green lamp and its contacts 12B lights to red lamp. The opening of contacts 89J and 89K (FIG. 16) releases relay 93, which at its contacts 93A releases relay 83, returning the equipment to normal.

*Charge and Non-Revenue*

Provisions are made for the drivers of certain vehicles such as busses and trucks to charge their toll fees.

In one embodiment, a conventional type charge card is carried by its drivers authorized to make such charges, and the attendant uses such card (in lieu of the receipt of a fare) to make a record for billing purposes. However, the attendants are required to classify such vehicles by depressing the appropriate class buttons which result in the operation of remote indicating and counting equipment for observation and record purposes as will become clearer hereinafter with reference to FIG. 20.

Assuming, for example, that the aforesaid 5 axle vehicle approaches the toll station of FIG. 1 and that the attendant momentarily depresses non-locking class 9 button (FIG. 3), operating relay 21. It should be observed that the operating and locking paths for relay 21 pass through closed break contacts 24A of the unattended operation Button 24. As a result of the operation of class relay 21, the sequence of operation described hereinbefore takes place including the lighting of the DEPOSIT sign and the operation of fare memory relays 25, 29, and 33 to in turn light the fare indicator equipped to display a required toll of $2.30.

Figure 18:
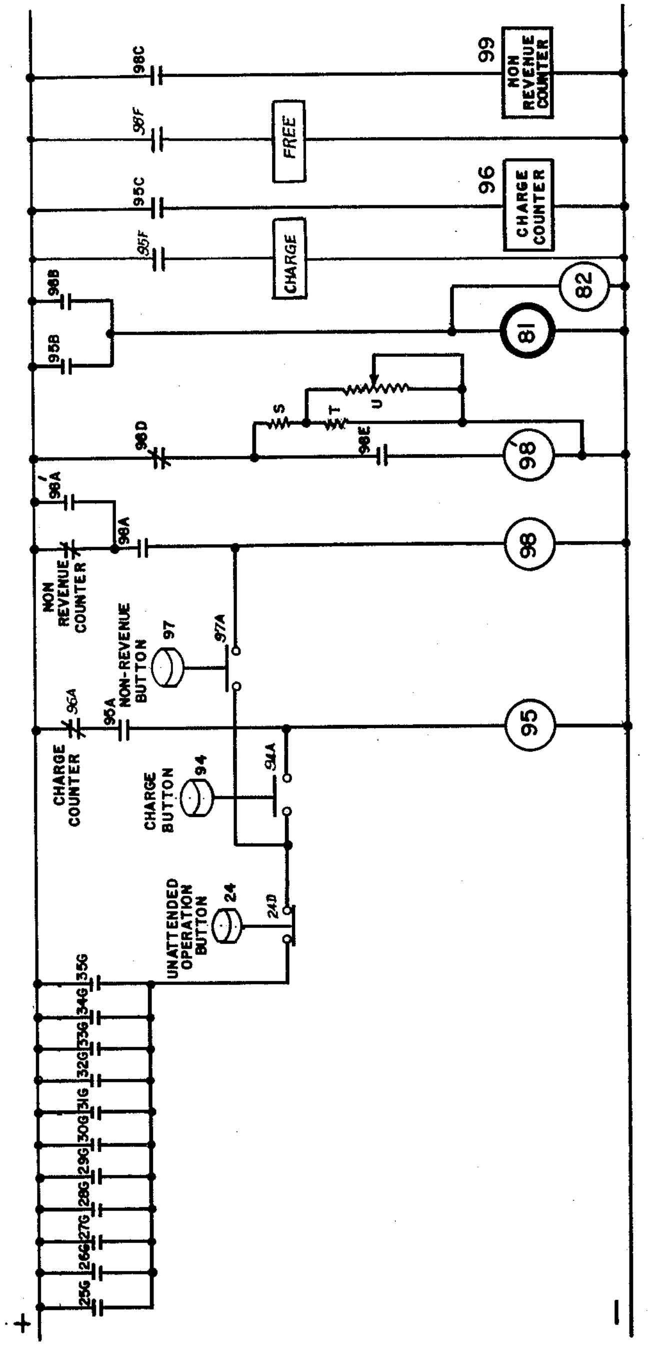

If the party is of the group which is entitled to a charge privilege, the attendant now momentarily depresses the non-locking charge button 94 (FIG. 18) and + through contacts 25G, 29G, and 33G in parallel, through contacts 24D (FIGS. 18 and 17) through closed contacts 94A of the charge button 94, and the winding of relay 95 (FIG. 18) to —, operates relay 95 (FIG. 18). Relay 95 locks over the path from + through break contacts 96A of the charge counter 96, contacts 95A, and the winding of relay 95 to —, independent of the charge button 94.

Relay 95 operates and at its contacts 95C (FIG. 18) operates the charge counter 96 (which may be near or remote) over an obvious circuit; at its contacts 95B operates momentary fare paid relays 81 and 82 (see also FIG. 12) over an obvious circuit; and at its contacts 95F lights the CHARGE sign (see FIGS. 1 and 18) to indicate visually that a fare is being charged. Relay 81 at its contacts 81E operates relay 84 which operates relay 12 (FIG. 2), extinguishing the red lamp and lighting, the green lamp; and at its contacts 84B (FIG. 6) operates the axle transfer relay 39 which locks through contacts 39E and 25A, 29A, and 33A in parallel to +. Relay 39 operates relays 36 and 38 which lock through contacts of relays 39 and 21 to +. The operation of relays 36 and 38 releases relay 21 which extinguishes the DEPOSIT sign and the $2.30 indicators.

The remote charge counter contacts open (FIG. 18) releasing relay 95 which opens its contacts 95B, releasing relays 81 and 82. Relay 83 (FIG. 13) then locks in series with relay 84, and with relays 83 and 84 operated, a circuit is completed to operate relay 87 (FIG. 15), thus priming the axle counting chain.

It should be observed at this point that the red light has been extinguished, the green light has been lighted, and the axle counting chain has been primed without requiring the deposit of the toll fare. Thus the operation of the charge button results in by-passing the coin deposit requirement. The sequence upon passage of the vehicle over the treadle is the same as that described. It should be observed that the lighting of the CHARGE sign and the recording of a charge on the charge counter guards against fraud on the part of the toll attendant.

Provisions are also made for the drivers of certain vehicles such as highway service cars and trucks to pass without requirement of coin deposit. It is again necessary for the attendant to classify the vehicle for remote indicating and counting purposes. The operation of the non-revenue button 97 (FIG. 18) is analogous to the operation of the charge button. Non-revenue button 97 however operates relay 98 which operates relay 98′ over the path from + through contacts 98D and 98E and the winding of relay 98′ to —. Relay 98 locks over the path from + through contacts 98′A, 98A, and the winding of relay 98 to —, independent of the non-revenue button.

A variable timing arrangement comprising resistors S and T and rheostat U and associated condenser keeps relay 98′ operated through contacts 98E for an interval. When relay 98′ releases, the circuit of relay 98 is opened at 98′A, and relay 98 releases, the opening of contacts 98′A being analogous to the opening of the charge counter contacts. It should be noted that contacts 98B operate relays 81 and 82 and contacts 98C operate a remote non-revenue counter 99.

Figure 20:
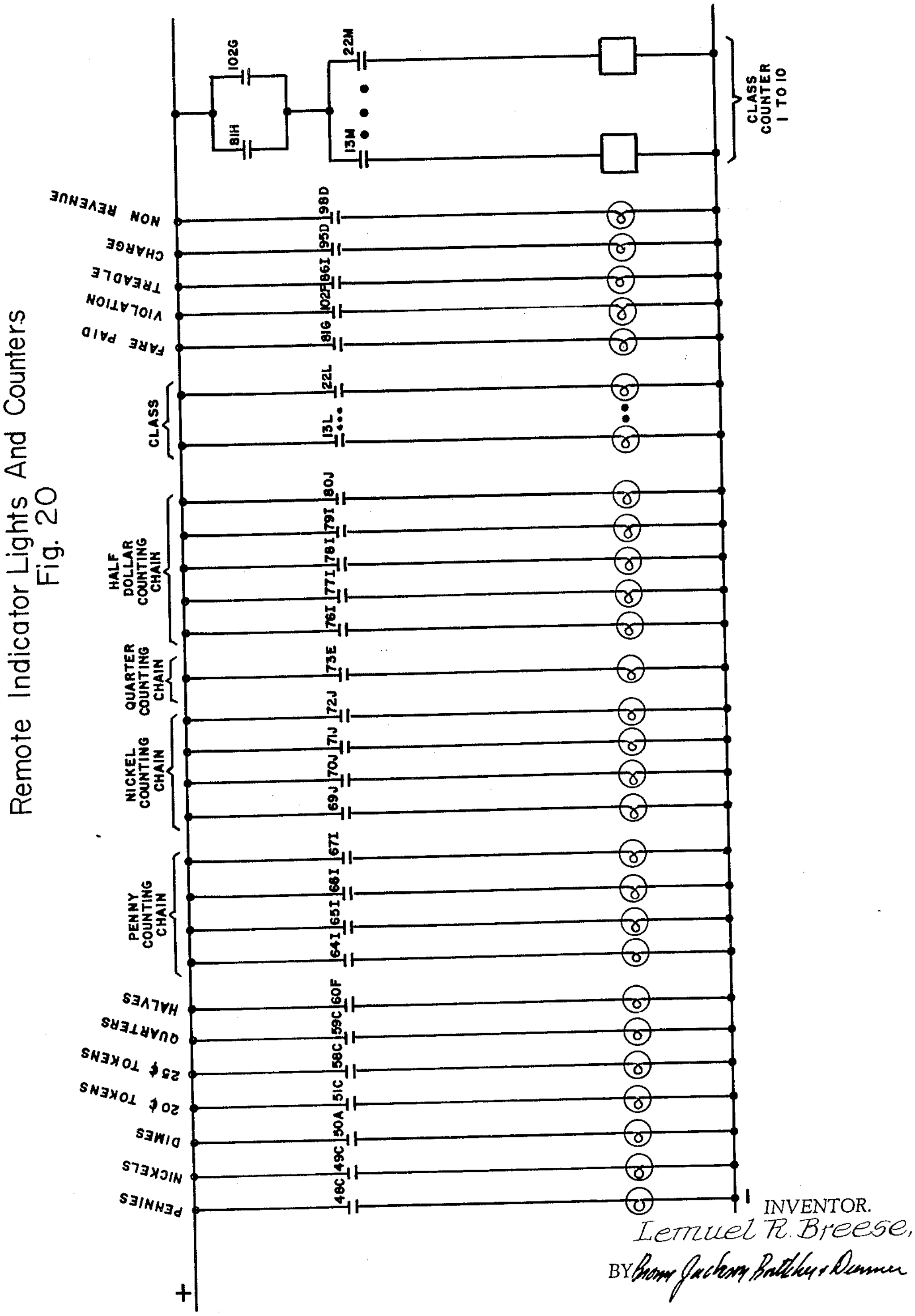

Referring to FIG. 20 it can be seen that contacts 95D light a remote charge lamp; and that contacts 98D light a remote "non-revenue" lamp. As a charge may be made by the attendant only if the driver has a charge plate which is used in the preparation of a bill for record purposes. Thus if the total number of charge records does not tally with the number of charges in the indicator 96 (FIG. 18), error or fraud is apparent. In some installations, it may be desirable to pass certain "non-revenue" vehicles, such as police cars, without the use of charge plates, and in such intallations the timing arrangement just described keeps the remote "non-revenue" lamp lighted for an appreciable interval so that a remote attendant is aware that vehicles are being passed free.

Each time relay 81 operates and releases contacts 81F thereof operate a remote fare paid counter. Accordingly the true fares paid may be derived by adding the counts on the charge and non-revenue counters and subtracting the sum thereof from the count of the fare paid counter.

*Violations and Alarms*

The novel system is also arranged to detect violations of the required toll payments, and to provide visual and audible alarm means. Thus the system is operative to recognize a misclassification by the attendant wherever the number of axles does not agree with the rate charged. Such arrangement also recognizes the passage of axles for which no fare has been paid. Other means are provided to recognize the receipt of a bent coin or the like in the system. Such equipment has been grouped in the showing of FIG. 19 for description purposes, the treadle switch contacts and circuit being the same components which are shown on FIG. 14.

It is first assumed that a vehicle approaches and without stopping or depositing coins, drives over the treadle. Each time the treadle switch contacts open and close, relay 86 pulses. When treadle relay 86 operates as a result of the vehicle passing over the treadle without a fare paid being registered on the fare paid chain it locks over the circuit (FIG. 14) from +, through contacts 101A, 84D, 86B and the winding of relay 86 to —. Violation relay 101 operates over the path from + through contacts 83I, 84F, 86G, and the winding of relay 101 to —, and the associated condenser shown becomes charged.

Relay 101 operates violation relay 102 over the path from + through contacts 101B and the winding of relay 102 to — and treadle relay 86 is locked over the path extending from + through external break contacts of the violation counter, contacts 102A and 86D and the winding of relay 86 to — (see FIG. 14.) Relay 102 at its contacts 102D operates the remote violation counter, and at its contacts 102B operates violation light and bell relay 103, which in turn closes its contacts 103A and 103B lighting the alarm lamp 10 (see also FIG. 1) and ringing the alarm bell 11 (see also FIG. 1).

The operation of relay 102 also closes contacts 102E operating alarm memory relay 104 over the path extending from + through contacts 102E, 105 A, and the winding of relay 104 to —; at its contacts 104A, relay 104 prepares to operate in series with relay 105 which is shunted. The remote violation counter opens its break contacts, releasing relay 86. Relay 86 restores and at its contacts 86G, opens the timing circuit associated with relay 101 comprising resistors M and O and rheostat N, and associated condenser keeps relay 101 operated for an interval, after which it releases.

When relay 101 restores, it is effective at its contacts 101B, to release relay 102. Relay 102 at its contacts 102D releases the remote violation counter, which recloses its remote contacts in the locking circuit of relay 86 which has released; at its contacts 102E removes the shunt from relay 105 which operates in series with relay 104 over the path from + through contacts 84G, the winding of relay 105, contacts 104A, and the winding of relay 104 to —; and at its contacts 102B releases relay 103 which extinguishes the alarm lamp and silences the alarm bell.

Relay 105 at its contacts 105B prepares a circuit for relay 106, and at its contacts 105A opens the original operating circuit of relay 104. The next operation of relay 84 in the fare paid chain (FIG. 13) releases relays 104 and 105 by opening its contacts 84G, thus releasing the alarm memory circuit. However, if a fare paid does not occur before the next violation, the next violation reoperates relay 86 and in turn relays 101 and 102 which, with relays 104 and 105 operated, operates relay 106 over the path from + through contacts 102E, 105B and the winding of relay 106 to —. Relay 102 operates the violation counter and relay 103 which lights the alarm lamp and rings the alarm bell.

Relay 106 at its contacts 106B opens the charging circuit of the condenser associated with relay 107 and thereafter contacts 106A apply the charge of the condenser associated with relay 107 across relay 107 operating relay 107, the condenser being normally charged over the path from + through contacts 106B, resistor P, resistor Q, and the condenser to —; rheostat R being in parallel with resistor Q and the condenser to provide a manually variable charging circuit. Relay 107 releases when the charge from the condenser expends itself to the point of releasing relay 107 over the path from the condenser through resistors Q and P, contacts 106A, the winding of relay 107 back to the condenser.

During the time that relay 107 is operated a circuit is completed over the path from +, contacts 107A and scavenger control relay 108 to —, operating relay 108. Relay 108 at its contacts 108A opens the circuit of the scavenger solenoid, releasing same, which allows a coin door (not shown) in the coin collecting mechanism to open, dropping all coins into a collecting box, it being assumed that two violations in a row (with no fare paid) indicate a stuck or bent coin.

When relay 107 releases, contacts 107A release the scavenger control relay 108. Contacts 108A of relay 108 close reoperating the scavenger solenoid to close the coin door. Relay 102, it will be recalled, operated the violation counter, which releases relay 86 which in turn opens its contacts 86G to allow relay 101 to release after an interval, and in turn release release relay 102. Relay 102 releases the violation counter and relays 103 and 106. The release of relay 103 extinguishes the alarm lamp and silences the alarm bell. With relay 106 released, one violation is removed from the alarm memory circuit, but one violation remains registered in the alarm memory circuit. The next fare pair results in the opening of contacts 84G which in turn release relays 105 and 104 to remove the remaining violation from the alarm memory circuit.

However if a fare paid does not occur before the next violation, relay 106 will be reoperated through contacts 102E with the results incident to registration of a second violation. Additionally it will be observed that each time treadle relay contacts 86H close and open, a remote axle counter is operated; and that each time contacts 86H close with contacts 83J and 84H both closed (indicating no fare paid), a remote violation axle counter is operated from + through contacts 86H, 83J, 83H, through the violation axle counter to —. Thus the nonviolating axle count is obtained by subtracting the count of the violation axle counter from the count of the axle counter.

It is now assumed, for illustrative purposes, that a class 3 vehicle approaches, and is properly classified in the system, and that instead of depositing the required $.25, the driver deposits only $.10, and crosses the treadle.

When the attendant classified the vehicle, class register relay 15 operated, in turn operating fare memory relay 29. When the driver of the vehicle deposits $.10, relay 70 of the nickel chain becomes operated, but momentary fare paid relay 81 does not operate, the nickel counting chain relay 70 is not released, the fare pair counting chain is not operated, the axel transfer relay 39 is not operated, the axle memory relays are not operated, and accordingly the class register relay 15 and in turn relay 29 are not released, and the axle counting chain is not primed. The red light remains lighted.

When the vehicle passes over the treadle, the axle counting chain does not count the pulses, and violation relay 101 (FIG. 19) is operated with the attendant consequences already described.

Referring to FIG. 3, when relay 102 operates, contacts 102C release relay 15 and in turn relay 29. Relay 70 of the nickel counting chain remains operated maintaining the indicator lamp lighted (see FIG. 20). Referring to FIGS. 7A and 8, the attendant operates a manual control key which momentarily opens the circuit from + through contacts 81A, releasing relay 70 of the nickel chain to return the circuit to normal. It can be standard procedure for the attendant to operate the manual control key of FIG. 7A after every violation with the red light lighted.

Assume now a two fare operation in which two vehicles approach, and in which the first driver pays the correct fare, the second driver pays a partial fare, and both vehicles go over the treadle. The sequence is the same as that previously described for two fare operation up to and including the operation of the counting chains when the driver of the second vehicle deposits the coins.

With insufficient fare deposited, the momentary fare paid relay 81 does not operate, the fare paid counting chain is not advanced to register a second fare paid and the counting chains are not released.

When the first vehicle crosses the treadle, its axles are counted inasmuch as axle counting chain 87 was in the operated condition; and as the correct number of axles as required by the operated axle memory relays for the first vehicle now pass over the treadle, the axle check relay operates, releasing the axle memory relays and the axle counting chain, and initiating the removal of the fare paid from the fare paid chain by releasing relay 84. As a result of the release of the axle memory relays and the axle counting chain, the axle check relay is released. Relay 83 of the fare paid chain is then released, but inasmuch as no fare paid remains on the fare paid chain, the axle counting chain is not primed and the axle transfer relay is reoperated. When the second vehicle now passes over the treadle, a violation occurs, and relay 102 releases the class register relay which releases the fare memory relays.

The attendant operates the manual control key contacts of FIG. 7A, releasing the counting chains.

*Remote Indicator Lights and Counters*

The system also includes certain remote indicator lights for visual supervision and remote counters for control and supervision purposes (FIG. 20).

With reference to FIG. 20, the following normally open make contacts of corresponding relays are connected in series with corresponding remote lamps between + and —, so that each relay in the control equipment bay 5 (FIG. 1) operates a corresponding remote lamp in its operation.

| Function | Relay | Contacts |
|---|---|---|
| Penny coin receipt | 48 | 48C |
| Nickel coin receipt | 49 | 49C |
| Dime coin receipt | 50 | 50A |
| 20¢ token receipt | 51 | 51C |
| 25¢ token receipt | 58 | 58C |
| quarter coin receipt | 59 | 59C |
| Half-dollar coin receipt | 60 | 60F |
| One penny count | 64 | 64I |
| Two penny count | 65 | 65I |
| Three penny count | 66 | 66I |
| Four penny count | 67 | 67I |
| One nickel count | 69 | 69J |
| Two nickel count | 70 | 70J |
| Three nickel count | 71 | 71J |
| Four nickel count | 72 | 72J |
| One quarter count | 73 | 73E |
| One half-dollar count | 76 | 76I |
| Two half-dollar count | 77 | 77I |
| Three half-dollar count | 78 | 78I |
| Four half-dollar count | 79 | 79I |
| Five half-dollar count | 80 | 80I |
| Six half-dollar count | ------ | ------ |
| Class 1 Assignment indication | 13 | 13L |
| Class 2 Assignment indication | 14 | 14L |
| Class 3 Assignment indication | 15 | 15L |
| Class 4 Assignment indication | 16 | 16L |
| Class 5 Assignment indication | 17 | 17L |
| Class 6 Assignment indication | 18 | 18L |
| Class 7 Assignment indication | 19 | 19L |
| Class 8 Assignment indication | 20 | 20L |
| Class 9 Assignment indication | 21 | 21L |
| Class 10 Assignment indication | 22 | 22L |
| Fare paid indication | 81 | 81G |
| Violation | 102 | 102F |
| Treadle | 86 | 86I |
| Charge | 95 | 95D |
| Non-Revenue | 98 | 98D |

Remote class counters 1–10 are used to provide a record of the number of each of the different fares registered by the attendant.

That is, whenever a fare paid is registered on the fare paid chain as evidenced by closed contacts 81H or a violation occurs as evidenced by closed contacts 102G, + through either of these contacts in parallel is extended to contacts 13M to 22M of class register relays 13 to 22 and through the class relay which is closed at the time to the associated remote class counter and therethrough to —.

*Miscellaneous Considerations*

Other unusual conditions of operation are likewise anticipated by the equipment, thus, in a situation in which:

Vehicle 1 approaches, sees red light and stops;
Attendant operates class key for vehicle 1;
Driver of vehicle 1 deposits coin(s) turning light green and proceeds;
Vehicle 2 approaches;
Atendant operates class key for vehicle 2;
Vehicle 1 passes over the treadle;
Driver of vehicle 2 deposits coin(s) and proceeds;
Vehicle 2 crosses treadle.

This condition can be illustrated by the attended two fare operation example described hereinbefore with the exception that the first vehicle (class 9) passes over the treadle before, rather than after, the driver of the second vehicle (class 3) deposits coin(s), i.e. $.25 as illustrated. The sequence in such event is the same as that hereinbefore described up to and including operation of the class 3 button by the attendant to classify the second vehicle and will not be repeated.

When the class 9 vehicle passes over the treadle (assuming fast treadle pulses) the operation is the same as that already described up to and including the operation of the axle check relay.

When the axle check relay operates, it releases relays 36, 38, and 92 as before; but in this case, inasmuch as only one fare is registered and 84 are in the operated position, and relay 93 releases relay 84 which releases relay 12, extinguishing the green light and lighting the red light. The release of relay 36, 38 and 92 releases relay 93 which releases relay 83. The axle transfer relay does not operate because contacts 84B (FIG. 6) are open.

When the driver of the second vehicle deposits coin(s), i.e. $.25 in the given illustration, the sequence is the same as that described up to and including the operation of relays 81 and 82. Relay 81 operates relay 84 and releases relays 73 and 74. Relay 84 operates light relay 12 which extinguishes the red light and lights the green light; and also operates relay 39 which operates relay 36, releasing relay 15 which releases relay 29 which releases relay 39. The release of relay 15 extinguishes the DEPOSIT sign and the $.25 on the fare signal unit 7. The release of relays 73 and 74 opens the original energizing circuit of relays 81 and 82, and relay 84 at its contacts 84B opens the holding circuit of relays 81 and 82. Accordingly relays 81 and 82 release.

The release of relay 81 operates relay 83 which operates relay 87 priming the axle counting chain. The sequence of operations when the second vehicle, class 3, passes over the treadle is the same as that described.

With reference to FIG. 13, it is now assumed that one fare paid is registered with relays 83 and 84 operated in series. Thereafter if relays 81 (FIG. 12) and 93 (FIG. 16) should operate at the same time, i.e., if a vehicle goes over the treadle and the axle check relay operates at the same time that fare paid relay 81 operates as a result of deposit of fare by the driver of the next vehicle behind, the following operation ensues.

With relays 81 and 93 operated, contacts 81D, 81E, and 93A (FIG. 13) operate and contacts 93C open; and relay 85 operates over the path from + through contacts 81E, 83G, and the winding of relay 85 to —. As relay 85 closes its contacts 85B before contacts 85E open, the circuit for holding relay 84 is transferred to the path from +, resistor L, contacts 85B, 84C, and the winding of relay 84 to —. The upper winding of relay 83 is deenergized when contacts 85E open but the relay holds over its lower winding over the path from + through contacts 81D and 93A in parallel, contacts 83B, and the lower winding to —. Thus relays 83, 84, and 85 are all operated. A holding circuit for relay 85 is established from + through contacts 83E, resistor S, contacts 85D and the winding of relay 85 to —.

Whether relay 52 or 53 releases last is immaterial. If relay 52 releases first, contacts 81E open, but relay 85 holds through contacts 83E until relay 83 releases. In either case, the last relay (81 or 93) to release opens the holding circuit of relay 83 through its lower winding, at contacts 81D or 93A, releasing relay 83. With contacts 81E open, the opening of contacts 83E releases relay 85.

As contacts 83E close before contacts 85B open, relay 83 reoperates in series with relay 84 over the path from + through contacts 83D, the upper winding of relay 83, contacts 85E, 84C, and the winding of relay 84 to —. Contacts 83E close before contacts 83D open, establishing the following holding path for relays 83 and 84': +, contacts 83E, 93C, the upper winding of relay 83, contacts 85E, 84C, and the winding of relay 84 to —.

Thus the fare paid counting chain is in the position to indicate only one remaining fare paid (which is the actual condition). In other words, as the equipment was trying to register a second fare paid and trying to take a fare paid off at the same time, one, in effect "neutralize" the other.

Figure 19:
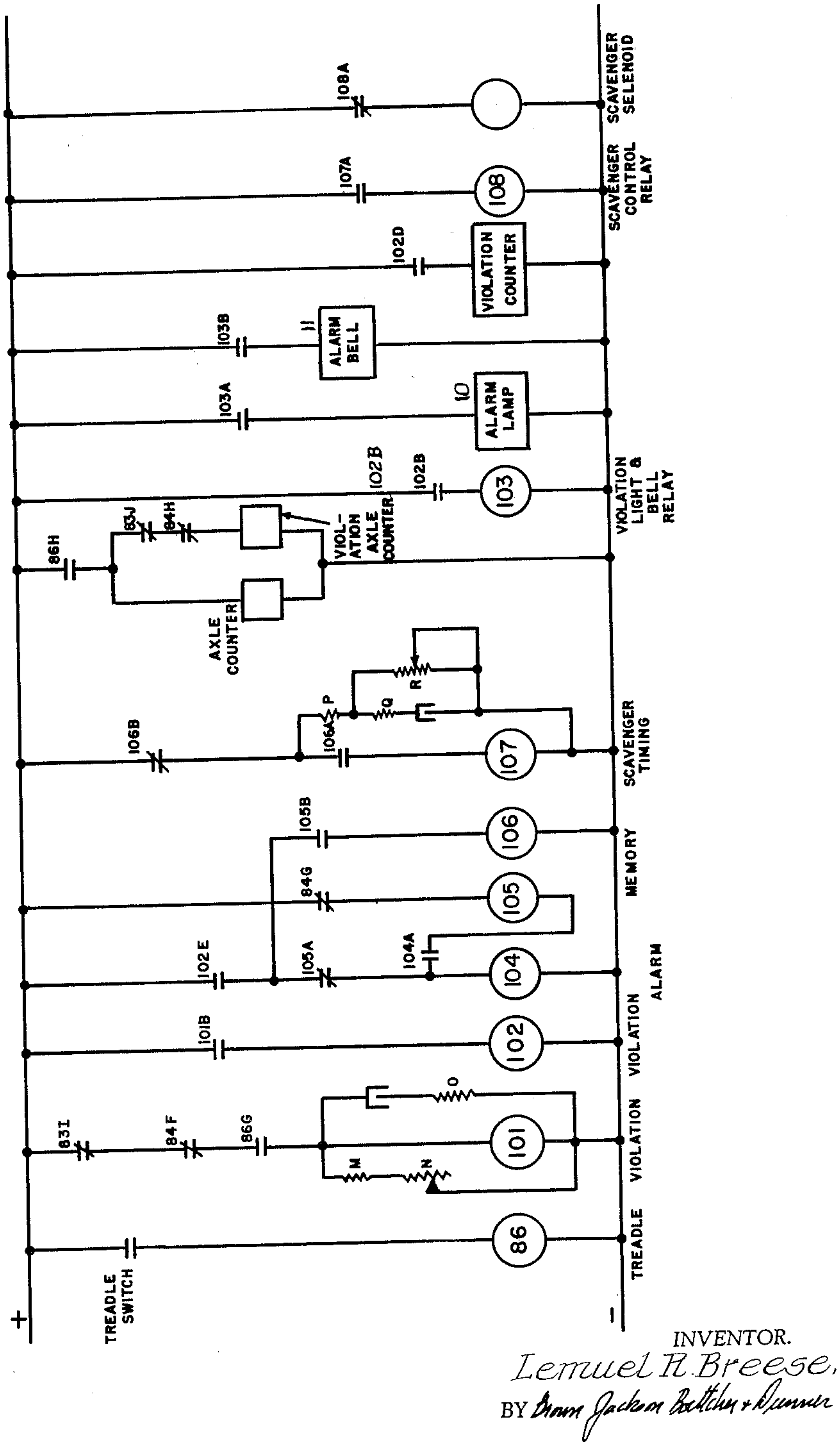

It is now assumed that a truck and semi approaches (three axles) and that the attendant erroneously classifies it as a two axle passenger car requiring $.25. The driver of the truck pays $.25 whereupon a single fare paid is registered on the fare paid chain of FIG. 13 resulting in the operation of relays 83 and 84 and the consequent opening of contacts 83I and 84I (FIG. 19).

When the first two axles pass over the treadle, one fare paid is removed, as will be understood from what has been discussed hereinbefore, releasing relays 83 and 84 and reclosing contacts 83I and 84I. Accordingly the passage of the third axle over the treadle operates treadle relay 86, closing contacts 86G and a circuit is completed to operate violation relay 101 with the attendant consequences discussed hereinbefore. It should be appreciated that with contacts 84E and 83H open (FIG. 15) this third axle would not be counted by the axle counting chain. If the driver of the next vehicle deposits the correct amount, registration of a fare paid operates relay 84 and contacts 84G (FIG. 19) open, removing this violation from the alarm memory circuit. Of course, if the attendant unintentionally classified the truck wrongly and immediately recognized this fact he could have momentarily depressed the correction key (FIG. 3) which would have released the operated class register relay and the fare memory relays which were consequently operated; and then he would have operated the correct class button.

Assume now that a truck and semi approaches; that the attendant erroneously classifies it as two axle passenger car requiring $.25 whereupon a single fare paid is registered on the fare paid chain of FIG. 13; that a passenger car pulls up behind the truck; that the attendant correctly classifies the passenger car; that the driver of the passenger car deposits $.25 registering two fare paids on the fare paid chain; that thereafter the truck passes over the treadle; and thereafter the passenger car passes over the treadle.

The first two axles of the truck which pass over the treadle run the axle counting chain up until relay 89 operates, in turn operating axle check relay 93 (FIG. 16) with regular attendant consequences removing one fare paid from the fare paid chain of FIG. 13. The third axle of truck and the first axle of the car which pass over the treadle again runs the axle chain up until relay 89 operates, in turn operating relay 93 with regular attendant consequences, removing the remaining fare paid from the fare paid chain.

With relays 83, 84, and 85 released and contacts 83H, 84E, and 84F open (FIG. 15), the passage of the third axle over the treadle cannot operate the axle counting chain but the passage of this axle over the treadle operates relay 86 which closes its contacts 86G, operating violation relay 101, as contacts 83I and 84F have closed, with attendant consequences. When treadle contacts open as a result of completion of the third pulse of the treadle, the initial energizing circuit of relay 101 is opened causing relay 101 to release (with regular consequences) as determined by its slow-release network, giving a timed response of alarm lamp 10 and alarm bell 11 and storing one violation on the alarm memory circuit.

If the next vehicle deposits coins resulting in a fare paid, contacts 84G open to remove this violation from the alarm memory circuit.

Assume now that a class 3 vehicle approaches, is properly clasified, and that the driver deposits two dimes and a nickel, but the nickel misses the coin hopper. As the momentary fare paid relay 81 does not operate, the fare paid chain is not operated and the red light remains lighted. This should be the signal to the driver that the correct fare has not be recorded. But, assuming that the driver, in spite of the red light drives his vehicle over the treadle, it will be apparent that since no fare paid was registered, the axle counting chain was not primed, and does not count the violating axles. However an alarm sounds as hereinbefore described, whereupon the driver parks his car on the other side of the treadle, comes back, picks up the nickel from the ground, and deposits it in the hopper, advancing the counting chains to register $.25 paid, operating momentary fare paid relay 81 which advances the fare paid chain to register a fare paid, extinguishing the red light and lighting the green light.

The next vehicle approaches, is properly classified, deposits the correct fare, reoperating the momentary fare paid relay, advancing the fare paid chain to register two fares paid. The second vehicle crosses the treadle, whereupon the axle check relay 93 removes one fare paid from the fare paid chain, but one fare pair remains keeping the light green.

This could go on indefinitely. Accordingly, if the green light remains lighted, the attendant operates the manual control key 109 (FIG. 16) closing an obvious circuit through contacts 109B to operate relay 93 which artificially removes the remaining fare paid from the fare paid chain, resulting in the extinguishing of the green light and the lighting of the red light. The manual control key shown in FIG. 7A and the manual control key shown in FIG. 16 can be the same key operating the two sets of contacts shown. Thus, if the key contacts shown in FIG. 7A are operated for the purpose described in connection with FIG. 7A, i.e. to release the counting chains with the red lamp lighted, no harm is done by operating relay 93 (FIG. 16) incidentally as no fare paid was on the fare paid chain at the time. Also if the contacts shown in FIG. 16 are operated for the purpose described in connection with FIG. 16, i.e. to remove a fare paid, no harm is done by opening the circuit of the counting chains.

The manual control key contacts of FIG. 16 could also be operated by the attendant if an extra fare paid remained on the fare paid chain as a result, for example, of the driver of a class 3 vehicle depositing one at a time two dimes and a nickel, registering a fare paid, followed by two dimes and a nickel, registering an extra fare paid.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In a toll collecting system adapted for use with facilities requiring a toll payment having receiving means for receiving toll payments of various species, signal means operative to generate signals representative of the number of each species received by said receiving means, comparison means comprising a plurality of network circuits, each of which is connected to represent a different one of said species, register means operative to register on the different network circuits in combination the toll payment required, totalizing means connected to said signal means operatively controlled by said signals to determine the value of the payment received including means operative to register on said different network circuits in combination the toll payment deposited, indicator means for providing a check signal operatively controlled by said different network circuits in combination responsive to registration thereon of a total deposited toll which is equal in amount to the required toll, and further means connected to said network circuits operatively controlled to energize said network circuits responsive to the registration thereon of a deposited toll which is greater than said required toll to enable said indicator means.

2. In a toll collecting system including receiving means for collecting tolls in which the total payment required is expressed in terms of the total value of the units of each of a number of different species, signal means operative to generate signals representative of the number of each species received by said receiving means, register means operative to mark the number of units of each of the different species which represent the toll payment required, totalizing means connected to said signal means operative to determine the total number of each of the different species of toll payments deposited, including counting means for each of said species operatively controlled by said signal means to count the number of each species received, and means operative to translate each count of a lower value species which total to an amount consistent with the value of a unit of the next higher species into a unit of said next species, comparison means including a plurality of network circuits, each of which represents a predetermined one of said species, and each of which includes a first set of marking contacts operatively controlled by said register means to mark the total number of its species, required, including means connecting each contact in a set to represent a predetermined number of units of the required species, and a second set of marking contacts operatively controlled by said totalizing means to mark the total number of each species deposited, including means connecting each of said contacts of said second set to represent a predetermined number of units of the species received, means connecting the corresponding contacts of each of the first and second sets to indicate the occurrence of coincidence of the required number with the deposited number for its associated species, and means connecting the network circuits in a common circuit to provide a cumulative indication responsive to the occurrence of coincidence of the numbers in each of the species networks.

3. In a toll collecting system for use with facilities requiring a toll payment of a given amount by a user of a given preidentified characteristic, different users having different characteristics, including receiving means for receiving toll payments of various species, signal means operative to generate signals representative of the number of different species received by said receiving means, toll payment comparison means, fare marking means operative to register on said comparison means the amount of the toll payment required, characteristic memory means, control means operative to mark the required toll on said fare marking means including means simultaneously operative to provide a marking indicative of the nature of the characteristic for said user on said characteristic memory means, totalizing means operative to register on said comparison means the amount of the toll payment deposited, fare paid means for providing a check signal operatively controlled by said comparison means responsive to registration thereon of a deposited toll which is at least equal to the amount of toll required, verification means including characteristic detection means operative to generate a signal indicative of the nature of the characteristic class of the user, and characteristic comparing means connected to said detection means operative to compare the characteristic indication of said signal with the characteristic marking on said characteristic memory means, and transfer means operatively controlled by said check signal to transfer said marking on said characteristic memory means to said characteristic comparing means for comparison purposes.

4. A toll collecting system as set forth in claim 3 which includes alarm means operatively controlled by said characteristic comparing means responsive to the detection of a difference between the characteristic indicated by the signal of said verification means and the characteristic indicated by said memory means.

5. In a toll collecting system for use with facilities requiring a toll payment of a given amount by a user having a predetermined characteristic including barrier means for blocking the user prior to payment of the toll, and receiving means for receiving toll payments of various species, signal means operative to generate signals representative of the number of each species received by said receiving means comparison means, fare marking means operative to register on said comparison means the amount of the toll payment required, characteristic memory means, control means operative to mark the required toll on said fare marking means, including means simultaneously operative to provide a signal indication of said predetermined characteristic of the user to said characteristic memory means, totalizing means connected to said signal means operative to register on said comparison means the amount of the toll payment deposited, fare paid means operatively controlled by said comparison means responsive to registration thereon of a deposited toll which is at least equal to the amount of toll required, barrier release means operatively controlled by operation of said fare paid means to remove said barrier for the user, verification means including means operative to generate a signal indicative of the predetermined characteristic of the user responsive to passage of the user thereby, and characteristic comparing means connected thereto operative to compare the characteristic indication of said signal with the characteristic indication of the signal on said characteristic memory means, and transfer means operatively controlled by said fare paid means to transfer said marking on said characteristic memory means to said characteristic comparing means for comparison purposes.

6. In a toll collecting system for use with facilities having receiving means for receiving a toll payment of a given required amount for use by a vehicle having a predetermined characteristic, signal means operative to generate signals representative of the number of each species received by said receiving means, comparison means, fare marking means operative to register the amount of the toll payment required on said comparison means, characteristic memory means, control means operative to mark said fare marking means including means simultaneously operative to provide a signal indicative of the character of the vehicle to said characteristic memory means, totalizing means operatively controlled by said signal means to register on said comparison means the amount of the toll payment deposited, fare paid means operatively controlled by said comparison means responsive to registration thereon of a deposited toll which is at least equal to the amount of toll required including counting means operative to count each fare as paid, verification means including characteristic determining means operative responsive to the passage of each vehicle to generate a signal representative of the characteristic of the vehicle, and characteristic comparing means connected to said characteristic determining means operative to compare the characteristic indication provided by the generated signal with the class indicated on said characteristic memory means, and means connected to said characteristic comparing means operative to remove a fare paid count from said counting means responsive to each verification by said characteristic comparing means of the characteristic indicated by said generated signal with the characteristic indicated by said characteristic memory means.

7. A toll collecting system as set forth in claim 6 in which said characteristic comparison means includes a first set of marking means controlled by said characteristic memory means and a second set of marking means controlled by said characteristic determining means, and characteristic check means operatively controlled by said comparison means responsive to registration of the same characteristic indication on said first and second sets.

8. In a toll collecting system for use with facilities including receiving means for receiving a toll payment of different amounts required of vehicles having a different number of axles, signal means operative to generate signals representative of the number of each species received by said receiving means, comparison means for checking the toll received, fare marking means operative to register the amount of the toll payment required on said comparison means, control means operative to mark said fare marking means with said amount and simultaneously operative to provide a marking indicative of the number of axles on the vehicle, totalizing means operative to register on said comparison means the amount of the toll payment deposited, fare paid means operatively controlled by said comparison means responsive to registration thereon of a deposited toll which is at least equal to the amount of toll required, counting means connected to said fare paid means to count each operation of said fare paid means, verification means including detection means operative to determine the number of axles on the vehicle with passage of the vehicle thereby, and axle comparing means connected to said detection means operative to compare the count of the detection means with the number of axles indicated by the marking provided by said control means, and means connected to said axle comparing means operative to remove one count from said counting means responsive to conformance of the indicated axle count and axles counted.

9. In a toll collecting system for use with facilities and receiving means for receiving a toll payment of different values required for different users, signal means operative to generate signals representative of the number of each species received by said receiving means, comparison means for checking the amount of the toll received, register means operative to register on said comparison means the toll payment required from a first user, totalizing means connected to said signal means operative to register on said comparison means the toll payment as deposited by the first user, fare paid means operatively controlled by said comparison means responsive to registration of a deposited toll on said comparison means which is at least equal to the amount of the toll required, verification means including characteristic comparison means operative to verify the identity of each user and enabling means connected to said fare paid means operative to control completion of an enabling circuit to said characteristic comparison means only subsequent to payment of the required toll by such user, and reset means operatively controlled by said operation of said enabling means to reset said totalizing means and said register means, whereby said totalizing and said register means may be used in the collection of the toll of a second user prior to operation of said characteristic comparison means in the verification of the first user.

10. In a toll collecting system for use with facilities including receive means for receiving a toll payment, signal means operative to generate signals representative of the number of each species received by said receiving means, comparison means for checking the amount of the toll received, fare register means operative to register on said comparison means the toll payment required from a first user, characteristic memory means connected to said fare register means operative to identify a given characteristic of the user, certain of the users having different characteristics, control means operative to mark the toll required in said fare register means including means operative to simultaneously prepare a marking circuit to said memory means, totalizing means operative to register on said comparison means the toll payment as deposited by the first user, fare paid means operatively controlled by said comparison means responsive to registration thereon of a deposited toll which is at least equal to the amount of toll required, verification means including detection means operative to generate a signal representative of said characteristic of each user responsive to the passage of the user, and characteristic comparing means operative to compare the characteristic of each user as determined by said detection means with the characteristic indicated by said memory means, transfer means connected to said fare paid means operative to transfer the indication from said characteristic memory means to said characteristic comparing means responsive to operation of said fare paid means, and reset means operatively controlled by said operation of said transfer means and said memory means to reset said totalizing means and said register means for use in the collection of the toll of a second user, whereby said totalizing means and said register means may be used in a second collection prior to operation of said characteristic comparing means in the verification of the first user.

11. In a toll collecting system as set forth in claim 10 in which said transfer means includes means for preventing operation of said control means to register a third user prior to operation of the check means to verify one of the previous two users.

12. In a toll collecting system including receiving means for receiving a toll payment for the use of the facility by a vehicle, comparison means operative to compare the amount of the toll received, with the amount of the toll required, control means including fare memory means operative to register on said comparison means the toll payment required from a first vehicle, axle marking means operative to provide a marking signal indicative of the number of axles on said vehicle, and class register means operative to mark the toll required on said fare memory means and to mark the number of axles on said axle marking means, signal means operative to generate signals representative of the number of each species received by said receiving means, totalizing means connected to said signal means including a plurality of coin counting chains operative to register on said comparison means the amount of the toll payment as deposited by the first vehicle, fare paid means operatively controlled by said comparison means responsive to registration thereon by said totalizing means of a deposited toll which is at least equal to the amount of toll required which is registered thereon by said fare memory means, axle memory register means, axle transfer means operative responsive to operation of said fare paid means to transfer the information from the axle marking means to said axle memory register means, verification means including a treadle operative to detect the number of axles of each vehicle in its passage thereover, axle count means operatively controlled by said treadle to register the number of axles detected, axle check means operatively controlled by said axle memory means and said axle count means to compare the number of axles detected with the number of axles identified on said axle memory register means, including means operative to provide a check signal responsive to coincidence of the numbers in said comparison reset means operative to reset said totalizing means and said register means for use in the collection of the toll of a second vehicle and means controlled by said axle memory means and said axle transfer means to enable said reset means, whereby said totalizing means and said register means may be restored for use in the collection of a toll for a second vehicle prior to operation of said treadle in the verification of the number of axles in the first vehicle.

13. In a toll collecting system as set forth in claim 12 which includes display media for instructing the drivers of the vehicles comprising a stop display media for the purpose of detaining drivers pending payment of the required toll, and a proceed instruction display media for indicating the receipt of the correct payment of the required toll and permission to proceed, fare paid counting means, means operatively controlled by said fare paid means to render the proceed media effective and the stop media ineffective, and means operatively controlled by said axle check means responsive to detection thereby of a coincident number of detected and recorded axles to render said stop media effective and said proceed media ineffective.

14. In a toll collecting system as set forth in claim 13 in which said fare paid counting means includes means operative to count the number of vehicles for which a fare has been paid prior to the passage thereof over said treadle, and means operative in said counting chain to maintain the proceed instruction display media effective responsive to the existence of a count on said counting means subsequent to the passage of a vehicle over said treadle.

15. In a toll collecting system as set forth in claim 14 in which said fare paid counting means comprises a reversing counting chain including means connected to said fare paid means operative to advance said chain one count for each fare paid and means connected to said axle check means operative to remove one count for each vehicle checked.

16. In a vehicular toll collecting arrangement in which the toll deposited in an associated receiver means is compared with the toll required, and the toll required is based on the number of axles on the vehicle for which the toll is charged, display media including a first normally effective means for stopping the vehicles and a second means for permitting the vehicles to proceed, register means for registering the amount of the required toll, signal means operative to generate signals representative of the number of each species received by said receiving means, means connected to said signal means operative to totalize the amount of the toll received, fare paid means including a counting chain for counting each fare as paid and rendering the proceed display media effective, comparing means operatively controlled by said register means and said totalizing means to advance said fare paid counting chain one count responsive to the receipt of a required toll, verification means operative responsive to each passage of a vehicle to verify the vehicle according to the number of axles thereon including means operative to remove a fare paid count from said counting chain responsive to each verification of a vehicle, and means operatively controlled by said counting chain to maintain the proceed display media effective during any period in which a fare paid count is registered on said chain.

17. A vehicular toll collecting arrangement having receiving means for receiving toll payments and in which a required toll payment is registered in the system and the amount of the toll deposited is compared therewith, coin pulse means connected to said receiving means operatively controlled to provide an indication of each coin of the different species deposited, counting chain means actuated by said coin pulse means for counting the coins of each species deposited including at least a first counting chain for a first species and a second counting chain for a second species of a higher value than said first species, means for transferring a count from said first counting chain to said second chain which represents in value a unit on said second chain, and means responsive to simultaneous actuation of said second chain by said coin pulse means and said first chain to subsequently effect an artificial actuation of said second chain to compensate for the count lost by said simultaneous actuation.

18. In a toll collecting system adapted for use with facilities requiring a toll payment having means for receiving toll payments of various species, the combination of signal means operative to generate signals representative of the number of each species received, comparison means including a plurality of network circuits, including means connecting each network circuit to represent at least one of the different species, register means operative to register on each network circuit the equivalent number of each species represented by a network which is required in the toll payment, totalizing means operatively controlled by said representative signals to register the equivalent number of each of the species represented by a network which is in the toll payment deposited on said network circuits, including means operative responsive to the receipt of a preassigned number of species in a given value network circuit to advance by one count the value indicated on the next higher value network circuit, and indicator means for providing a check signal responsive to the registration on each of the plurality of network circuits an equivalent number for the species deposited which is equal in amount to the equivalent number of each species required.

19. In a toll collecting system including receiving means for collecting tolls in which the total payment required is expressed in terms of the total value of each of a number of different species, and means for providing a representation of the number of different species received in each payment, the combination of comparison means operative to compare the total value of the species deposited with the total value of the species required comprising a plurality of circuit networks, each of which networks is connected to represent a predetermined one of said species, and each of which comprises a first set of marking means, each one of which marking means is connected in its network circuit to operatively represent the requirement for the deposit of a correspondingly different number of the species associated therewith, and a second set of marking means, each one of which is connected to operatively represent in its network circuit the actual deposit of a correspondingly different number of the species associated therewith, at least one contact set in each network connected to the marking means to complete a signal path thereover responsive to operation of a marking means of said second set which represents a larger number of units than the operated marking means of said first set, and means connecting the marking means of said first and second sets in a network for its species to establish a signal output path for said network in response to the coincidence of the deposited number of the species with the required number of the species.

20. In a toll collecting system including receiving means for collecting tolls in which the total payment required is expressed in terms of the total value of each of a number of different species, and means for providing a representation of the number of different species received in each payment, the combination of comparison means operative to compare the total value of the species deposited with the total value of the species required, comprising a plurality of circuit networks, each of which networks is connected to represent a predetermined one of said species, and each of which comprises a first set of marking means, each one of which marking means is connected in its network circuit to operatively represent the requirement for the deposit of a correspondingly different number of the species associated therewith, and a second set of marking means, each one of which is connected to operatively represent in its network circuit the actual deposit of a correspondingly different number of the species associated therewith, and means connecting the marking members of said first and second sets in a network for a species to establish a signal output path for said network in response to the deposited number of the species being coincident with the required number of the species, and means in each network operative to establish a by-pass circuit for its associated network to represent the requirement for a zero number of units of its associated species.

References Cited in the file of this patent

UNITED STATES PATENTS

| | | |
|---|---|---|
| 2,074,392 | Herbst | Mar. 23, 1937 |
| 2,118,424 | Watanabe | May 24, 1938 |
| 2,484,115 | Palmer et al. | Oct. 11, 1949 |

| | | |
|---|---|---|
| 2,523,516 | Potter | Sept. 26, 1950 |
| 2,594,422 | Gordon | Apr. 29, 1952 |
| 2,646,215 | Stovall | July 21, 1953 |
| 2,712,125 | Koch | June 28, 1955 |
| 2,749,440 | Cartwright | June 5, 1956 |
| 2,753,113 | Cooper | July 3, 1956 |
| 2,767,921 | John | Oct. 23, 1956 |
| 2,769,165 | Bower | Oct. 30, 1956 |
| 2,848,158 | Miller | Aug. 19, 1958 |
| 2,889,544 | Grant et al. | June 2, 1959 |
| 2,989,736 | Cooper | June 20, 1961 |